(12) United States Patent
Vuong et al.

(10) Patent No.: US 12,469,243 B2
(45) Date of Patent: Nov. 11, 2025

(54) POLARIMETRIC CAMERA

(71) Applicant: THE REGENTS OF THE UNIVERSITY OF CALIFORNIA, Oakland, CA (US)

(72) Inventors: Luat Thanh Vuong, Riverside, CA (US); Xiaojing Weng, Riverside, CA (US); Altai Perry, Riverside, CA (US); Ji Feng, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 30 days.

(21) Appl. No.: 18/435,104

(22) Filed: Feb. 7, 2024

(65) Prior Publication Data

US 2025/0111636 A1 Apr. 3, 2025

Related U.S. Application Data

(60) Provisional application No. 63/606,744, filed on Dec. 6, 2023, provisional application No. 63/443,781, filed on Feb. 7, 2023.

(51) Int. Cl.

| | |
|---|---|
| *G01J 4/04* | (2006.01) |
| *G01S 17/74* | (2006.01) |
| *G01S 17/931* | (2020.01) |
| *G06T 7/246* | (2017.01) |
| *G06V 10/147* | (2022.01) |
| *G06V 10/82* | (2022.01) |
| *G06V 20/58* | (2022.01) |
| *H04N 25/71* | (2023.01) |

(52) U.S. Cl.
CPC ............ *G06V 10/147* (2022.01); *G01S 17/74* (2013.01); *G01S 17/931* (2020.01); *G06T 7/246* (2017.01); *G06V 10/82* (2022.01); *G06V 20/582* (2022.01); *G06V 20/584* (2022.01); *H04N 25/71* (2023.01); *G06T 2207/20084* (2013.01); *G06T 2207/30204* (2013.01); *G06T 2207/30261* (2013.01)

(58) Field of Classification Search
CPC .... G06V 10/147; G06V 10/82; G06V 20/582; G06V 20/584; G06V 10/145; G01S 17/74; G01S 17/931; G06T 7/246; G06T 2207/20084; G06T 2207/30204; G06T 2207/30261; H04N 25/71
See application file for complete search history.

(56) References Cited

U.S. PATENT DOCUMENTS 9,442,015 B2   9/2016  Kudenov et al.
9,791,315 B2  10/2017  Keller et al.
(Continued)

OTHER PUBLICATIONS

Baek et al., "Lensless Polarization Camera for Single-Shot Full-Stokes Imaging", Apl Photon. 7, 116107 (2022); doi: 10.1063/5.0120465. (10 pages).
(Continued)

*Primary Examiner* — Howard D Brown, Jr.
(74) *Attorney, Agent, or Firm* — Buchanan Ingersoll & Rooney PC

(57) ABSTRACT

A polarization-sensitive encoder, a polarimetric camera, and a method for polarimetric imaging in which the encoder includes a two-dimensional (2D) polycrystalline photonic-crystal film with nanofiber, multi-scale, self-assembled structures.

18 Claims, 38 Drawing Sheets

(56) References Cited

U.S. PATENT DOCUMENTS

| | | | |
|---|---|---|---|
| 10,094,648 | B2 | 10/2018 | Fesler |
| 10,274,378 | B1 | 4/2019 | Kane |
| 10,663,392 | B2 | 5/2020 | Blasenheim et al. |
| 10,768,497 | B2 | 9/2020 | Herloski |
| 11,105,687 | B2 | 8/2021 | Sola Larrañaga et al. |
| 11,215,507 | B2 | 1/2022 | Hasegawa et al. |
| 11,781,913 | B2 * | 10/2023 | McEldowney ....... H10F 39/806 356/364 |
| 12,135,286 | B1 * | 11/2024 | Mazed ................... G01N 21/65 |
| 2014/0313342 | A1 * | 10/2014 | Gan .......................... G01J 3/32 348/162 |
| 2017/0316487 | A1 * | 11/2017 | Mazed ............... G06Q 30/0241 |
| 2020/0149966 | A1 | 5/2020 | Sparks |
| 2021/0247234 | A1 | 8/2021 | Rausch |
| 2025/0093345 | A1 * | 3/2025 | Mazed ................. G06Q 20/321 |

OTHER PUBLICATIONS

Moocarme et al., "Robustness and Spatial Multiplexing via Diffractal Architectures", 2015, Optical Society of America, vol. 23, No. 22. (8 pages).

Weng et al., "Fractal, Diffraction-Encoded Space-Division Multiplexing for Free Space Optical Communication", Department of Mechanical Engineering, Nov. 3, 2021. (11 pages).

Akiyama, et al., "Superresolution Full-Polarimetric Imaging for Radio Interferometry with Sparse Modeling", The Astronomical Journal, vol. 153, Article No. 159, Apr. 2017, 11 pages.

Andersson, et al., "Switchable Optical Polarizer Based on Electrochromism in Stretch-Aligned Polyaniline", Applied Physics Letters, vol. 83, No. 7, Aug. 18, 2003, pp. 1307-1309 (4 pages).

Arbabi, et al., "Full-Stokes Imaging Polarimetry Using Dielectric Metasurfaces", ACS Photonics, vol. 5, No. 8, 2018, pp. 1-20.

Azzam, R.M.A., "Stokes-Vector and Mueller-Matrix Polarimetry [Invited]", Journal of the Optical Society of America A, vol. 33, No. 7, Jul. 2016, pp. 1396-1408.

Basiri, et al., "Nature-inspired Chiral Metasurfaces for Circular Polarization Detection and Full-stokes Polarimetric Measurements", Light: Science & Applications, vol. 8, Article No. 78, 2019, pp. 1-11.

Beygisangchin, et al., "Preparations, Properties, and Applications of Polyaniline and Polyaniline Thin Films—A Review", Polymers, vol. 13, No. 12, Jun. 18, 2021, pp. 1-46.

Bhadra, et al., "Progress in Preparation, Processing and Applications of Polyaniline", Progress in Polymer Science, vol. 34, No. 8, Aug. 2009, pp. 783-810.

Bliokh, et al., "Spin-Orbit Interactions of Light", Nature Photonics, vol. 9, Dec. 2015, pp. 796-808 (14 pages).

Boeva, et al., "Polyaniline: Synthesis, Properties, and Application", Polymer Science Series C, vol. 56, No. 1, 2014, pp. 144-153.

Cheng, et al., "Full-stokes Imaging Polarimetry Based on a Metallic Metasurface", Optics Express, vol. 28, No. 19, Sep. 14, 2020, pp. 27324-27336.

Chiou, et al., "Growth and Alignment of Polyaniline Nanofibres With Superhydrophobic, Superhydrophilic and Other Properties", Nature Nanotechnology, vol. 2, No. 6, Jun. 2007, pp. 354-357.

Choi, et al., "High-Conductivity Two-Dimensional Polyaniline Nanosheets Developed on Ice Surfaces", Angewandte Chemie International Edition, vol. 54, No. 36, Sep. 1, 2015, pp. 10497-10501.

Darmanin, et al., "Wettability of Conducting Polymers: From Superhydrophilicity to Superoleophobicity", Progress in Polymer Science, vol. 39, No. 4, Apr. 2014, pp. 656-682.

Ding, et al., "Recent Advances in Polarization-Encoded Optical Metasurfaces", Advanced Photonics Research, vol. 2, No. 6, Article No. 2000173, Jun. 2021, pp. 1-18.

Dupont, et al., "Polarization Analysis of Speckle Field Below Its Transverse Correlation Width : Application to Surface and Bulk Scattering", Optics Express, vol. 22, No. 20, Oct. 6, 2014, pp. 24133-24141.

Elmalem, et al., "A Lensless Polarization Camera", OSA Imaging and Applied Optics Congress (3D, COSI, DH, ISA, pcAOP), 2021, 2 pages.

Faccio, et al., "Non-line-of-Sight Imaging", Nature Reviews Physics, vol. 2, 2020, pp. 1-13.

Fade, et al., "Computational Polarization Imaging From a Single Speckle Image", Optics Letters, vol. 37, No. 3, 2012, pp. 386-388 (11 pages).

Feng, et al., "Insect-inspired Nanofibrous Polyaniline Multiscale Films for Hybrid Polarimetric Imaging With Scattered Light", Nanoscale Horizons, vol. 7, 2022, pp. 319-327.

Ghabbach, et al., "Accurate Metrology of Polarization Curves Measured at the Speckle Size of Visible Light Scattering", Optics Express, vol. 22, No. 12, Jun. 16, 2014, pp. 14594-14609.

Goodman, Joseph W, et al., "Chapter 1-Origins and Manifestations of Speckle", 2020, pp. 1-6.

Goodman, Joseph W, "Speckle Phenomena in Optics: Theory and Applications", Second Edition, 2020, 461 pages.

Goudail, et al., "When is Polarimetric Imaging Preferable to Intensity Imaging for Target Detection?", Journal of the Optical Society of America. A, Optics, Image Science, and Vision, vol. 28, No. 1, Jan. 1, 2011, pp. 46-53. (9 pages).

He, et al., "Mueller Matrix Polarimetry-An Emerging New Tool for Characterizing the Microstructural Feature of Complex Biological Specimen", Journal of Lightwave Technology, vol. 37, No. 11, Jun. 1, 2019, pp. 2534-2548.

Hermon, et al., "Metasurface Hologram for Polarization Measurement", Optics Letter, vol. 44, No. 18, Sep. 15, 2019, pp. 4436-4438.

Hu, et al., "All-dielectric Metasurfaces for Polarization Manipulation: Principles and Emerging Applications", Nanophotonics, vol. 9, No. 12, Jun. 29, 2020, pp. 3755-3780.

Intaravanne, et al., "Recent Advances in Optical Metasurfaces for Polarization Detection and Engineered Polarization Profiles", Nanophotonics, vol. 9, No. 5, 2020, pp. 1003-1014.

Jiang, et al., "(Gold Nanorod Core)/(Polyaniline Shell) Plasmonic Switches with Large Plasmon Shifts and Modulation Depths", Advanced Materials, vol. 26, May 28, 2014, pp. 3282-3289.

Kaissner, et al., "Electrochemically Controlled Metasurfaces With High-contrast Switching at Visible Frequencies", Science Advances, vol. 7, No. 19, Article No. eabd9450, May 2021, pp. 1-6.

Kamali, et al., "A Review of Dielectric Optical Metasurfaces for Wavefront Control", Nanophotonics, vol. 7, No. 6, 2018, pp. 1041-1068.

Khorasaninejad, et al., "Silicon Nanofin Grating as a Miniature Chirality-distinguishing Beam-Splitter", Nature Communications, vol. 5, Article No. 5386, Nov. 12, 2014, pp. 1-6.

Kulkarni, et al., "Thermal Stability of Polyaniline", Synthetic Metals, vol. 30, No. 3, Jun. 1989, pp. 321-325.

Lee, et al., "Scalable and High-Throughput Top-Down Manufacturing of Optical Metasurfaces", Sensors, vol. 20, No. 15, Article No. 4108, Jul. 23, 2020, pp. 1-31.

Li, et al., "Deep Speckle Correlation: A Deep Learning Approach Towards Scalable Imaging Through Scattering Media", Optica, vol. 5, No. 10, Sep. 26, 2018, 27 pages.

Ling, et al., "Giant Photonic Spin Hall Effect in Momentum Space in a Structured Metamaterial With Spatially Varying Birefringence", Light: Science & Applications, vol. 4, No. 5, Article No. e290, May 22, 2015, pp. 1-6.

Liu, et al., "Deep Learning-Based Holographic Polarization Microscopy", ACS Photonics, vol. 7, No. 11, Nov. 18, 2020, pp. 3023-3034 (23 pages).

Maystre, Daniel, "Photonic Crystal Diffraction Gratings", Optics Express, vol. 8, No. 3, Jan. 29, 2001, pp. 209-216.

Muminov, et al., "Fourier Optical Preprocessing in Lieu of Deep Learning", Optica, vol. 7, No. 9, Sep. 2020, pp. 1079-1088.

Musarra, et al., "Non-Line-of-Sight Three-Dimensional Imaging with a Single-Pixel Camera", Physical Review Applied, vol. 12, Article No. 011002, Jul. 18, 2019, pp. 1-6.

Nam, et al., "Low-Latency Time-of-flight Non-line-of-sight Imaging at 5 Frames Per Second", Nature Communications, vol. 12, No. 1, Article No. 6526, Nov. 11, 2021, pp. 1-10.

(56) References Cited

OTHER PUBLICATIONS

Pouget, et al., "Polarimetric Imaging Beyond the Speckle Grain Scale", Applied Optics, vol. 51, No. 30, Oct. 20, 2012, pp. 7345-7356 (26 pages).

Qi, et al., "Mueller Polarimetric Imaging for Surgical and Diagnostic Applications: A Review", Journal of Biophotonics, vol. 10, No. 8, Aug. 2017, pp. 950-982.

RA'DI, et al., "Metagratings: Beyond the Limits of Graded Metasurfaces for Wave Front Control", Physical Review Letters, vol. 119, Article No. 067404, Aug. 10, 2017, pp. 1-6.

Rubin, et al., "Matrix Fourier Optics Enables a Compact Full-stokes Polarization Camera", Science, vol. 365, No. 6448, Jul. 5, 2019, 9 pages.

Schechner, et al., "Recovery of Underwater Visibility and Structure by Polarization Analysis", IEEE Journal of Oceanic Engineering, vol. 30, No. 3, Jul. 2005, pp. 570-587.

Snik, et al., "An Overview of Polarimetric Sensing Techniques and Technology with Applications to Di erent Research Fields", Proceedings of SPIE, vol. 9099, May 2014, pp. 1-20.

Tan, et al., "Formation of Dual-responsive Polystyrene/polyaniline Microspheres With Sea Urchin-like and Core-shell Morphologies", Polymer, vol. 52, No. 21, Sep. 29, 2011, pp. 4770-4776.

Tominaga, et al., "Polarization Imaging for Material Classification", Optical Engineering, vol. 47, No. 12, Article No. 123201, Dec. 2008, pp. 1-14.

Tran, et al., "The Oxidation of Aniline to Produce "polyaniline": A Process Yielding Many Different Nanoscale Structures", Journal of Materials Chemistry, vol. 21, 2011, pp. 3534-3550.

Tyo, et al., "Review of Passive Imaging Polarimetry for Remote Sensing Applications", Applied Optics, vol. 45, No. 22, Aug. 1, 2006, pp. 5453-5469.

Vuong, et al., "Electromagnetic Spin-Orbit Interactions via Scattering of Subwavelength Apertures", Physical Review Letters, vol. 104, Article No. 083903, Feb. 24, 2010, pp. 1-4.

Wu, et al., "Dielectric Metasurfaces for Complete Control of Phase, Amplitude, and Polarization", Advanced Optical Materials, vol. 10, No. 1, Article No. 2101223, Jan. 4, 2022, pp. 1-10.

Wu, et al., "Imaging Through a Thin Scattering Layer and Jointly Retrieving the Point-spread-function Using Phase-diversity", Optics Express, vol. 25, No. 22, 2017, 5 pages.

Xu, et al., "Hierarchical Nanocomposites of Polyaniline Nanowire Arrays on Graphene Oxide Sheets with Synergistic Effect for Energy Storage", ACS Nano, vol. 4, No. 9, Aug. 26, 2010, pp. 5019-5026.

Yan, et al., "Helical Polyaniline Nanofibers Induced by Chiral Dopants by a Polymerization Process", Advanced Materials, vol. 19, Oct. 2007, pp. 3353-3357.

Yoon, et al., "Recent Progress on Metasurfaces: Applications and Fabrication", Journal of Physics D: Applied Physics, vol. 54, No. 38, Jul. 9, 2021, pp. 1-15.

Zhu, et al., "Deep Learning-based Multimode Fiber Imaging in Multispectral and Multipolarimetric Channels", Optics and Lasers in Engineering, vol. 161, Article No. 107386, Feb. 2023, pp. 1-7.

\* cited by examiner

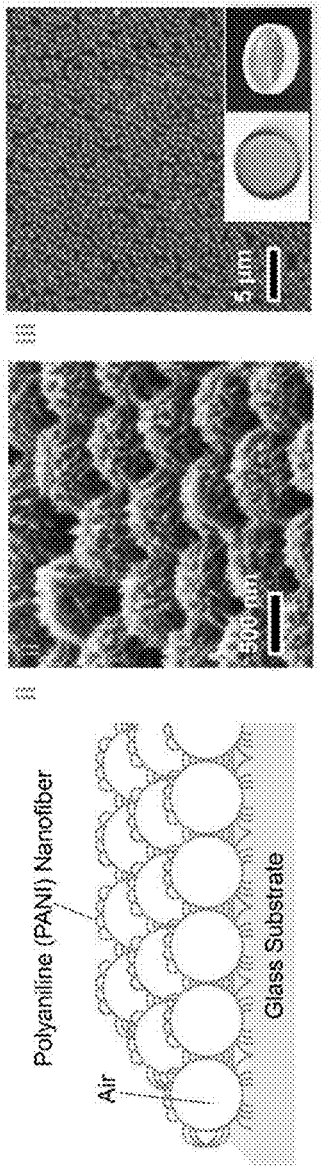
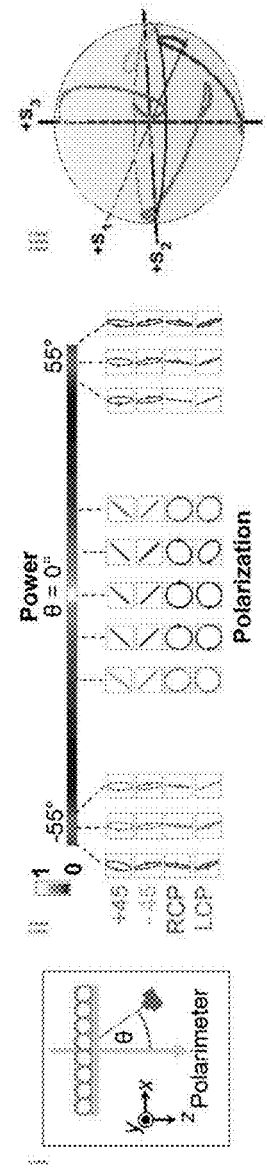
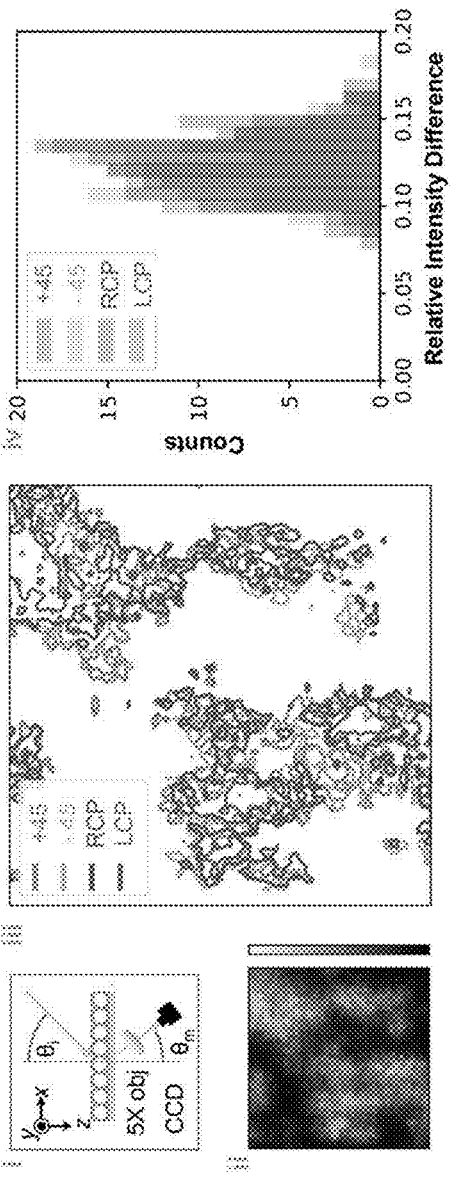
FIG. 2A
FIG. 2B
FIG. 2C

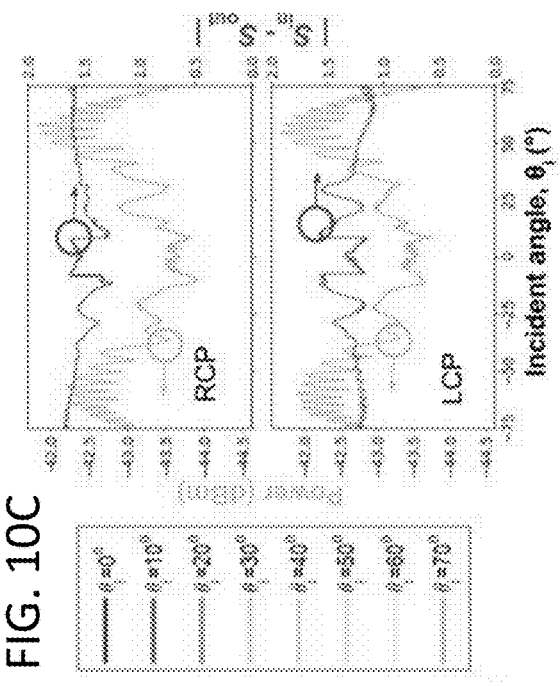
FIG. 10A
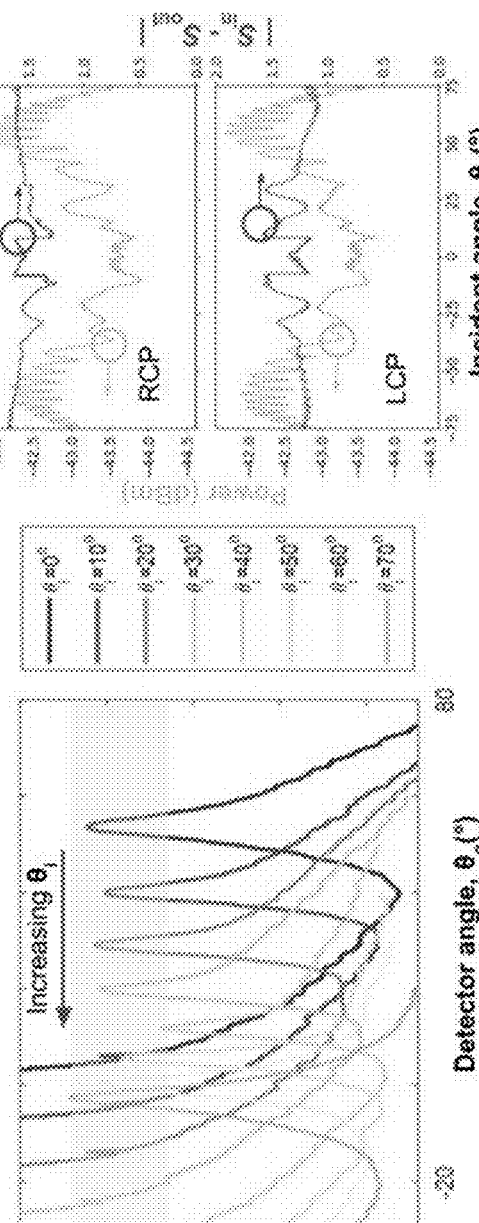
FIG. 10B
FIG. 10C
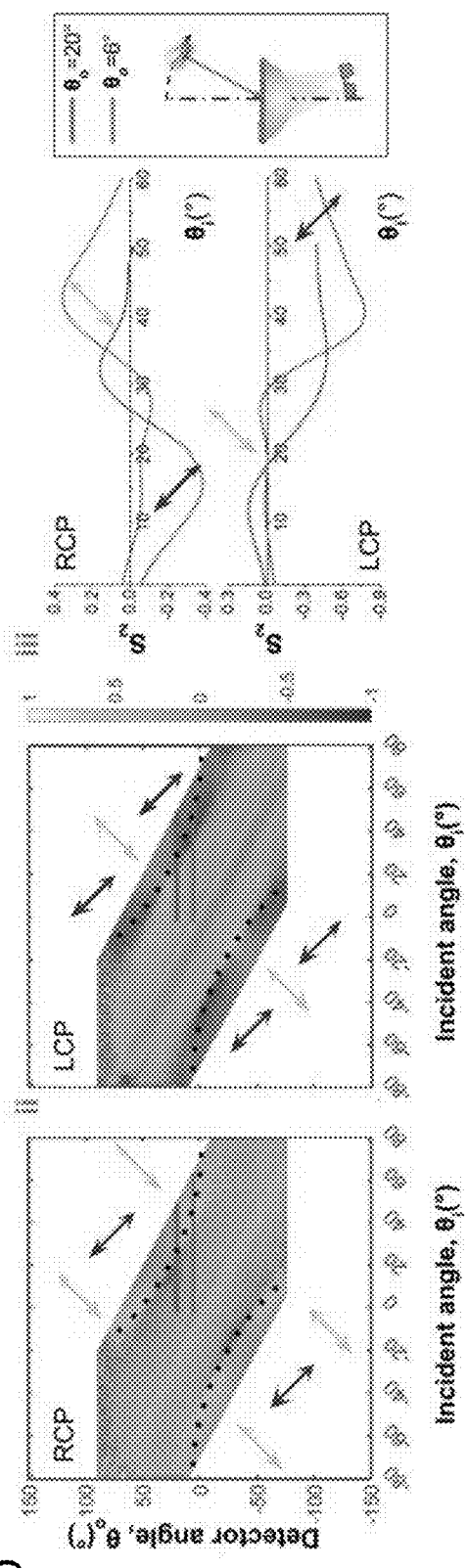
FIG. 10D

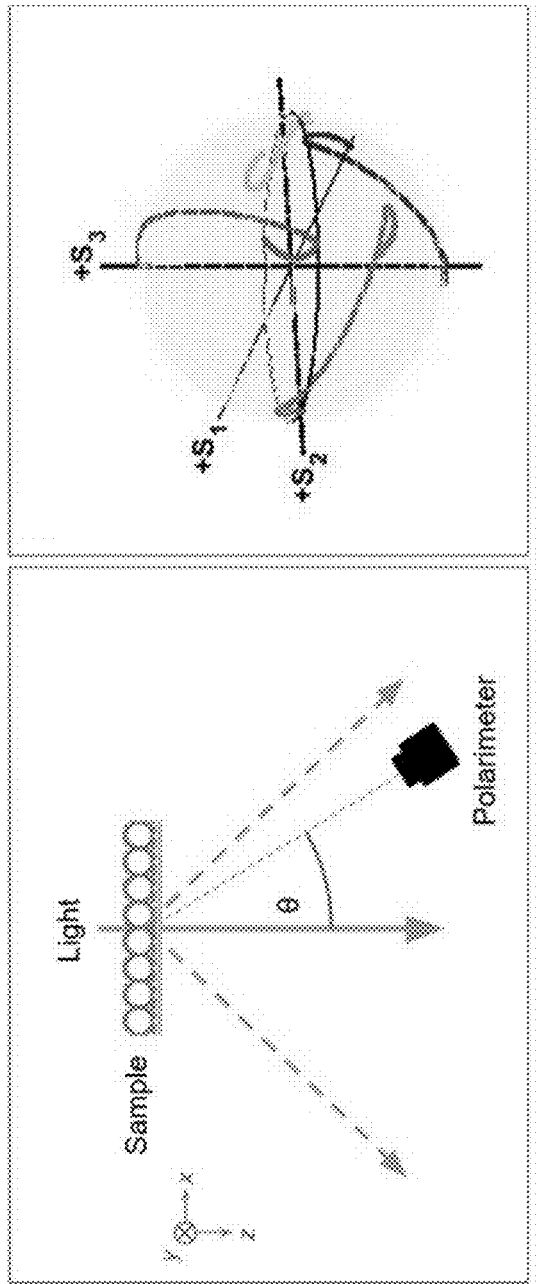
FIG. 17A
FIG. 17B
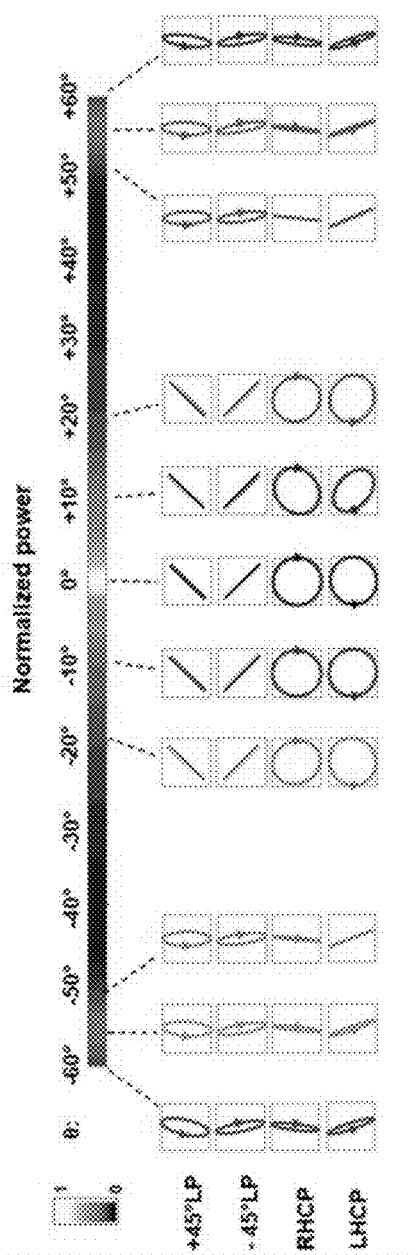
FIG. 17C

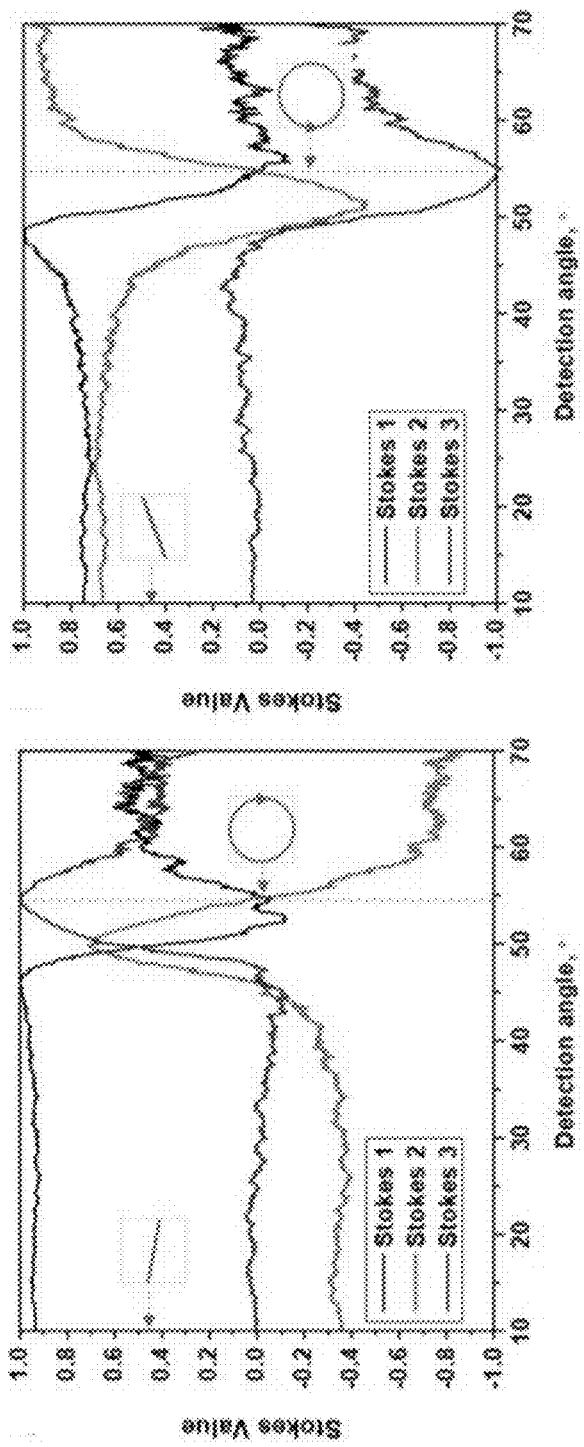
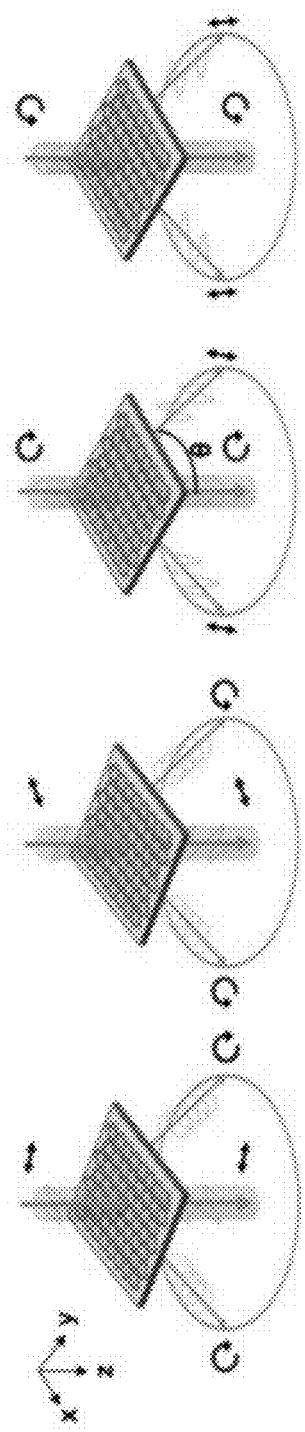
FIG. 24A
FIG. 24B
FIG. 24C

P: Power
CW: Coverage Area Width
DW: Detector/Receiver Width
R: Roaming Radius of Detectors

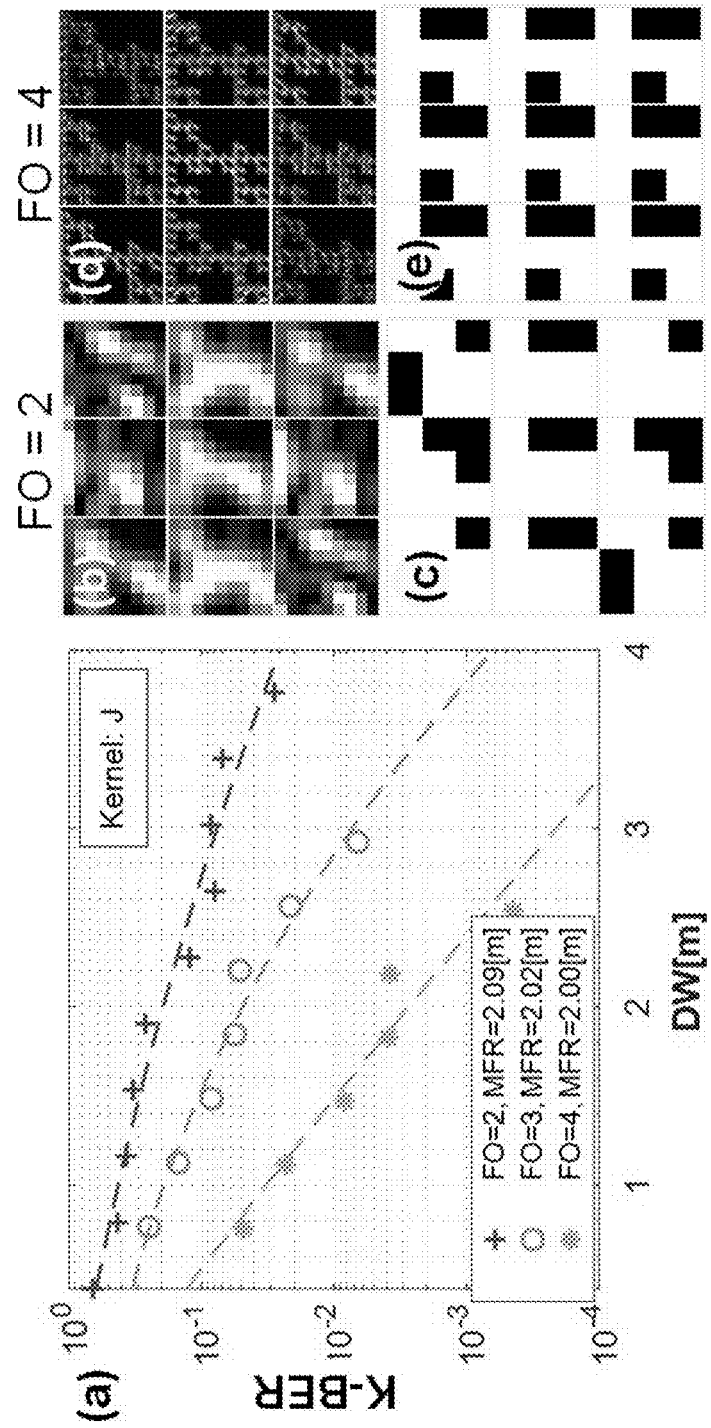

POLARIMETRIC CAMERA

CROSS REFERENCE TO RELATED APPLICATIONS

This application claims the benefit of U.S. Provisional Application No. 63/443,781, filed Feb. 7, 2023, and U.S. Provisional Application No. 63/606,744 filed Dec. 6, 2023, which are both incorporated by reference in their entirety.

STATEMENT OF FEDERALLY SPONSORED RESEARCH

This invention was made with Government support under contract D19AP00036 awarded by the Defense Advanced Research Projects Agency. The Government has certain rights in the invention

TECHNICAL FIELD

The present disclosure generally relates to polarimetric imaging methods and systems, and more specifically, the present disclosure relates to full-Stokes polarimetric imaging using a large-area, thin-film solution-processed metasurface.

BACKGROUND

Polarization specifies the oscillating direction of light's electric field (i.e., linear, elliptical, and circular). Polarization states are frequently described by a four-element Stokes vector S, i.e., ($S_0$, $S_1$, $S_2$, $S_3$), in Mueller calculus. Polarimetric imaging measures the polarization states over a scene or object of interest, which can be an important research topic in many applications. Polarimetric imaging is valuable when there is not enough contrast between the target and the background, for example, underwater and atmospheric remote sensing, target detection, astronomy, biomedical, etc. Another application of polarimetric imaging involves the detection of surface features, roughness, and nanostructure organization.

Polarimetric imaging involves the measurement of at least two of the four Stokes parameters. Most commercial polarization cameras perform linear-polarization imaging, i.e., providing information of only three Stokes parameters ($S_0$, $S_1$, $S_2$) and leaving the circular Stokes parameter $S_3$ unknown. The $S_3$ Stokes component is more difficult to measure because it conventionally requires sensitive phase retardance optics and precise alignment, which lead to imaging systems with moving parts or bulky optics.

Today, there is a significant demand for full-Stokes imaging systems with compact size and reduced fabrication costs. One approach is to make use of the speckles of the reflected or scattered light, which encode polarization information. Another approach is to utilize metasurfaces, which have been designed to spatially separate different polarization states of light and have thus been used in $S_3$ detection, polarimetry, and full-Stokes imaging. There are also other approaches such as lensless polarization imaging, deep learning imaging and so on. Despite those efforts, unresolved technical challenges remain with each of these approaches: polarimetric speckle imaging generally involves bulky volumes and moving optical parts; metasurfaces, while compact, are generally expensive to fabricate, especially for mass production; lensless and deep learning methods often entail real-time imaging delays and still employ linear-polarization cameras. Research towards inexpensive, high-speed, full-Stokes polarimetric cameras is an ongoing area of interest.

SUMMARY

Polarimetric imaging typically results in loss of resolution and can be expensive, requiring precise alignment, multiple measurements, and ultimately bulky designs and moving parts. Recently, spatial light modulators (SLM, a reconfigurable liquid-crystal device) have been employed but these are slow, introduce loss, and still require multiple measurements. The compactness of the imaging system can be reduced with metasurfaces. However, with metasurfaces, the field of view is relatively low since the metasurface fabrication is limited to small areas and relatively expensive.

A relatively inexpensive approach is disclosed, which can achieve wide-field-of-view polarimetric imaging that does not reduce resolution. In accordance with an embodiment, a key is a co-design of encoder and sampling to achieve polarimetric compressed sensing. Specifically, a polarization encoder and sensor decoder are used. The co-design of polarimetric encoder for compression is a significant innovative feature. The encoder can be placed on top of a lens, or it can be on a substrate window to a sensor.

In accordance with an exemplary embodiment, (1) a solution-processed polarization-sensitive nanofibrous film is used, which helps enable large-area fabrication. The material can also enable wide-field-of view polarimetric sensing; (2) meso-order and a combination of lensless methods and information theoretic design can be employed to understand how to sample and get as much information from the sample. This enables compressed sensing and simultaneous sensing of polarization and direction. Meso-ordering and multi-scale structures are key to proper spatial multiplexing of data, which enables polarization cameras to sample less than the Nyquist frequency and image polarization without loss of resolution; (3) sparse sampling and simple back-end processing can be employed, which enables faster, more robust camera-like imaging; (4) a range of geometries are described where the approach is useful, from an invisible camera, (where scattered light is waveguided), to speckle-caustic imaging, and direct imaging. In accordance with an embodiment, the applications are not limited to imaging and can include polarized channel marking, polarized lidar, beam/object segmentation (satellite/mobile communications) AV/VR applications, and turbulence aberrometry wavefront sensors with higher dynamic range; and (5) with meso-order, the material carries dispersion and a frequency-dependent spatial response, which enables hyperspectral imaging or detection of light direction, polarization, and color.

In accordance with another exemplary embodiment, the multi-scale meso-ordered material enables spatial multiplexing of multiple beam components. In accordance with an embodiment, information theoretic analysis and shallow neural networks can be used to achieve compressed sensing of beam polarization and direction (and color, potentially).

In accordance with a further exemplary embodiment, the system enables a compact imaging system with metasurfaces with a relatively high field of view (for example, 150-degree field of view). The film may be inexpensively fabricated. With polarimetric imaging, the system does not reduce resolution, does not require moving parts, and also does not require a polarized sensor array or multiple measurements.

The general concept for high-FOV, compressed polarimetric sensing is not limited to the specific material described. For example, the design can make use of various geometries. Applications can include object tracking, aberrometry/wave front sensing, non-line-of-sight imaging, invisible imaging, and wide-field-of-view polarimetric imaging. Polarization helps enables three-dimensional (3D) imaging, so lidar is also an application for the methods and systems as disclosed herein.

In accordance with an embodiment, a polarization-sensitive encoder is disclosed comprising: a two-dimensional (2D) photonic-crystal array with polyaniline hollow spheres (PANI-HS) nanostructures.

In accordance with another embodiment, a polarimetric camera is disclosed comprising: a lens with a metagrating film adhered to the lens, the metagrating film including a two-dimensional (2D) photonic-crystal array with polyaniline hollow spheres (PANI-HS) nanostructures; a charged-coupled device (CCD) sensor configured to receive a speckle pattern from the lens with the metagrating film; and a computer system configured to process the speckle pattern received from the polarization-agnostic charged-coupled device (CCD) sensor.

In accordance with a further embodiment, a method for polarimetric imaging is disclosed comprising: receiving a speckle pattern on a polarization-agnostic charged-coupled device (CCD) sensor from a lens having a metagrating film, the metagrating film including a two-dimensional (2D) photonic-crystal array with polyaniline hollow spheres (PANI-HS) nanostructures; and processing the speckle pattern received from the polarization-agnostic charged-coupled device (CCD) sensor to reconstruct a scene.

It would also be desirable to have a system and method that is based on diffractal space-division multiplexing (DSDM) approach that enables a wider cone for reception via a redundant encoding since the DSDM approach can be especially robust, for example, to noise. For example, the use of a marker that is patterned with multi-scale, meso-ordered or fractal patterns can mediate several challenges with sensing and communications for detection of an object, for example, using a LiDAR system. In particular, through the use of diffracted fractal patterns, one or more of the problems with a typical LiDAR system including the sampling of 1 degree to 2 degrees angularly and can only provide a single point sample for an object smaller than a meter situated at a distance, for example, 50 meters away, can be overcome. In addition, the system and method as disclosed herein can overcome the typical problem in that LiDAR also does not sufficiently capture reflected light from objects with surface angles greater than 45 degrees from the LiDAR. In accordance with an embodiment, the issues with LiDAR may be resolved by placing or coating the surface of the object with a marker, such as a meso-ordered, multi-scale distribution of structures or fractal pattern.

In accordance with an embodiment, a system is disclosed for detecting an object comprising: one or more markers configured to be placed or arranged on the object, the one or more markers being patterned with a fractal; an emitter configured to emit a beam of light towards the one or more markers on the object; and a receiver configured to detect a beam image from the emitted beam of light being reflected from the one or more markers on the object.

In accordance with another embodiment, a method is disclosed for detecting an object comprising: placing or arranging one or more markers on the object, the one or more markers being patterned with a fractal; emitting a beam of light towards the one or more markers on the object; and detecting a beam image of the emitted beam of light being reflected from the one or more markers on the object.

BRIEF DESCRIPTION OF THE DRAWINGS

FIGS. 2A-2C are description of a PANI-HS polarimetric encoder in accordance with an embodiment.

FIG. 6A are MSE results of pseudo-inverse and FIG. 6B are SNN reconstruction algorithms.

FIG. 7A SEM images of (i) conducting polymer polyaniline (PANI) nanofibers in random, unpatterned film and (ii) hollow spheres (PANI-HS) (scale bars=500 nm). (iii) Illustration of the nanofiber orientation. FIG. 7B Microscope image of PANI-HS (scale bar=10 µm and area is 55 µm×55 µm). Insets: Top and side view photos of 6-mm lenses coated with PANI-HS. FIG. 7C Fourier-transform images of randomly sampled 55 µm×55 µm locations: the mesostructure is composed of rotated but highly ordered domains. FIG. 7D Illustration of a diffracted, light-intensity pattern (also a Debye ring or infinity point-spread function). FIG. 7E Polarization-modulated diffraction patterns, shown for incident right- and left-circularly polarized (RCP and LCP) and ±45° linearly polarized (±45LP). FIG. 7F Sensor pattern for (i) conventional and (ii) encoded, LP filtered, measurements. The sparsely sampled differential LP signals are inputs to FIG. 7G the 2-layer neural network for prediction of beam direction and polarization.

FIG. 8A (i-ii) SEM images and (iii-iv) Debye ring (or infinity point-spread function) intensity patterns in ordered lattices with 532-nm wavelength light and 720-nm lattice spacing. The measured diffracted polarization from incident vertically polarized light is overlaid. Both intensity and polarization are homogeneous for PS but vary spatially for PANI-HS. The polarization ellipticity of the PANI-HS indicates phase retardance and spatially varying birefringence. FIG. 8B are conoscopy measurements showing (i-ii) diattenuation and (iii-iv) phase retardance magnitude and phase for single-crystalline PANI-HS, polycrystalline PANI-HS, and PS with 2-µm lattice spacing. Phase retardance and diattenuation are negligible in the PS samples compared to those of PANI-HS. FIG. 8C CP detection with linearly polarized (LP) filters. (i) Experimental setup where RCP and LCP light encoded by PANI-HS exhibits (ii) asymmetric vector vortex Debye-ring polarizations. (iii) Camera images and integrated camera traces. Notice that the red (+45 LP) and orange (−45 LP) lines are reversed for RCP and LCP. The optimized model parameters indicate 25% of the diffracted light experiences a phase retardance of 70 degrees.

FIGS. 10A-10D are illustrations of information-rich polarization patterns. FIG. 10A is an illustration of a general schematic where light from a polarized object (such as a fly with polarization-encoded cuticle[41]) is incident at $\theta_i$ and the Stokes values are measured at $\theta_o$. FIG. 10B is a power profile for incident 3-mW RCP light for different $\theta_i$. FIG. 10C is an illustration of a corrugated power and polarization shown by calculated changes in the Stokes parameters $|S_{in}-S_{out}|$ along the Debye ring, which differ for (top) RCP and (bottom) LCP. FIG. 10D is a map of second Stokes value $S_2$ as a function of incident and detected angle for (i) RCP and (ii) LCP. The dotted black line marks the location of the Debye ring peak intensity where $S_2$ changes sign. (iii) Lineouts depicting two photodetectors located at $\theta_o=6, 20$ degrees (blue and red, respectively), their dynamic $S_2$ signals as a function of $\theta_i$ for (top) RCP and (bottom) LCP.

FIG. 11A is an emitter polarization prediction for input angles θ; for different detector angle separation and angular blur exhibit different regimes of accuracy and convergence. FIG. 11B is an accurate emitter direction prediction for different polarizations with 5° detector separation and 6°-blur. FIG. 11C illustrates variance or prediction error for different angular blur as a function of detector spacing where markers show the mean variance, shaded areas mark the upper and lower bounds from 7 different runs. Compression is achieved when the error is below the detector spacing or Nyquist rate (blue solid line). The Cramer-Rao Lower Bound (CRLB, orange dotted line) shows the lower range of the error prediction via the Fisher Information calculation from experimental data. FIG. 11D illustrates compression ratio vs. detector spacing for emitter position.

FIG. 15A is a normalized pair correlation function and FIG. 15B is a single-sided power spectra Fourier transforms (FT) of g(r) for a perfect lattice (top row) and PANI-HS (second row).

FIGS. 17A-17C illustrate stokes values measured with a continuously moving detector. FIG. 17A illustrates an experimental setup. FIG. 17B is a Poincaré sphere showing the trajectories of the Stokes changes for incident light with different polarizations: +45° linear polarization (LP, magenta line), −45° LP (green line), right-handed circular polarization (RCP, red line) and left-handed circular polarization (LCP, blue line). FIG. 17C are illustrations of experimentally measured polarization states at different detection angles for normal incidence. Top bar: the power distribution. Lower rows: the polarization ellipses for different detection angles for the four incident polarization states: +45° LP, −45° LP, RCP and LCP.

FIG. 18A is an exemplary model description: the fields at each location on the diffracted Debye ring are a sample of the input beam filtered with a linear polarizer and wave plate. Both the polarizer and the slow-axis of the wave plate are aligned with the k-vector of the diffracted fields. The model fits a 1:3 ratio between the polarizer and wave plate, and a phase retardance and relative phase associated with the diffractive resonance.

FIG. 18B is an illustration of an experimental setup where a polarimeter is placed at 56 degrees and the input linear polarization (LP) angle is changed from −90 degrees (TE) to 0 degrees (TM), back to 90 degrees (TE). The input Stokes parameters are shown for the LP angles. FIG. 18C is another exemplary model and measured polarization transformations.

FIG. 23A are line outs of the intensity profile plot as a function of the angle of deviation rather than the surface norm. FIG. 23B illustrate the peak position of the deviation angle and angle with respect to the surface norm (inset) follows the grating relation. FIG. 23C illustrate the peak power for different input angles. FIG. 23D illustrate the change in the Stokes parameter given by Euclidean distance on the Poincare sphere ($|S_{in}-S_{out}|$) for input +45LP (red), −45LP (blue), RCP (green) and LCP (orange). Individually-plot Stokes components: Power (red), $S_1$ (blue), $S_2$ (green), $S_3$ (tan) at the peak diffracted power for incident (FIG. 23E) LCP and (FIG. 23F) RCP.

FIGS. 24A-24C illustrate conversion from linear to circular polarization. The polarization conversion is −10 LP to RCP for FIG. 24A, and +20° LP to LCP for FIG. 24B. The incident angle is 8.5° for both measurements. FIG. 24C is an illustration depicting these diffractive transformations from linear to circular polarization and vice versa.

FIG. 25A is an illustration of an experimental setup for measurement of transmission with referenced chopper and lock-in amplifier. The polarizers before sample and detector are aligned to be both TM or both TE-polarized. FIG. 25B are transmission for glass and PANI-HS samples with varied incident angle. FIGS. 25C and 25D are ordered PANI-HS and disordered and semi-random PANI-HS, respectively. For the ordered sample, dotted blue and dashed gold lines indicate broad TE and TM resonances.

FIG. 30A is an illustration of K-BER vs roaming radius (R) for different receiver widths (DW). FIG. 30B is illustration of deconvolved and FIG. 30C is an illustration of reconstructed data over 25 equally spaced patches across the coverage area. The dashed squares indicate a possible roaming area wherein the sampled, reconstructed 9-bit images are all correct.

FIG. 31A illustrates K-BER trends with respect to fractal order FO=2,3,4 as a function of receiver aperture size DW at z=10 km. FIGS. 31B-31E are deconvolved images on an optical sensor and the reconstructed data for fractal orders FO=2 (FIGS. 31B and 31C) and FO=4 (FIGS. 31D and 31E) for different patches of the coverage area.

FIG. 32B is an illustration of a Far-field pattern for the kernel "R" showing the coverage width (CW) and 3 different receiver areas. FIG. 32C is an illustration of a corresponding detector patterns and reconstructed data for the receiver areas (c1) DW1=0.2 m, (c2) DW2=0.3 m, and (c3) DW3=0.4 m.

DETAILED DESCRIPTION

Set forth below with reference to the accompanying drawings is a detailed description of embodiments of a polarimetric camera, a system and method that is based on diffractal space-division multiplexing (DSDM), and a system for detecting a diffraction encoded marker. Note that since embodiments described below are preferred specific examples of the present disclosure, although various technically preferable limitations are given, the scope of the present disclosure is not limited to the embodiments unless otherwise specified in the following descriptions.

There is currently significant interest in approaches that combine metaphotonics with back-end algorithms to advance imaging capabilities with less complicated hardware. In accordance with an exemplary embodiment, computational imaging is combined with a low-cost polarimetric encoder to construct a non-line-of-sight full-Stokes polarimetric camera. The polarimetric encoder is a multi-scale, solution-processed metagrating composed of conducting-polymer nanofibers. The highly corrugated speckle patterns can be imaged from the metagrating with a polarization-agnostic CCD sensor and achieve full-Stokes imaging from single-image capture with a trained shallow neural network (SNN) model. As SNNs require large amounts of training data, an effective method is presented to generate scenes that span the full range of the Poincare sphere. To guide the paired encoder and algorithm design, the reconstruction performance of SNNs was compared to pseudo-inverse optimization with varied sensor sampling and explore the issues with compressive sensing. In accordance with an exemplary embodiment, the results provide new guidelines and impressive possibilities with meso-ordered, multi-scale, self-assembled materials in future hybrid computing and imaging systems.

Figure 1:
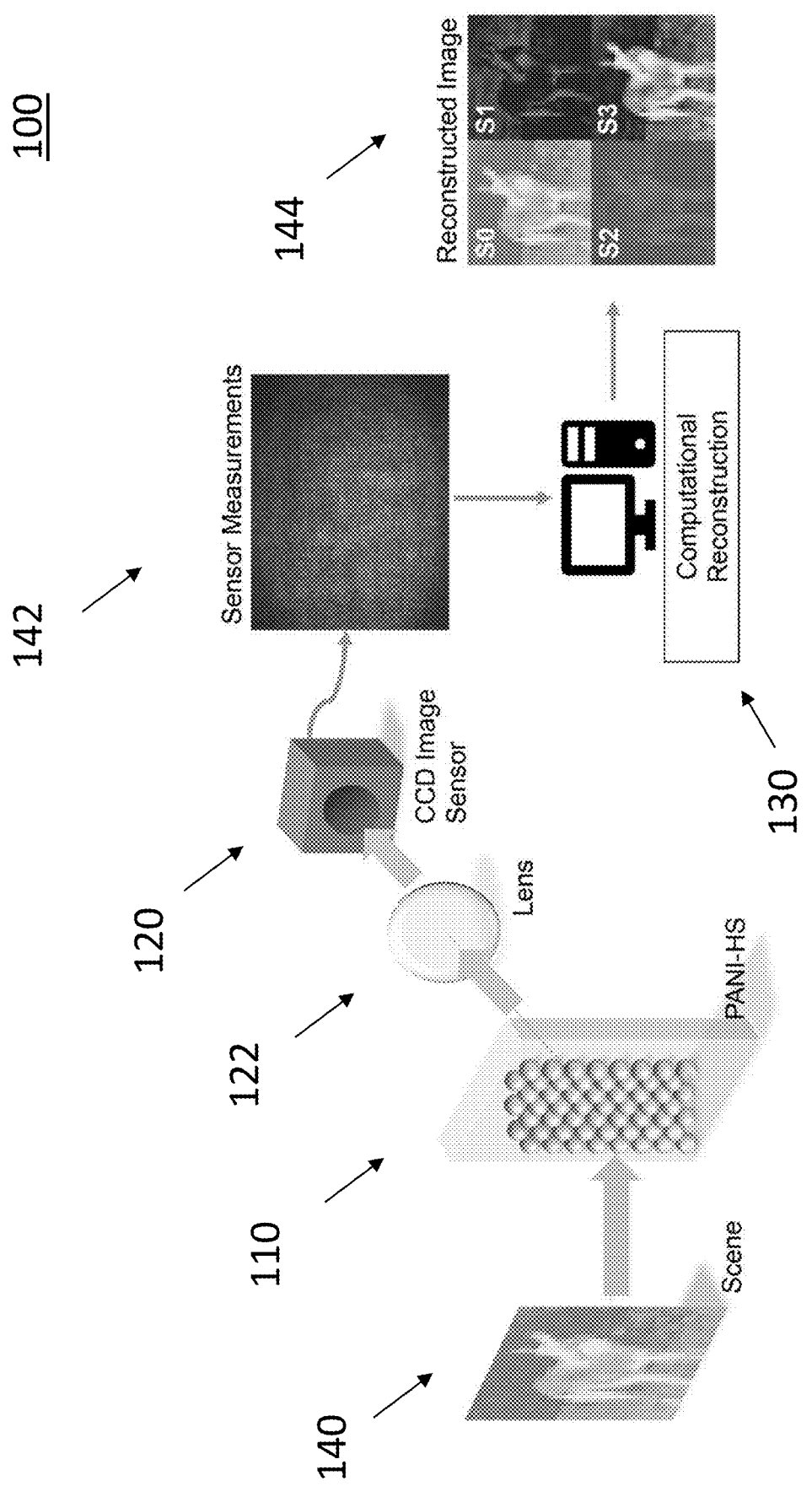
FIG. 1 is an illustration of a non-coaxial computational full-Stokes imaging system in accordance with an embodiment.

In accordance with an embodiment, the approaches associated with speckles, metasurfaces, and computational imaging are combined to demonstrate a low-cost, single-shot non-coaxial full-Stokes imaging system. FIG. 1 shows a system architecture 100, composed of a relatively simple hardware that can include, for example, a metagrating film 110, a charge-coupled device (CCD) sensor 120 and a conventional lens 122, and back-end software 130, e.g., shallow neural networks (SNNs). In accordance with an embodiment, for example, the image sensor 120 and lens 122 are not aligned with a scene 140, thus constituting a non-coaxial or non-line-of-sight imaging system. In this oblique geometry, the film 110 is an encoder that differentiates not only linearly polarized but also right-handed and left-handed circularly polarized light via scattering.

As shown in FIG. 1, all points of polarized light from the scene are transmit through the PANI-HS encoder 110 and form a speckle pattern on the bare CCD sensor 120. The speckle pattern encodes the polarization information of the light from the scene 140. In accordance with an embodiment, only one sensor measurement of the speckle pattern 142 is required for the back-end computational algorithm, e.g., SNNs, to reconstruct the full-Stokes imaging of the scene (i.e., reconstructed image) 144.

In accordance with an exemplary embodiment, a metagrating film is disclosed, which is composed of a 2D photonic-crystal array with polyaniline hollow spheres (PANI-HS) nanostructures. Metagratings represent a different route to the design of regular metasurfaces and enable wavefront engineering with significantly lower fabrication demands. The fabrication process of the PANI-HS metagrating film is efficient and cost-effective: PANI-HS is self-assembled and does not rely on sophisticated instruments or strict laboratory environments. In accordance with an embodiment, polyaniline (PANI) was selected as the nanomaterial because it is an attractive conducting polymer with high transmissive efficiency, high stability, low cost, and facile synthesis, and has been employed as a reconfigurable material in multiple metasurface designs. PANI has been shaped, for example, into various morphologies, including fibers, arrays, films, and as a surface coating material. Unlike previous reports, the polarization response of the PANI-HS encoder does not require chiral molecular doping or alignment of the PANI molecules and can be sensitive to both linear and circularly polarized light. The PANI-HS encoder exhibits a combination of local scattering and waveguided nonlocal interactions that enhance the spatial separation of orthogonal circularly polarized components.

Light from all points in the scene passes through the PANI-HS encoder and forms a speckle pattern on the bare-CCD sensor. The captured speckles no longer resemble the scene to be imaged, but nevertheless contain sufficient information to recover the four Stokes components. Thus, only one single-shot bare-CCD sensor measurement is required for full-Stokes imaging.

In accordance with an embodiment, generalized image reconstruction can be achieved in which the results are demonstrated with several standard image datasets, which are different from the training dataset. The reconstruction accuracy of different back-end algorithms was also compared including SNNs and pseudo-inverse optimization. For example, the use of SNNs significantly relaxes the metasurface fabrication requirements. Meanwhile, the use of the compressed speckle representation significantly reduces the sensor sampling requirement.

In accordance with an exemplary embodiment, the full-Stokes imaging system as disclosed presents several attractive advantages: computational full-stokes imaging, a relatively simple design and easy-to-synthesize hardware, non-line-of-sight full-Stokes imaging, and relatively low-cost scalable manufacturing.

In accordance with an embodiment, while most polarimetric imaging systems are hardware-centric, the disclosed system uses back-end computational algorithms, e.g., SNNs, which relax the requirements for the hardware. The hardware involves a PANI-HS film, a conventional lens, and a bare, polarization-agnostic CCD sensor, which is a relatively simple, cheap, and rather easy to assemble. The final system does not include any moving optical parts. Only one single-shot intensity measurement is required for the final image reconstruction. Neither linear polarization cameras nor linearly polarized filters are needed. While most polarimetric imaging systems are coaxial, which means the scene is in the same line with the sensor, the disclosed measurement sensor is non-coaxial with the scene. In accordance with an embodiment, the results extend polarization applications for wide field-of-view and non-line-of-sight imaging. PANI-HS is processed from a solution, which does not require a vacuum-chamber environment or advanced nanofabrication facilities. Therefore, combined with the flexibility of PANI material, one is able to rather inexpensively fabricate PANI-HS over large, curved, and flexible surfaces.

Characterization of the PANI Hollow Sphere Metagrating

The PANI-HS metagrating film was fabricated based on work for inverse-opal nanostructures. The volume of PANI nanowires on the hollow-sphere structure, for example, is doubled compared to the inverse opal structure. Correspondingly, an increase was observed in the strength of the scattered light was observed. The selection of PANI as the nanomaterial is another factor that increases the strength of the diffracted light because PANI has a higher transmissive efficiency than other conducting materials.

FIG. 2A illustrates a (i) schematic of the general nanofiber alignment in the polyaniline hollow spheres (PANI-HS); (ii) SEM image of PANI-HS with an ordered lattice; and (iii) Microscope image of PANI-HS with a disordered lattice. Insets: Top and side view photos of 6-mm diameter lenses coated with PANI-HS.

FIG. 2B illustrates (i) an experimental setup: a polarimeter scans an angle θ range from −60° to 60° in the x-z incident plane; (ii) experimentally measured logarithmic power distribution and polarization for θ from −60° to 60°. Ten percent of the incident light power is scattered into the Debye ring at θ=±55°. iii) Measured Stokes trajectories for θ from 0° to 60° drawn over the Poincaré sphere for incident+45° (magenta) and −45° (green) linear polarizations, right-(RCP, red) and left-(LCP, blue) circular polarizations.

FIG. 2C is an illustration of (i) an experimental setup: the transmitted non-coaxial speckle pattern is imaged; (ii) one example of averaged speckle intensity pattern; and (iii) corresponding 1-layer contour plots of four incident polarizations. (iv) Distributions of relative intensity difference for 100 speckle images (50×50 pixels (px)). Relative intensity difference evaluates the pixel-by-pixel differences of each speckle image to the mean speckle image of four incident polarizations.

The PANI-HS film is produced by the growth of PANI nanofibers over a film of assembled polystyrene (PS) nanospheres. The nanofibers nucleate and grow from the hydrophobic PS spheres, which attach to the same or other PS. Next, the PS template is subsequently removed with toluene and a hollow sphere of PANI is left (FIG. 2A (i)). The hollow spheres with diameters of 744 nm are composed of PANI nanofibers with widths of 20 nm to 100 nm. The size of the hollow sphere is chosen to match a 532-nm laser and generate a Debye ring at an angle that avoids interference from direct transmitted light. The 20 nm to 100-nm fiber width is a result of the nucleation and growth. This fibrous structure emerges due to the low aniline concentration, which inhibits the secondary growth. The multi-scale structure is, at the first level, a hexagonally packed spherical lattice (FIG. 2A (ii)). At the next level, each unit is hollow and has a shell made of nanofibers. The microscope image of PANI-HS shows a PANI-HS structure with relatively low order (FIG. 2A (iii)). Each green dot represents a hollow sphere as the building unit.

PANI is an environmentally stable polymer. The Cl-doped PANI is stable up to 140° C. Made of PANI, the PANI-HS film has relatively high stability: the structure and optical properties of the sample are well maintained after two-year storage under ambient conditions. The synthesis of the PANI-HS is highly reproducible but does depend on the hand completing the synthesis. The photonic structure of the film was determined by the packing of PS nanospheres, which was controlled by a mechanical pump that reduces human errors. The polymerization of polyaniline is a well-established chemical synthesis.

The diffraction patterns from the PANI-HS film encode polarimetric information. An ideal, ordered hexagonal 2D lattice of PANI-HS is a semi-transparent metagrating that has a similar structure to a honeycomb, i.e., each hollow sphere is surrounded by six others. When the lattice exhibits some degree of disorder, instead of six discrete points, the diffracted light of normal incidence distributes as a continuous ring, often referred to as a Debye ring. When a laser with 532-nm wavelength is normally incident on the metagrating film, a diffracted ring pattern was observed at an angle around 55° (FIG. 2B(i) and (ii)). Approximately 10% of the incident beam power is scattered and diffracted into the Debye ring. The measured diffracted angle of the photonic crystal Debye ring is described by the grating equation:

$$d(\sin\theta_i + \sin\theta_m) = m\lambda, \quad (1)$$

where $\theta_i$ is the input angle, $\theta_m$ is the output $m^{th}$ grating angle, m is an integer that represents the propagation-mode or diffraction order, $\lambda$ is the wavelength, d is the distance between grating slits. For the PANI-HS geometry, d is equal to $\sqrt{3}D/2$, where D=744 nm is the hollow sphere diameter. Only first-orders m=±1 are observed. The measured Debye-ring angle for $\lambda$=532 nm is in good agreement with the theoretical value $\theta_{m=\pm1}=+\sin^{-1}(\lambda\lambda/(\sqrt{3}D))=+55.7°$ (Eq. 1).

The diffracted light of the PANI-HS multi-scale structure exhibits polarization-dependent signatures. In the far field, with normally-incident left-(LCP) and right-(RCP) circularly polarized, and +45° (P45) and −45° (N45) linearly polarized light, the transmitted polarization at the measurement angle θ from 0° to 60° (FIG. 2b-iii) were measured. A sharp transition that occurs at the first diffraction order $(\theta_{m=\pm1}\approx\pm55°$ was observed. It is valuable to note that these polarimetric changes in the far field are not observed with PS arrays (i.e., the templates prior to adding PANI). With PANI-HS, the polarization of the incident light is also encoded in the near-field speckle intensity patterns, which are brighter when viewed from the angle $\theta_m$ of the Debye ring. FIG. 2C illustrates the polarization dependence of the speckle pattern for disordered PANI-HS. The speckle caustic is observed at a distance approximately 1 mm from the PANI surface. Since the glass substrate is more than 1 mm thick, a separate lens is used to image this plane onto a CCD array (FIG. 2C (i)). The lens not only images the speckle but de-magnifies: the measured intensities are significantly higher than those measured by a lensless configuration (i.e., a bare CCD close to the sample).

FIGS. 2C(ii) and 2C(iii) show one average speckle image of four polarization incidences (p=P45, N45, RCP, and LCP) and corresponding four-contour plot. FIG. 2C (iv) shows the distribution of the relative intensity differences for 100 speckle images (50×50 px). Each relative intensity difference is calculated by $\Sigma(|Ip-\langle Ip\rangle|/\langle Ip\rangle)$, where $\langle Ip\rangle$ is the average speckle image of four different polarizations. Polarimetric differences in the speckle account for 13% of the mean speckle intensity. Notably, the high-intensity parts of the speckle were generally utilized. Although the low-intensity parts might also carry polarization-dependent information, the signal level is disadvantageously close to the sensor noise. The polarization dependence in the speckle is also related to the randomness of the photonic crystals and its metagrating properties. The polarimetric transformations in the far field (FIG. 2B(iii)) and the corrugated speckle in the near field (FIGS. 2C(iii) and 2C(iv)) both illustrate the PANI-HS metaphotonic behavior that support our full-Stokes polarimetric imaging system.

Full-Stokes Imaging

In accordance with an embodiment, for the full-Stokes imaging system, a single-shot image of the speckles was captured from a partial segment of the Debye ring. The speckle image is subsequently input to a trained SNN model for reconstruction. However, the training of the SNN model requires a significant amount of polarization data. In practice, this is challenging because there is currently no mature commercial instrument that generates pixel-wise programmable polarimetric scenes that span the entire Poincare sphere.

Polarimetric Scene Dataset Generation

Figures 3A, 3B, 3C, 3D, 3E, 3F:
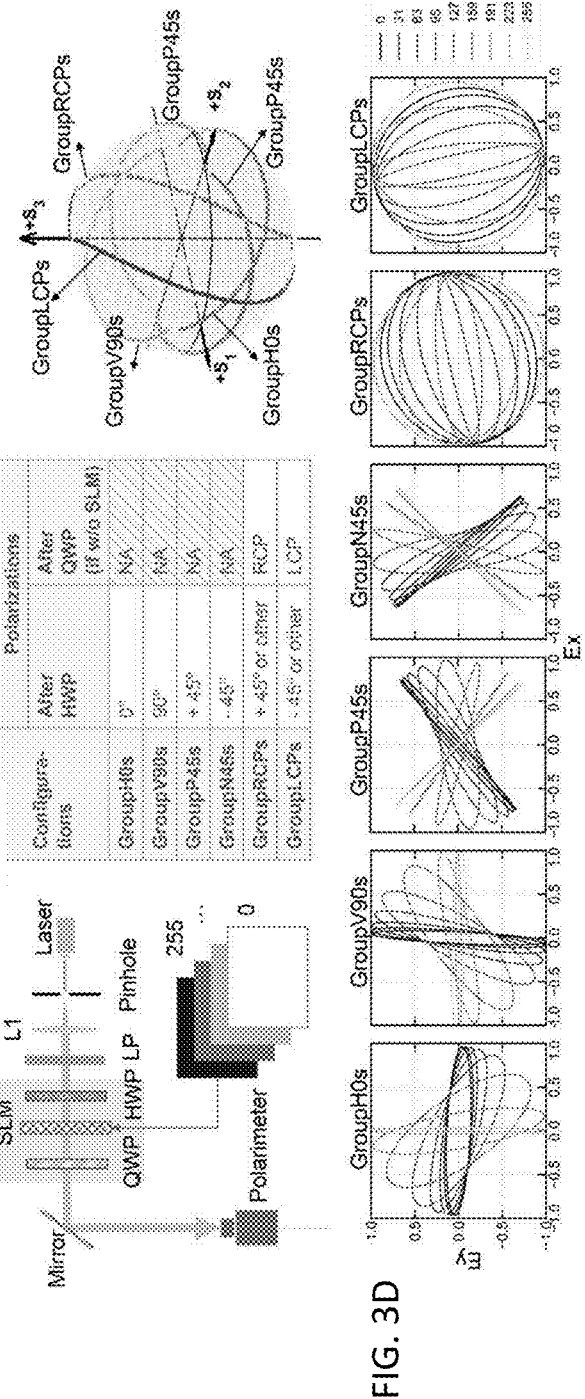
FIGS. 3A-3F are generation of full-Stokes polarized scenes in accordance with an embodiment.

FIG. 3A is a schematic of the experimental setup to build the look-up table of Stokes parameters with six group configurations and 0-255 spatial light modulator (SLM) pixel values. The output polarization depends on the waveplate configuration and SLM pixel values. LP: linear polarizer; HWP: half-wave plate; QWP: quarter-wave plate; L: lens. (b) Six group configurations. Without the SLM, both the HWP and QWP to generate RCP and LCP polarized light were controlled; the QWP was removed, and only control the HWP was only controlled to generate 0°, 90°, +45°, −45° polarized light. Next, the SLM is sandwiched between the QWP and HWP, and program the SLM gray values (from 0 to 255) to generate a continuous range of polarization states, e.g., GroupRCPs, GroupLCPs, GroupH0, GroupV90s, GroupP45s, GroupN45s. FIGS. 3C-3E are illustrations of the six polarization groups with the Poincare sphere, polarization ellipses, and Stokes parameters, respectively. (FIGS. 3D and 3E) Six subplots correspond to the six groups in the order from left to right: GroupH0, GroupV90s, GroupP45s, GroupN45s, GroupRCPs, GroupLCPs. The legends of FIG. 3D are the SLM pixel values. (f) Visualization of a scene example in GroupRCPs. A beam of light is portrayed as a "bundle" of fibers, each with its own polarization state. The polarization states are changed by HWP, SLM and QWP before arriving at the PANI-HS encoding film.

In accordance with an exemplary embodiment, a method is disclosed that generates a large number of full-Stokes polarization scenes. The approach uses a transmissive liquid-crystal spatial light modulator (SLM) (HOLOEYE LC 2012), a HWP and a QWP to generate scenes that span the Poincare sphere (FIGS. 3A-3C). When polarized light passes through the SLM, the SLM-programmable value, i.e., 0-255, alters the polarization of the output light. However, the full range of the SLM value draws only one, half-sphere trajectory along the Poincare sphere and this half-sphere trajectory does not provide sufficient training data to span a full range of polarizations.

To produce full-Stokes scenes that spans the Poincare sphere, the system as aligned with six configurations: a HWP before and a QWP after the SLM are used to generate two groups of polarization images, e.g., GroupLCPs, GroupRCPs; then remove the QWP and only use the HWP and SLM to get the other four groups, i.e., GroupH0s, GroupV90s, GroupP45s, GroupN45s (FIG. 3B). With regards to the alignment, take GroupLCPs for example: first remove the SLM, and then rotate the HWP and QWP so that the transmitted light is LCP. This calibrated waveplate alignment is used when the SLM was sandwiched between the HWP and QWP. Finally, the uniform arrays of the SLM ranging from 0 to 255 were programmed, and the output polarization was measured with a polarimeter (Thorlabs PAX1000VIS) at normal incidence (FIG. 3A).

In accordance with an embodiment, an accurate look-up table was built that records the measured Stokes parameters under the previous six configurations and 255 uniform SLM arrays. The table has four columns for four Stokes values and 1530 rows for configured polarization states. This look-up table is used to generate the pixel-wise polarized scenes, referred to as ground truth. FIG. 3C shows a plot of the look-up table values over the Poincare sphere. Each continuous line represents one configuration of the waveplates. Each point on the line represents one SLM value. The table is also shown in the polarization ellipses (FIG. 3D), or Stokes values (FIG. 3E). These figures show that the Stokes parameters (i.e., $S_1$, $S_2$, $S_3$) in the scene dataset span the full range of $[-1, 1]$ on each axis of the Poincare sphere. This span range covering the domain of each Stokes parameter is important for training the model to recover arbitrary polarized scenes.

FIG. 3F illustrates the generation process of a polarization scene with GroupRCPs configuration. The SLM input is a scenic array instead of a uniform array with identical values. A beam of light is drawn as a "bundle" of multiple pixels after passing through the SLM, wherein each bundle carries its own amplitude and polarization state. With configuration of GroupRCPs, the incoming light passing through the HWP shifts the polarization direction of the linearly polarized light from vertical to +45°. Then, the light passes through the SLM. Each SLM pixel value (0-255) transforms the +45° linearly polarized light into other polarization states which are generally linearly polarized. Lastly, the light transmits through the QWP, which converts the linearly polarized light into circularly or elliptically polarized light. The ground-truth polarized scenes of GroupRCPs were generated by mapping the experimental pixel value to the GroupRCPs table. A similar process is employed to other configurations, except that the ground truth polarized scenes of GroupH0s, GroupV90s, GroupP45s, GroupN45s were generated with QWP removed.

Experimental Setup of Full-Stokes Imaging

Previous experiment (FIGS. 3A-3F) demonstrates how to generate a large number of polarized scenes (ground truth) by controlling the SLM, HWP, and QWP. Here, the composition and principle of the full-Stokes polarization camera are described. In accordance with an embodiment, how to capture the training dataset with known polarized scenes and how to preprocess the training dataset before training the system model are demonstrated. The full-Stokes polarization camera consists of a PANI-HS, a bare CCD sensor, a convex lens, along with computational reconstruction algorithms. The lens increases the system's sensitivity by collecting more light with the same sensor area. Without the lens, the bare sensor placed close to the PANI-HS captures speckle patterns with lower brightness. As such, the use of the lens enables lower light imaging compared to lensless system.

Figure 4B:
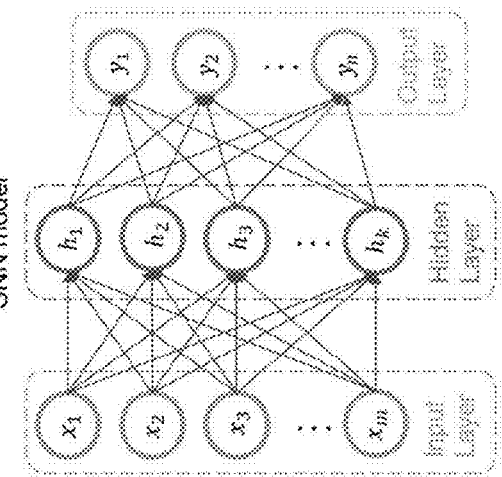
FIGS. 4A-4C is an illustration of a demonstration of the full-Stokes polarization imaging system in accordance with an exemplary embodiment.
Figure 4A:
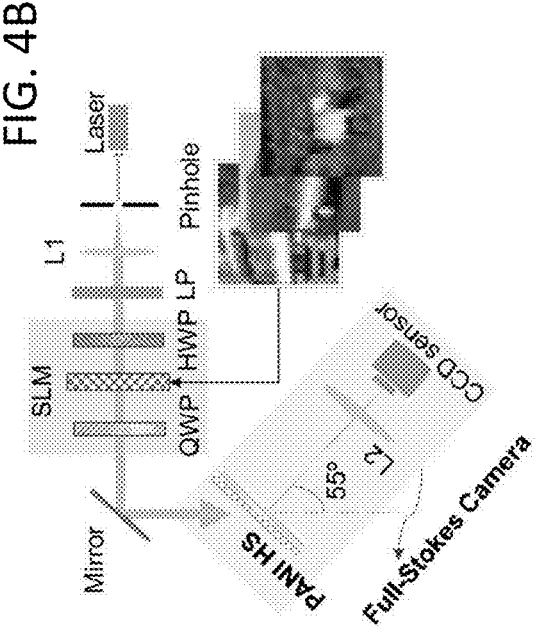
Figure 4C:
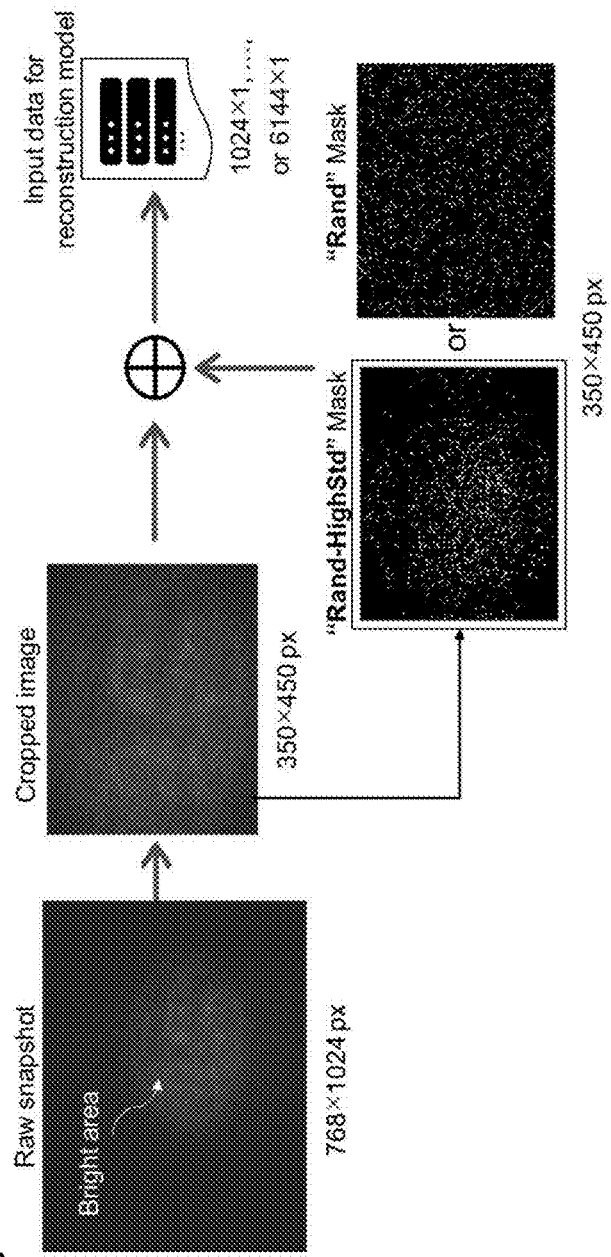

FIG. 4A is an experimental setup. Light is spatially filtered with a pinhole and lens L1. The polarized scene is produced with linear polarizer (LP), half wave plate (HWP), spatial light modulator (SLM), and quarter wave plate (QWP). The full-Stokes scene passes through PANI-HS and is captured with lens L2 on a CCD array. FIG. 4B is an SNN model with one hidden layer. FIG. 4C is the preprocessing procedure of one speckle image. Either subsampling masks of "Rand" or "Rand-HighStd" is applied to the cropped image to select M pixels as the input data, $M \in [1024, 2048, 3072, 4096, 5120, 6144]$. The white pixels in the mask represent "True" and the black represent "False".

FIG. 4A illustrates the experimental setup of the PANI-HS full-Stokes imaging system. The captured sensor measurements no longer resemble the scene to be imaged, but the measurements nevertheless contain enhanced information to recover the S0, S1, S2, S3. The laser beam is incident to the PANI-HS at an angle around 55°, which is close to the first-order diffraction angle. The convex lens and CCD sensor (Thorlabs DCU224M) are both parallel to the PANI-HS. The CCD sensor is placed at the focal length of the lens, imaging the scattered spots on the PANI-HS surface, known as "speckles", which encode polarization information of the input scenes. These speckle snapshots are input into the reconstruction model, i.e., Pseudoinverse (Pinv) and SNN (FIG. 4B) for training and testing.

In accordance with an embodiment, a model was trained with 9000 snapshots of CIFAR-10 and tested with 3000 CIFAR-10, 600 Fashion-MNIST, and 600 MNIST handwritten digits. The snapshots were evenly distributed in six groups. For example, in GroupH0s, there are 1500 snapshots of CIFAR-10 for training; 500 CIFAR-10, 100 Fashion-MNIST, 100 MNIST for testing. In other words, the same training and test images are not duplicated across groups. With these snapshots, and the targeted ground truths that are calculated via the prepared look-up tables, all have the data to build and verify the reconstruction model. Nevertheless, before the model was built, the snapshots were preprocessed in order to: 1) reduce the complexity of the reconstruction model and 2) quantitatively analyze the influence of compressive sensing on the reconstruction accuracy.

The dimension of the input data was reduced to reduce the model complexity. The raw snapshot size that we capture with the CCD camera is 768×1024 px. If these snapshots are directly input into the model without any preprocessing, the SNN model will be large and complex, which will consume time and computer resources. One objective was to reduce the input dimension and at the same time achieve high reconstruction accuracy. To do this, the most informative pixels were selected from the snapshots.

To preprocess the snapshots (FIG. 4C), first, a 350×450 pixel (px) subimage, the bright area was cropped, from the original 768×1024 pixel (px) image. It was observed that as the distance between PANI-HS and convex lens increases, the speckle image becomes dimmer, and its bright area becomes smaller. The size and resolution of the bright area is determined by the numerical aperture of the lens. This bright area is generated by the transmissive beam of the polarization scene and the other dark areas are generated by the diffracted light from SLM and ambient noise. The bright area is considered more informative because it directly relates to the polarization scene and most high standard deviation pixels are clustered in this area. Second, two different masks, i.e., "Rand" and "Rand-HighStd" were experimented with to select M pixels from the cropped images as the input data for the reconstruction model.

While the "Rand" mask selects M pixels from the cropped images at random, the "Rand-HighStd" mask selects M pixels based on maximal variance of each pixel. The "Rand" mask is a random binary matrix generated by programming and does not require any images, while the "Rand-HighStd" mask is generated from a number of cropped images. To generate the "Rand-HighStd" mask, the standard deviation of each pixel was first calculated from hundreds of images; next, 10% of the pixels with the highest standard deviation were selected; last, M pixels from these 10% pixels were randomly picked. When the "Rand" or "Rand-HighStd" mask is generated, the same M pixels are sampled for each cropped image. The mask is the same for each cropped image.

The principle applied in the "Rand-HighStd" mask is that the most representative information is contained in the sampled pixels with the highest standard deviation. However, these highest standard deviation pixels are frequently clustered together. To avoid this cluster, pixels were further selected randomly to ensure that the sampled pixels not only have high deviation but also are not adjacent. FIG. 4C also provides a comparison between these two masks. The white and black pixels represent "True" and "False" selection, respectively. The selected pixels with the "Rand" mask are randomly distributed across the cropped image, while the pixels with "Rand-HighStd" are mostly distributed at the bright area. The preprocessing of the snapshots cropping and then subsampling is described by the equation:

$$x = G(s) \quad (2)$$

where $G(\bullet)$ is the sampling operator, i.e., "Rand" or "Rand-HighStd" mask; $s \in R^{768 \times 1024}$ is the raw snapshots from CCD sensor; $x \in R^M$ is the subsampled sensor measurements of M pixels.

Image Reconstruction

After preprocessing the snapshot images, the image reconstruction models produced with the Pseudo-inverse (Pinv) and SNNs were build and tested.

Pseudo-Inverse

A forward model was used to describe the 2D imaging, which maps the scene to the sensor by the linear set of equations:

$$y = \Phi x \quad (3)$$

where $x \in R^N$ is the sampled sensor measurement; $y \in R^M$ is the targeted scene reconstruction; and $\Phi \in R^{M \times N}$ is the transformation matrix. M and N are the number of sampled sensor pixels and targeted reconstruction scene pixels, respectively. Each sensor measures a weighted, linear combination of light from all parts of the scene, and therefore each row in $\Phi$ encodes the weights for the respective sensor. Our task is to find a $\Phi$ that recovers the scene x from the sensed images y.

The train dataset X and respective ground truth Y are used to calculate the $\Phi$ with the formula: $\Phi=Y*\text{Pinv}(X)$, where Pinv($\bullet$) means the pseudo-inverse of a matrix. X is a M×K matrix, where M is a value from [1024, 2048, 3072, 4096, 5120, 6144], and K=9000. Each row in X represents the subsampled pixel values from the sensor. Each column in X represents one sensor measurement, and 9000 snapshots were captured for training. Y is a N×K matrix, where N=4096. Each row in Y represents the pixel values of the ground truth and each column in Y represents one ground-truth image. Since M<K, X generally have multiple right-inverses, and pseudo-inverse provides a "best fit" (least square) solution to the system. For any matrix, Pseudo-inverse always exists and is unique. After the X matrix is built, its pseudo-inverse was calculated by using pinv($\bullet$) function in the Numpy library with Python. Once the matrix $\Phi$ is found, one is able to predict and reconstruct the scene y from x.

Shallow Neural Networks

To improve the results further, SNNs were explored to learn the input-to-output mapping between the sensor measurements and full-Stokes output. Compared to Pinv, SNN models allow one to build nonlinear relationships between the reconstructed output and the sensor measurement. Additionally, shallow over deep architectures were favored because of their simplicity, faster training speed, and lower memory requirements. The SNNs were built with the Keras library in Python, which consists of an input layer, one hidden layer and an output layer. The network architecture is expressed concisely as follows:

*x*(input layer)→hidden layer→*y*(output layer)

The network is trained with the Adam optimizer that uses the mean square error (MSE) for loss comparison. The activation function of the hidden layer and output layer are "linear" and "tanh", respectively. While the number of nodes in the hidden layer is fixed at 5000 and output layer is fixed at 4096 (each reconstructed image is 64×64 px, composed of four 32×32 px Stokes subimages), the number of nodes in the input layer varies with M value, the number of sampling pixels, as described in the next section.

Figure 5:
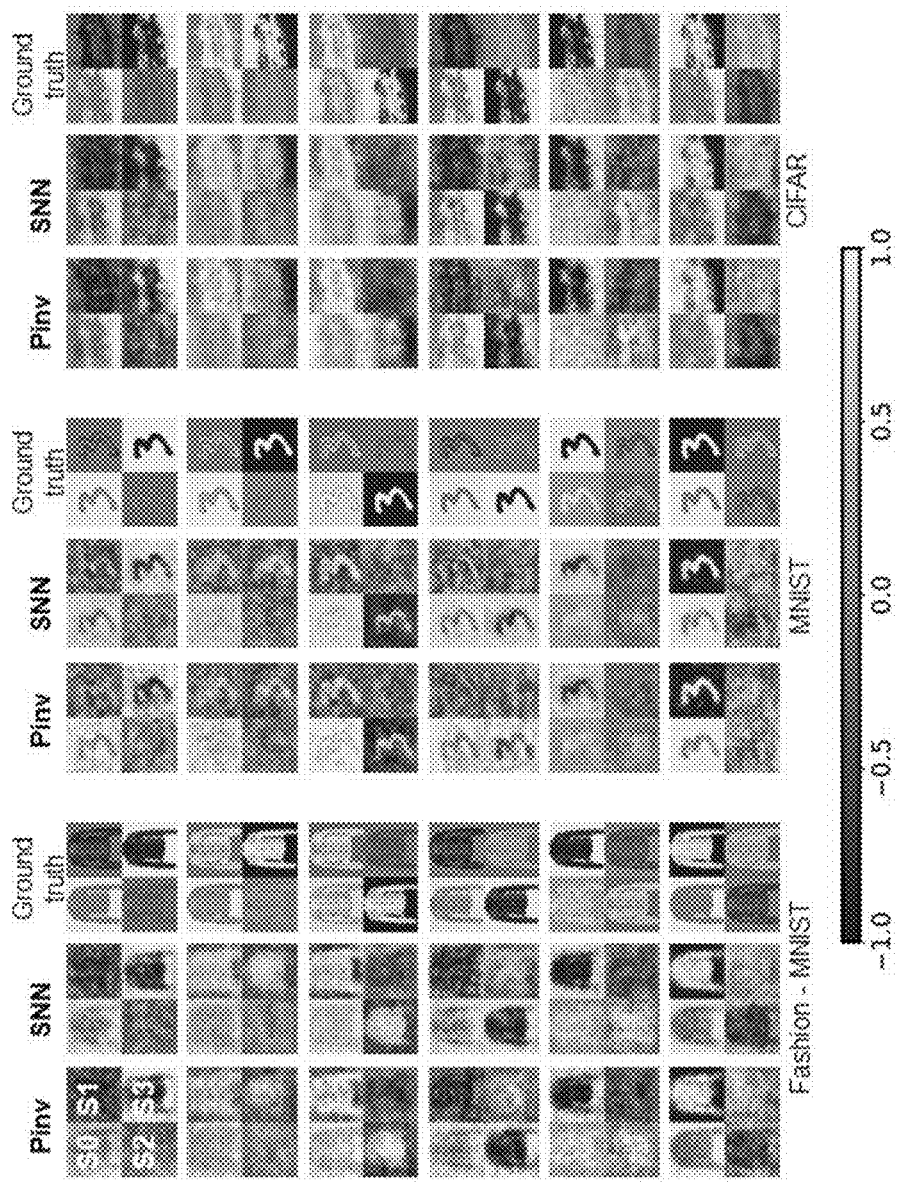
FIG. 5 are examples of the predicted and ground truth images of two reconstruction algorithms: Pinv and a shallow neural network (SNN). All images share the same color bar scale from −1 to 1. $S0 \in (0,1]$ while $S1, S2, S3 \in [-1,1]$. Models are only trained with images from the CIFAR-10 dataset and test with MNIST, Fashion-MNIST, and CIFAR-10 datasets.

FIG. 5 compares the reconstruction result of Pinv and SNNs with the same input data, whose mask is "Rand-HighStd", and the number of pixels sampled from sensor measurement is M=3072. Note that the model was only trained with the CIFAR-10 dataset, but tested with MNIST, Fashion-MNIST, and CIFAR-10. The well-reconstructed MNIST, Fashion-MNIST images show that the system is able to reconstruct arbitrary scenes, not only those learned from the trained dataset. Some test results of the Pinv and SNN model are presented in FIG. 5. The reconstructed images of Pinv model are slightly noisy, with details missing around the edges, while the SNN model recovers more details around the edges, and the overall images are less noisy. All the images in FIG. 5 share the same color bar, which scales from −1 to 1, despite the fact that the full range of $S0 \in (0,1]$, and $S1, S2, S3 \in [-1,1]$.

In the test reconstruction, usually one Stokes has a wider range than the other Stokes. This leads to a more obvious pattern when they are plotted with the same color bar and have similar reconstruction accuracy. With the mask "Rand-HighStd" and M=3072, the average reconstruction MSE of the Pinv and SNN models are close to each other, which is close to 0.1.

Reconstruction Accuracy to Underdetermined Ratio (Compressive Sampling)

The potential for compressive sensing was explored in the disclosed system. The system does not map light from a point in the scene onto another point on the sensor, but rather, maps a point in the scene to many points on the sensor. It is possible to reconstruct sparse full-Stokes scenes from sensor measurements that contain fewer pixels than the desired resolution of the scenes. There was interest in this "underdetermined" case, or M<<N, where the number of the sensor sampling pixels are far fewer than unknown signals. M and N are the number of sampled sensor pixels and targeted reconstruction pixels (unknowns), respectively. An "underdetermined ratio (UD ratio)" is defined as:

$$UD \text{ ratio} = M/N \quad (4)$$

Figure 6B:
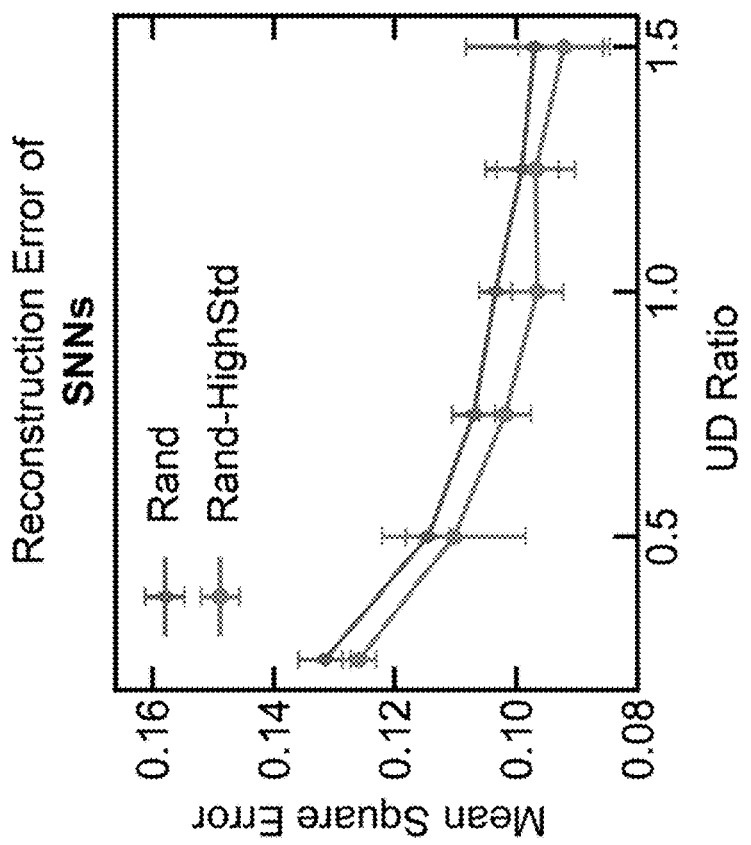
FIGS. 6A and 6B are illustrations of dependence of the reconstruction error on an underdetermined (UD) ratio. The UD ratio is the ratio of the number of sampled sensor pixels to the number of targeted reconstructed-image pixels.
Figure 6A:
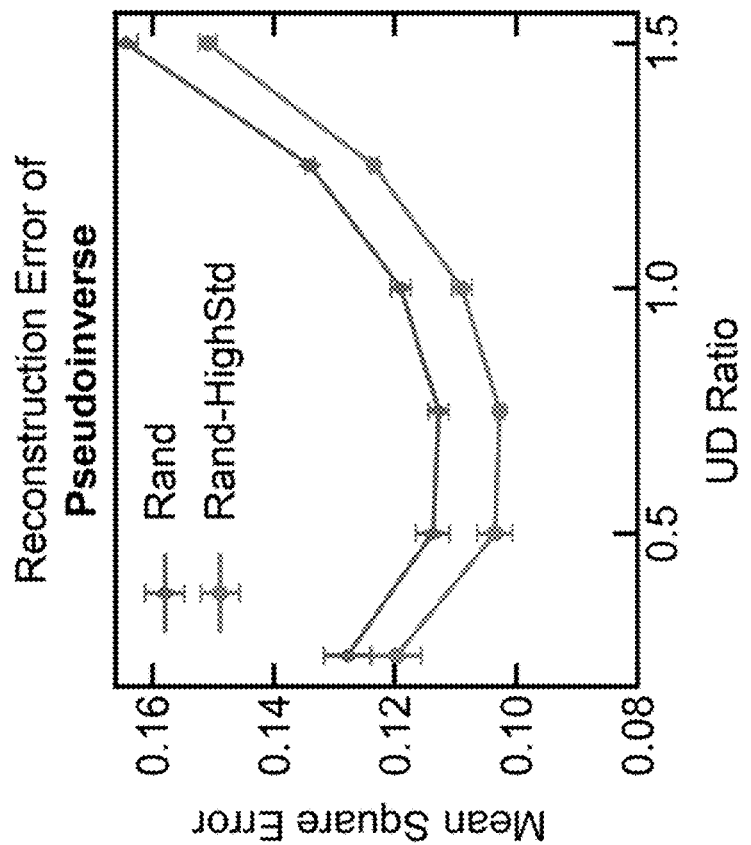

Small UD ratio relates to less computational cost. FIGS. 6A and 6B quantify the reconstruction performance for varying UD ratio. Each target reconstruction full-Stokes image (i.e., S0, S1, S2, S3) is 64×64 px, therefore N=4096. The "Rand" and "Rand-HighStd" masks are artificially set to collect M=[1024, 2048, 3072, 4096, 5120, 6144] pixels from the cropped subimage, which is 350×450 px. The number of sampled pixels M is far less than the whole number of cropped subimage pixels, which corresponds to undersampling factors of over [153, 76, 51, 38, 30, 25]. And the corresponding UD ratio is M/N=[0.25, 0.5, 0.75, 1.0, 1.25, 1.5]. MSE is used to evaluate the image reconstruction quality, which represents the cumulative squared error between the reconstructed and the ground truth image.

Both Pinv and SNNs reconstruct at a good level of quality (FIGS. 6A and 6B). The SNNs have better performance when the UD ratio >0.5, or M>2048. In FIG. 6A, the MSE curve of Pinv models decreases initially and then increases, turning at UD ratio=0.75. This turning trend is largely due to the increase of the model complexity. As M increases, the transformation matrix size of the Pinv model $\Phi \in R^{M \times N}$ grows at a fast rate of M×N. When the size of the transformation matrix $\Phi$ is too large, the Pinv model becomes overfitted and starts to learn the "noise" or irrelevant information. For the SNN models in FIG. 6B, the MSE decreases gradually as the UD ratio increases without any turning point. This is because except the input layer varies with the value M, both the number of hidden neurons and the size of the output layer are independent of M and N are fixed at 5000 and 4096 respectively. This means the model complexity of the SNNs grows at a much slower speed than Pinv as the UD ratio increases, and SNN models are less likely to overfit. Therefore, with more sensor sampling pixels, we achieve more accurate reconstruction results with SNN models.

Meanwhile, the Pinv models are more repeatable than the SNNs. The MSE error bars from the Pinv model (FIG. 6A) are smaller than those from the SNN (FIG. 6B). In general, the "Rand-HighStd" mask has better performance than "Rand" since the MSE of "Rand-HighStd" is always less than "Rand" at the same condition. The MSE gap between these two masks in the Pinv is wider than the SNNs, which indicates the SNN models are better at extracting useful features than the Pinv models.

Discussion

In accordance with an embodiment, a non-coaxial computational full-Stokes imaging system with PANI-HS encoder has been disclosed. The primary advantage of PANI-HS lies in its capacity to distinguish four Stokes parameters at the same time. The speckle spatial difference of 13% is significant as solid colloidal polystyrene samples separate the polarization with a much smaller difference. The enhanced spatial separation of different polarizations can be attributed to multiple-scattering events and associated spin-orbit interactions that occur via scattering, and the degree of compression to weakly guided polarization-dependent mode. PANI-HS is one of many possible multi-scale designs and is facile in its fabrication. Although its nanofiber thickness or density can be further optimized, the polarization sensitivity is sufficient for full-Stokes imaging with a neural network.

In accordance with an exemplary embodiment, the disclosed approach leverages the polarimetric differences that are enhanced and corrugated in the high-intensity parts of the PANI-HS encoded speckles. In addition, the paired metaphotonic encoders and computational reconstruction algorithms by comparing the SNNs to Pinv, both of which achieve reliable general full-Stokes image reconstruction. SNNs achieve more accurate results as the sensor sampling resolution increases. While the reconstruction accuracy may be improved with deep learning, the feed-forward SNNs have the advantage of low computational cost and fast reconstruction speeds: 10-kHz reconstruction rates of images (30×30 px) have been achieved with a modest laptop CPU. Although our camera is not as accurate and does not carry the resolution that current commercial cameras have at this stage, our system is suitable for low size, weight, and power, real-time applications.

We achieve a pipeline for polarimetric image reconstruction with a significant amount of ground truth polarimetric scene data that spans the Poincare sphere. Our method only utilizes a transmissive SLM, a HWP and a QWP to generate the synthetic full-Stokes span dataset that is necessary for full-Stokes polarimetric imaging. This approach with a SLM suffers from several intrinsic limitations which might be improved in the future: there is pixelation and scattering from the SLM; the number of unique polarization states for each SLM pixel is fixed and the span on the Poincare sphere for a single waveplate configuration is incomplete; the training depth-of-field and field-of-view for the imaging system is limited. Nevertheless, this approach towards a polarimetric ground truth dataset is still highly effective and low cost in generating numerous scenes for computational full-Stokes imaging.

Materials and Methods

Fabrication and Characterizations of PANI-HS Metagrating
Chemicals

Styrene, potassium persulfate (KPS), sodium dodecyl sulfate (SDS), aniline, ammonium persulfate (APS), were purchased from Sigma-Aldrich. Toluene, HCl, $H_2SO_4$ and $H_2O_2$ of chemical reagent grade were purchased from Fisher Chemicals. All the chemicals were used as received without further purification.

Synthesis of PS Nanospheres

Monodispersed 720 nm PS dispersions were prepared by emulsion polymerization.1 0.092 g SDS and 0.0836 g KPS were dissolved in 40 mL ethanol and 16 mL $H_2O$ in a 250 ml three-neck flask with N2 gas. Then 3.76 mL of styrene was added under rapid stirring. The emulsion solution was heated to 70° C. and maintained for 8 h. The PS nanospheres were washed with ethanol 5 times before the assembly.

Interfacial Assembly of PS Nanospheres

A 300 mL crystallizing dish was filled with water to provide the air-water interface for the assembly. A dispersion of 5% wt PS nanoparticles in a mixture of ethanol/$H_2O$ (v/v=1/1) was pumped at a speed of 0.01 mL/min to the air-water interface. The PS nanosphere assembly was collected on a glass substrate which has been pretreated with $H_2SO_4/H_2O_2$(v/v=3/1) at 80° C. for 30 minutes. The PS nanosphere assembly was dried at room temperature and heated at 60° C. for 1 hour to help stabilize.

Synthesis of PANI Hollow Sphere (PANI-HS) Film

In a typical synthesis, 18 mL of concentrated HCl was added to 180 mL of $H_2O$, followed by the addition of 111 µL of aniline and 0.306 g of APS. The solution was stirred for 3 minutes to obtain a homogeneous PANI growth solution. The glass substrate with the PS assembly was then inserted into the PANI growth solution with the PS side down. After 15 hours, the PS-PANI film was removed from the growth solution. The sample was dried at room temperature, followed by removal of the PS nanospheres by toluene.

Characterizations

The structure of the PANI fibers, the PANI-HS and the PS array was characterized by a Thermo Fisher Scientific NNS450 scanning electron microscope. The samples on glass substrates were sputter-coated with Pd/Pt and characterized at 20 kV.

In nature, hierarchical nanostructures offer polarization-encoded channels for sensing; however, the capacity to sense light polarization generally reduces the image resolution. Here, it is demonstrated that this trade-off is significantly circumvented over a wide field of view (FOV) with a multi-scale diffractive encoder that enables polarimetric compressed sensing with simultaneous detection of beam polarization and direction. The role of meso-order in such encoders is key: diffuse, disordered materials spread information for the compressed sensing of beam direction, while ordered structures pool scattered light and enhance full-Stokes polarimetric signatures. This demonstration opens the door to wide-angle polarized object tracking, high-range wave front or aberration sensing, and AV/VR applications with self-assembled materials. In accordance with an embodiment, polarimetric compressed sensing continuously over a 150-degree fOV with a compression ratio of 10 has been achieved, near the limits of the theoretical Cramer-Rao Lower Bound.

Polarization sensing is vital to many insects' navigational capacities as a result, numerous polarization-sensing technologies have been guided by the optics found in nature. Insects capable of detecting linearly polarized light (LP) do so via microvillial, linear-polarization-filtering optics. Beyond that capacity, entomologists have debated whether insects can sense degree of polarization (DoP) or circularly polarized light (CP); even though insects lack CP-specific sensors, the natural world exhibits an abundance of CP signatures, and CP or DoP may form a within-species "visual currency". Technologically, polarization sensitivity offers the ability to image through turbid environments, distinguish shadows, and see otherwise transparent objects, and full-Stokes sensitivity to DoP and CP would enable 3D object marking. Nevertheless, polarization imaging and sensing (LP, CP, or DoP) poses unaddressed challenges since the signal intensity information is lost at each polarization-filtered photodetector. Sensitivity to polarization should limit the visual acuity of insects and spatial resolution of polarimetric imaging systems.

One means through which one may advantageously overcome this information loss from polarization filtering is via compressive sensing. Compressive sensing requires sparse data inputs and spatially multiplexed output images. There have been numerous demonstrations with compressed sensing with lensless or coded diffraction methods. These systems, some of which use random encoding and disordered masks as optical components, achieve analog signal processing from Fourier-transform or physical wave propagation. The optically configured outputs may be paired, on the sensor side, with simple electronics that adapt to or interpret the signal imparted from the encoder. Such systems are often referred to as hybrid optical-electronic sensing, or computational "deep optics" imaging approaches.

In accordance with an embodiment, a solution-processed multi-scale, meso-ordered film for optical encoding and draw analogy to insects in the hybrid imaging paradigm is disclosed. Self-assembled nanostructures cover insect cuticles and may provide polarized channel encoding with unpolarized light. Meanwhile, self-assembled corneal nanostructures cover compound lenses and may differentiate the signal polarization via diffraction. It is shown that it is possible to infer full-Stokes polarization without loss of resolution or visual acuity with sparsely sampled signals and a "small brain" neural network. Although insects are capable of such inference and encoding the capacity has not yet been explicitly shown.

Figure 7B:
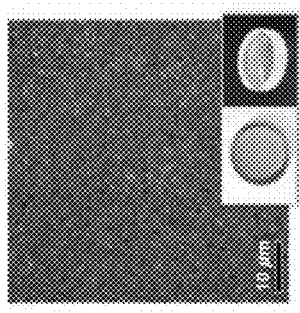
FIGS. 7A-7G illustrates self-assembled, diffractive encoder and pipeline for polarimetric compressed sensing.
Figure 7A:
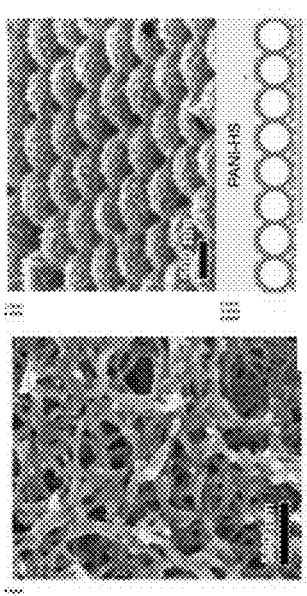

In accordance with an embodiment, a system is disclosed in which the optical encoder is a solution-processed self-assembled film composed of polyaniline polymer nanowires in a hollow-sphere photonic crystal (PANI-HS). PANI-HS is unique for its multiple scales of order (FIGS. 7A-7C). As an encoder, the film is adhered to a lens and its diffraction pattern is sampled sparsely (that is, below the Nyquist sampling limit associated with its unencoded spot size) (FIG. 7D).

Figure 7E:
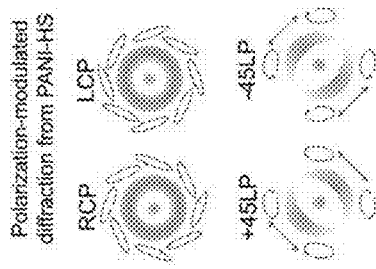
Figure 7D:
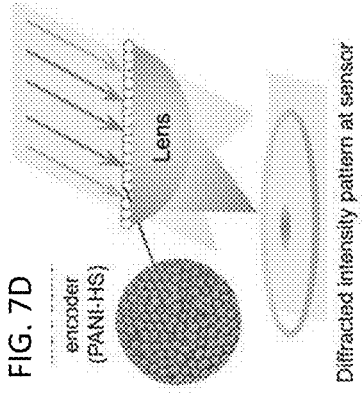
Figure 7C:
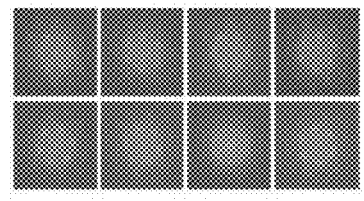

Nonlocal Polarization Transformations from a Conducting-Polymer Metagrating (FIG. 7E).

Like metasurfaces, PANI-HS supports a variety of resonances that are associated with photonic spin-orbit interactions, the spin Hall effect of light, and spatially varying birefringence, among other optical phenomena. The encoder's diffraction-dependent phase retardance produces vortex patterns with tilted polarization axes to enable full-Stokes characterization.

Figure 7G:
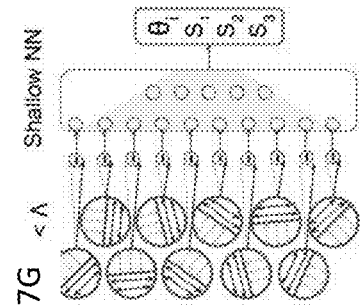
Figure 7F:
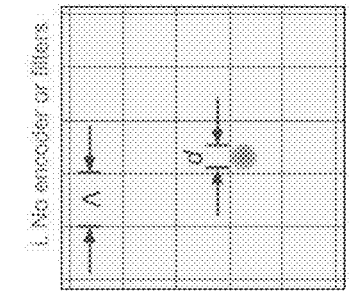

Wide-FOV Polarimetric Compressed Sensing with Meso-Ordered Structures (FIG. 7F).

The encoded information for beam direction is greater with disordered structures or when light is spread over a wider angle of spatial frequencies. Meso-order is needed for full-Stokes polarimetric encoding and compressed sensing of beam direction.

Extended Optical Path Lengths in the Diffracted Light.

The extended paths to the multi-scale, meso-ordered structure since the simulations of smooth and ordered structures do not produce similar intensity-corrugated patterns. The off-resonant, multiple-scattering in such low-refractive index structures presents another paradigm for photonic designs.

Interpretable, Multi-Parameter Predictions with Simple Machine Learning and Estimation Algorithms (FIG. 7G).

Thin, multi-scale films fabricated like PANI-HS offer rich information encoding and pair with shallow neural networks (SNNs). Beam polarization and position over a 150-degree fOV with a compression factor of 10, near limits of the Cramer-Rao Lower Bound are predicted. Self-assembled multi-scale encoders offer opportunities for cheap, wide FOV, polarization-encoded metasurface applications.

In accordance with an embodiment, the results open the door to the co-design of polarized encoders with information-informed approaches to sensor sampling. The convergence achieved between experimental, numerical, and theoretical efforts with multi-scale, meso-ordered materials complement emerging research on reconfigurable, topological, free-form, and random metasurfaces. Beam tracking/pointing control and the use of meso-ordered materials for mobile optical communications applications (alignment between emitter and receiver), wide-FOV object tracking, high-dynamic range wave front sensing, and AV/VR are on the short list of potential applications.

Information in Disordered Structures

The presence of the encoder changes the detected information, which is useful for multi-parameter estimation and optimization; information theoretic metrics guide our understanding of the physical constraints for design and machine-learned predictions from irregular and meso-ordered encoders. Basic estimation is formulated with the intensity probability density function where the variance of the best estimate is the Cramer-Rao Lower Bound (CRLB):

$$\mathrm{Var}(\Theta) \geq \frac{1}{\mathrm{var}(\mathrm{score}(p(x;\Theta)))} \geq \frac{1}{\mathcal{I}(\Theta)}, \quad (1)$$

where $p(x;\Theta)$ is the intensity probability distribution from parameters $\Theta$ and measurements x. The best estimation of $\Theta$ is achieved from an infinite number of measurements x. The variation of the score of a distribution with respect to an estimated parameter is known as the Fisher Information (FI) of the estimated parameter, $\Theta$, $J(\Theta)$, which describes the information content between the receiver (sensor) and the emitter (object):

$$[\mathcal{J}]_i = \int_{x} \left(\frac{\partial \log p(x;\Theta)}{\partial \Theta_i}\right)^2 p(x;\Theta) dx. \quad (2)$$

On the one hand, it is possible to infer the central position of a beam spot with diameter d with sampling below the Nyquist rate $\Lambda=d$: the degree of compression increases when the beam spot is small compared to the diffraction ring radius R and thickness D, or when the diffractive angular spread is wide and the sample is more disordered (See Sec. S1 of the Supplemental Information). For object tracking alone, a more disordered encoder provides higher degrees of compression. The compression ratio was estimated by the ratio of information achieved between encoded (FIG. 7F(ii)) to unencoded (FIG. 7F(i)) scales as $(D/d)^2$.

On the other hand, the polarization-modulated response needed for polarimetric compressed sensing is generally stronger with more ordered structures. In the disclosed insect-inspired approach, the differential LP power signals from the encoder provide sufficient information to achieve full-Stokes predictions with a SNN (FIG. 7G). To understand how much compression is achievable, if at all, and how many detectors are needed in order to achieve an accurate, ANI-HS diffracted-patterns are disclosed in the subsequent sections.

Polarization-Modulated Diffraction in PANI-HS

Based on an approach demonstrated in prior work, PANI-HS were fabricated: hierarchical 2D photonic-crystal films composed of hollow spheres. Images of PANI nanofibers and PANI-HS are shown in FIGS. 7A and 7B. PANI conducting-polymer nanofibers spontaneously self-assemble into domains as small as 10 nanometers. The multi-scale, hierarchical structure is, at the first level, a hexagonally packed lattice. At the next level, each unit is a hollow shell of nanofibers. The film is highly ordered and polycrystalline, where the rotated, ordered domains are at least 55 µm×55 µm in area. The Fourier-transform images of randomly sampled areas on the film show a periodic structure with a diffuse background (FIG. 7C).

Figure 8A:
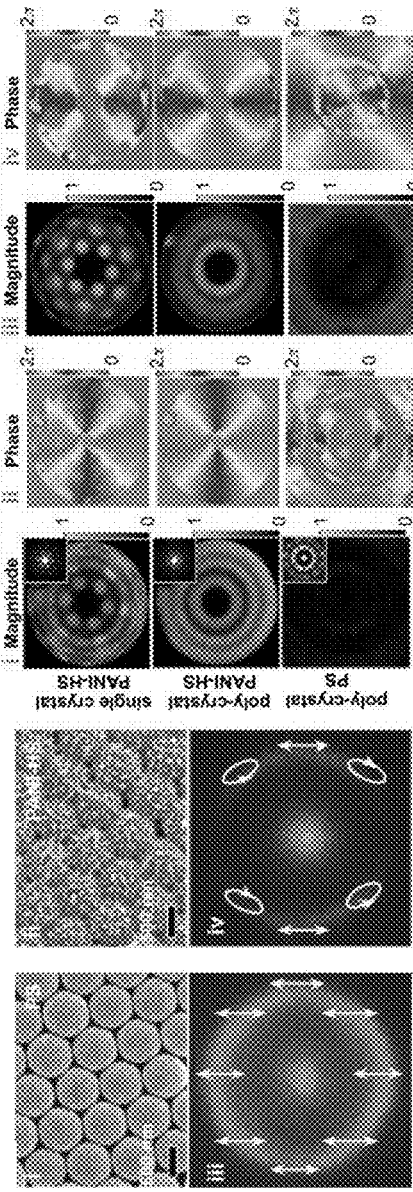
FIGS. 8A-8C are illustrations of polarization transformations of PANI-HS compared with polystyrene spheres (PS).

Nanofibrous PANI-HS films "pool" scattered light in a manner that differs from traditional colloidal self-assembled structures. FIG. 8 illustrates the polarization-sensitive diffraction from PANI-HS, which enables us to differentiate RCP and LCP at normal light incidence. While the diffracted light from PS colloids (and most solid colloidal structures) is similar to the incident polarized light, the diffracted polarization pattern from PANI-HS is inhomogeneous. If one considers self-assembled PS and PANI films with the same degree of order, the PANI-HS Debye ring carries a nonuniform intensity and is broken where the axis of linear polarization intersects the ring [FIG. 8A]. In fact, prior to the removal of PS, the solid PANI-PS films show only a minor polarization dependence and trends that follow that of PS rather than PANI-HS. PS alone exhibits higher intensities in the Debye ring compared to PANI, which was attributed to the higher absorption of the PANI compared to the PS. This polarization dependence is unexpected with colloidal grating structures.

Figure 8B:
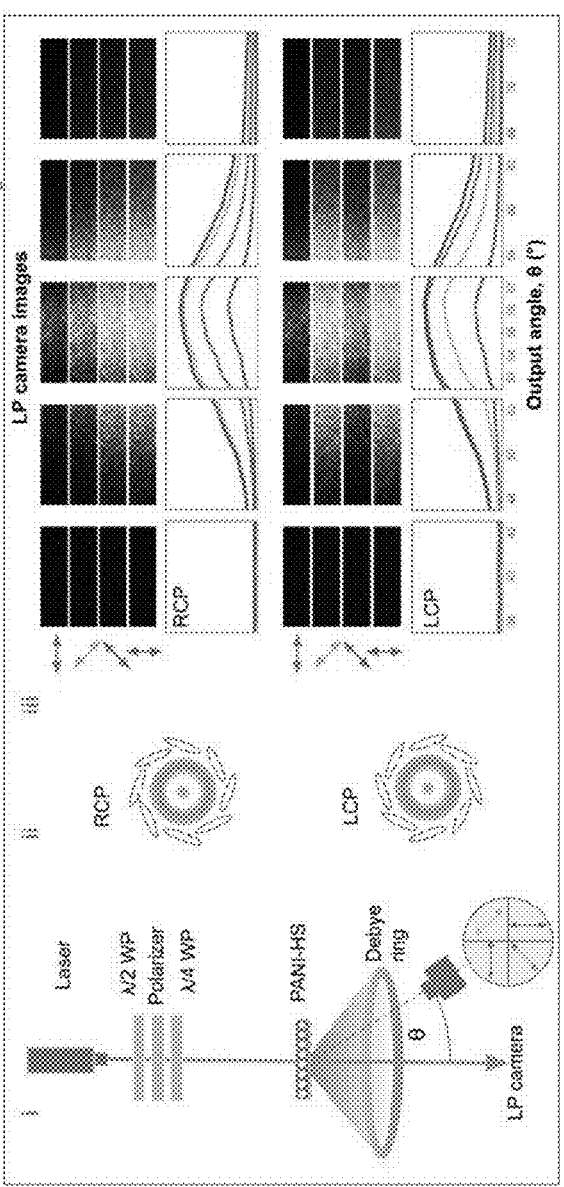
Figure 8C:
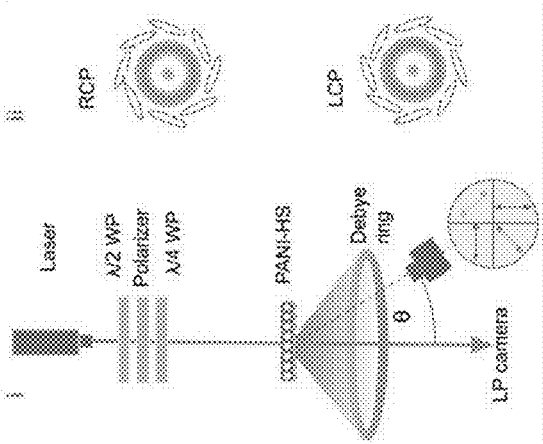

FIG. 8B shows experimentally measured, angle-dependent diattenuation and phase retardance as determined from Mueller matrix diffractometry, which not only identifies angle-dependent phase retardance, but also polarization-sensitive losses (diattenuation) that was attributed to the phase retardance. In these measurements, the Mueller matrix polarimeter images the rear focal plane of the 50× (0.95 NA) objective to obtain complete polarization-resolved maps of the directional distribution of light. For each of the images in FIG. 8B, the complete Mueller matrix is provided later in the disclosure. The comparison of measurements that probe single crystals vs. grain boundaries across multiple crystals (FIGS. 8B(i)-(ii)) show similar diattenuation and phase retardance. This symmetry of the diattenuation and retardance allows us to rule out stress-induced birefringence in the coating. Also, since similar trends are observed for single and multiple crystals, the birefringence is not associated with the grain boundaries or defects in the self-assembled films.

PANI-HS's angular, diffraction-dependent polarization transformations indicate angular optical responses associated with metasurfaces and metagratings. To quantify this response, a coherent model is fit with two underlying contributions to the polarization transformation: a local scattering that yields an azimuthally polarized Debye ring $J_{pol}$, and a phase retardance that arises from weak, radial grating modes $J_{wp}$:

$$E_{out} = J_{tot} E_{in} \quad (3)$$
$$= [aJ_{pol} + b\exp(i\gamma_{rel})J_{wp}]E_{in}, \quad (4)$$

where the ratio of a to b identifies the relative linear scattering to the birefringent term and $\gamma_{rel}$ represents the relative phase between the two matrix transformations. Equation 4 indicates that different locations on the Debye ring provide sampled portions of the input beam that are filtered with a rotated polarizer and rotated wave plate. Both $J_{pol}$ and $J_{wp}$ depend on the sampled azimuthal location on the Debye ring $\phi_0$:

$$J_{pol} = R(-\phi_0)\begin{bmatrix} 0 & 0 \\ 0 & 1 \end{bmatrix}R(\phi_0) \quad (5)$$

$$J_{wp} = R(-\phi_0)\begin{bmatrix} 1 & 0 \\ 0 & \exp(i\gamma_{ret}) \end{bmatrix}R(\phi_0), \quad (6)$$

where $\gamma_{ret}$ is the phase retardance and $\phi_0$ is measured with respect to the x-axis, and $$R(\phi_0) = \begin{bmatrix} \cos(\phi_0) & -\sin(\phi_0) \\ \sin(\phi_0) & \cos(\phi_0) \end{bmatrix}$$

is the rotation matrix associated with azimuthal location $\phi_0$. This model asserts that, when light diffracts at an azimuthal angle $\phi_0$ (in the x-y plane), there is a grating mode that retards the phase for the light polarized along this axis.

For the PANI-HS represented by the present disclosure, the eigenmodes are linearly polarized parallel and perpendicular to the k-vector at angle $\phi_0$; however, the eigenvalues are complex-valued. The matrix $J_{nl}$ points to the interactions that shape the PANI-HS optical properties. The fitting parameters $\alpha$=0.75, b=0.25, $\gamma_{ret}$=−70°, and $\gamma_{rel}$=85° provide good agreement between the model and measurements. With a thin monolayer, the degree of polarization was measured to be over 95%; for thin materials at normal incidence, which assumption of polarization coherence was reasonable. Full transformations from linear-to-circular polarization are observed with non-normal angles of incidence when light is composed of both TE and TM polarizations at an 8.5-degree angle of incidence.

In accordance with an embodiment an interesting asymmetry arises in the diffracted polarization from normally incident CP light. Even though the PANI-HS is achiral, its azimuth-angle-varying birefringence yields a chiral tilt in the polarization axis. The tilt of the polarization depends on the CP handedness. The Debye ring appears as a vector vortex ring, where the tilt of the polarization axis is opposite for RCP and LCP. This tilt is detected with an LP camera (Thorlabs CS505MUP1) that captures 4 similar images with 0°, 45°, 90°, and 135°-angled LP filters (FIG. 7C). The power summed was plotted vertically through each linage, RCP and LCP are differentiated by the +45 and −45-LP components, which flip in power depending on the circuit polarization helicity. The relative strength between these two detected signals reveals the relative phase between TE- and TM-polarization components. This tilt is a result of diffraction-dependent phase in the PANI-HS, and it enables measurement of RCP, LCP, and unpolarized light with LP cameras.

Polarimetric Signatures Beyond a Simple Grating Structure

Figures 9A, 9B:
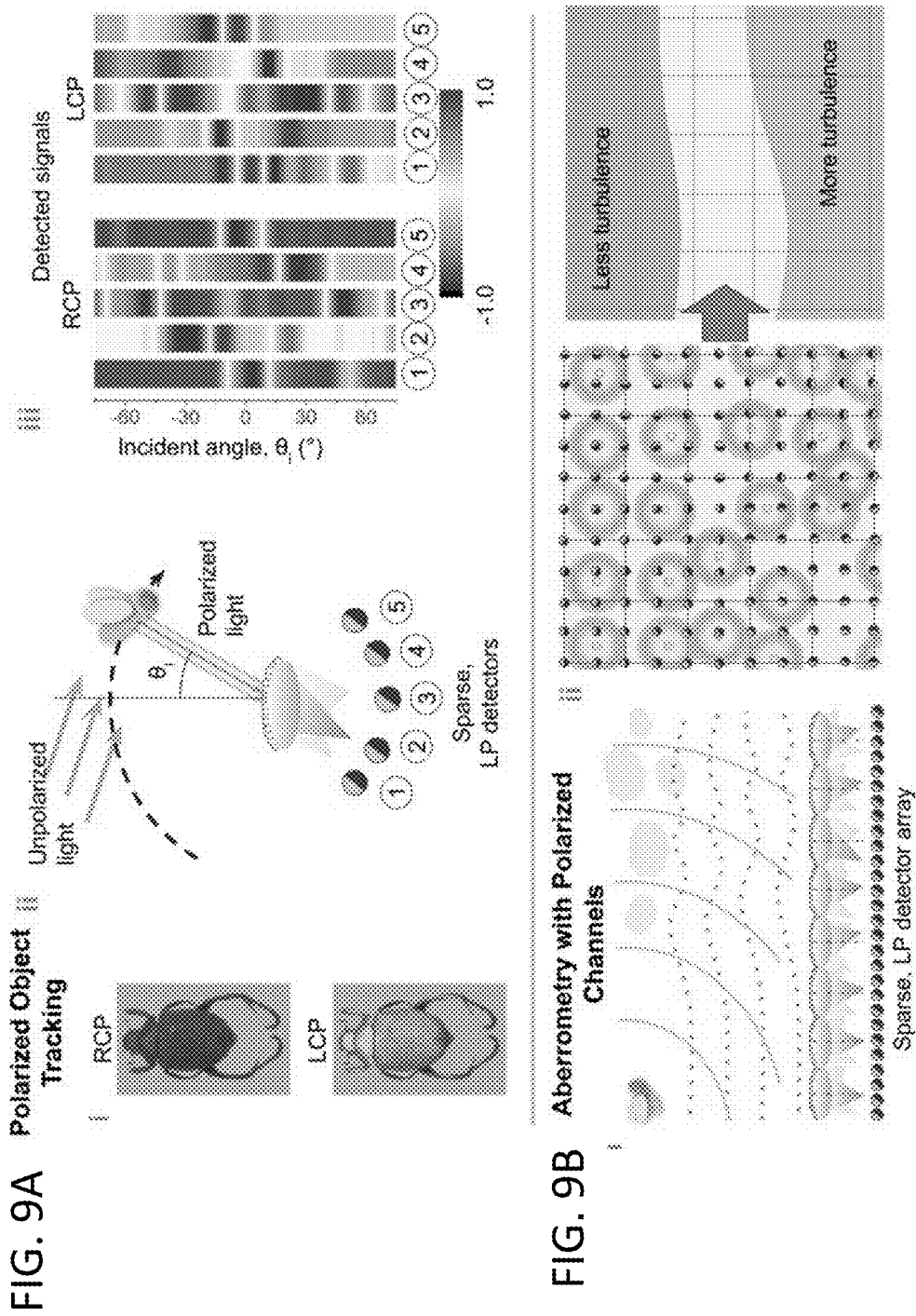
FIG. 9A is an illustration of a polarized object tracking application wherein: (i) is an example of a polarization channel for beam tracking or object detection: a long-leg scarab beetle, which preferentially reflects left-circularly (LCP) over right-circularly polarized light (RCP). (ii) Reflected and scattered light from a polarized object traverses a wide field of view and detected with a few linear-polarization-filtered (LP) detectors. (iii) Distinct, differential LP signals for RCP or LCP light identify incident polarization as a barcode.
FIG. 9B illustrates wavefront sensing with polarimetric channels. (i) Encoded Shack Hartmann sensor with different polarized wave fronts (solid and dotted lines) and (ii) detected patterns and sensed locations of high and low turbulence.

FIGS. 9A and 9B shows two applications for solution-processed PANI-HS films such as PANI-HS. FIG. 9A shows the sharp cuticle encoding that reflects only one circular polarization handedness in image (i). FIG. 9A also show an object or beam tracking application, where RCP and LCP the polarization-modulated response may be separated with sparse, LP detectors in image (ii). A resulting barcode signal from their filtered measurements from real experimental data is shown in image (iii) in FIG. 9A. In a compound-lens, this system may be extended in a Shack-Hartmann geometry, where an encoder may be used to identify far-field locations with higher and lower turbulence (FIG. 9B). With this in mind one can ask, what is the design landscape for the encoder films?

In accordance with an exemplary embodiment, measurements with PANI-HS indicate a rich system of interactions beyond a strict grating structure and signatures needed for wide FOV polarimetric compressed sensing. With a polarimeter (Thorlabs PAX5710VIS-T), the signal changes were captured at non-normal angles of incidence. The output angle $\theta_o$ with 1.0-degree resolution was scanned and vary the incident angle $\theta_i$ in 0.2-degree increments. FIGS. 10A-10B illustrate the power traces as a function of output angle for different angles of incidence. While the relation between peak-power output angle and incident angle follows a simple grating relation, the peak power values varied approximately 2 dB or 30%. The angular width and the shape of the resonances also vary significantly. These variations in peak height are highlighted by the transparent orange bar in FIG. 10B.

Post processing of the measured multi-parameter map of power and polarization data, tracking the peak-power signal along the Debye ring, and observing that the intensity and polarization along the Debye angle is neither constant nor continuous (FIG. 10C). Sharp transitions are observed when tracking the peak power in the Debye ring. The angular separation between the drops in intensity follows an interference condition for thin films, however given the refractive index of PANI, the effective thickness is 20-times larger than that compared to a thin solid film, with modulations, for example, approximately every 5 degrees to 10 degrees. That is, the narrow spacing of these fringes are not reproduced by the transmission from a flat film or a smooth, periodic, hollow-sphere structure. The narrow spacing indicates extended and long photon PANI-HS lifetimes that are associated with more difficult-to simulate multi-scale and meso-ordered structure.

Modulated $S_2$ signals are also significantly differ depending on the CP-handedness (FIG. 10D(i)-(ii)) and sampled sparsely, the differential ±45LP scalar measurements are signatures that identify beam direction and polarization simultaneously. The wide FOV signals for RCP- and LCP-incident beams are illustrated for 5 detector locations in (FIG. 9A(iii)). FIG. 10D(iii) shows $S_2$ signals measured for 2 detector locations, $\theta_o$=6°, 20°. Each detector has ±45° LP filters to capture the $S_2$ component. With increasing angles of incidence, the $S_2$-signals alternate while the relative values of $S_2$ for different detectors provide a signature for encoding the angle of incidence (FIG. 10D(iii)).

To explain the $S_2$-modulated ±45LP signals, the transmittance from the sample was measured at different angles of incidence with a lock-in amplifier. Transmission dips for TE and TM incidence occur at alternating angles of incidence between 0 and 50 degrees and carry the signature of Rayleigh anomalies. The transmission dips indicate broad and weak resonances, which coincide with the alternating sign of the $S_2$ measurements. The modulated polarization is consistent across the sample and stronger for more ordered structures. This weakly resonant behavior was associated with the ability to differentiate RCP and LCP. These weak resonances indicate potential for angle-dependent information processing in the light diffraction from self-assembled, conducting-polymer photonic-crystal films.

Compressive Sensing of Beam Polarization and Direction

To understand the parameters of the multi-scale encoder in relation to its polarimetric compressed sensing, an experimental dataset was built and the SNN predictions, the CRLB, and the optical properties of the encoder were compared. The Stokes parameters were measured over a 150-degree range of incident and exit angles. The detector signals have 1.0-degree angular resolution and the incident angle $\theta_i$ is varied in 0.2-degree increments. In the experimental dataset, emitters and sparse sensors in the x-z-plane were considered. The polarization predictions with RCP, LCP, and ±45LP (states that are equal contributions of transverse electric and magnetic polarizations) were focused on. Although the full-Stokes characteristics were measured at each angle, the dataset "detector measurements" only carry signals from 2 LP detectors that are aligned ±45° from the x-z-plane. In order for the signals to be differentiable with respect to $\theta_i$, measurements were smoothed with a Savitzky-Golay filter.

The score of the conditional signal with an experimental dataset where the probability distributions are logarithm-scaled power signals for each +45° LP and −45° LP-polarized detector were calculated. A ±45° LP-polarized detector measurement is extracted from the dataset assuming m detectors or $x=[\theta_o^0, \theta_o^1, \theta_o^2, \ldots \theta_o^{m-1}]^T$ and four input polarizations P=[+45LP, −45LP, RCP, LCP], and the complete range of $\Theta=\theta_i$. Both $\theta_i$ and P are controlled; the multi-parameter problem was flattened into a single parameter estimate of input angle $\theta_i$ since the joint or mutual information between 0; and input polarization $P_j$ is unavailable. With each input polarization $P_j$, $P_{\pm 45°}(x; \Theta)=\Sigma_j p_{\pm 45°}(x; \theta_i|P_j)p(P_j)$ was calculated, where $p_{\pm 45°}(x; \theta_i|P_j)$ is measured in experiments. This application of conditional information for polarimetric compressed sensing is possible because the dataset is known and balanced (an equal number of measurements are taken with each polarization) so that $p(P_j=+45LP)=p(P_j=-45LP)=p(P_j=RCP)=p(P_j=LCP)=1/4$.

The corresponding calculation of this signal CRLB uses the summed FI from each detector separately:

$$\mathrm{Var}(\theta_i \mid P) \geq \left[ \int \left( \frac{\partial \log p_{+45°}(x; \theta_i \mid P)}{\partial \theta_i} \right)^2 p_{+45°}(x; \theta_i \mid P) dx + \int \left( \frac{\partial \log p_{-45°}(x; \theta_i \mid P)}{\partial \theta_i} \right)^2 p_{-45°}(x; \theta_i \mid P) dx \right]^{-1}. \quad (7)$$

Figure 11A:
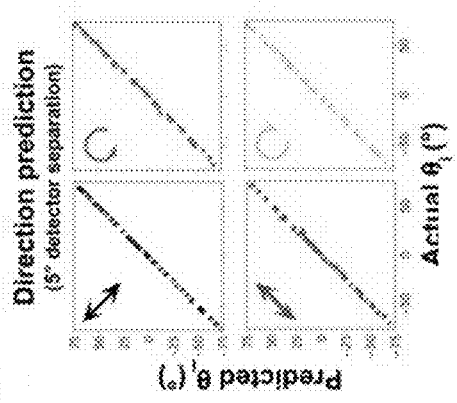
FIGS. 11A-11D illustrate multi-parameter estimation of beam polarization and direction.
Figure 11B:
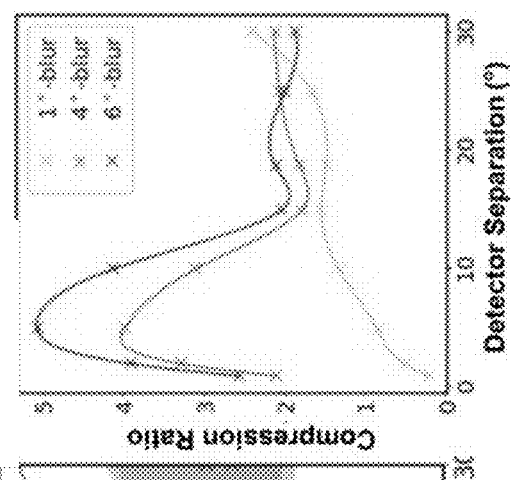

The SNN inputs are the stacked signals from m detectors equally spaced 5-30° apart between $-\theta_{max}=-75°$ and $\theta_{max}=75°$. Each input entry to the SNN is a product of the measured $S_2$ and the smoothed power signal for m detectors. The SNN model is a two-layer SNN with nonlinear 'gelu' activations and loss function associated with the mean absolute error of $[\theta_i, S_2, S_3]$ predictions. A validation split of 0.1 provides 2455 m-detector measurements for training, and 273 m-detector measurements for validation. The polarization prediction data was shown for all $\theta_i$ in FIG. 11A and illustrate impressively wide field-of-view $\theta_i$ prediction with a detector spacing of 5° and blur of 6° [FIG. 11B], where the polarization prediction is also accurate. The CRLB of the conditional FI in Eq. 7 with 6° blur provides a lower-bound, best-case estimate for understanding the $\theta_i$ predictions from the SNN [FIG. 11B]. This degree of blur is necessary to smooth noise from the experiment, since otherwise 1) the noise is interpreted as information and the calculation of FI is unrealistically large, and 2) the SNN model is overfit, and the prediction is not accurate. A significant amount of the information lies in the low-power measurements where the $S_2$ measurements are noisy.

Figure 11C:
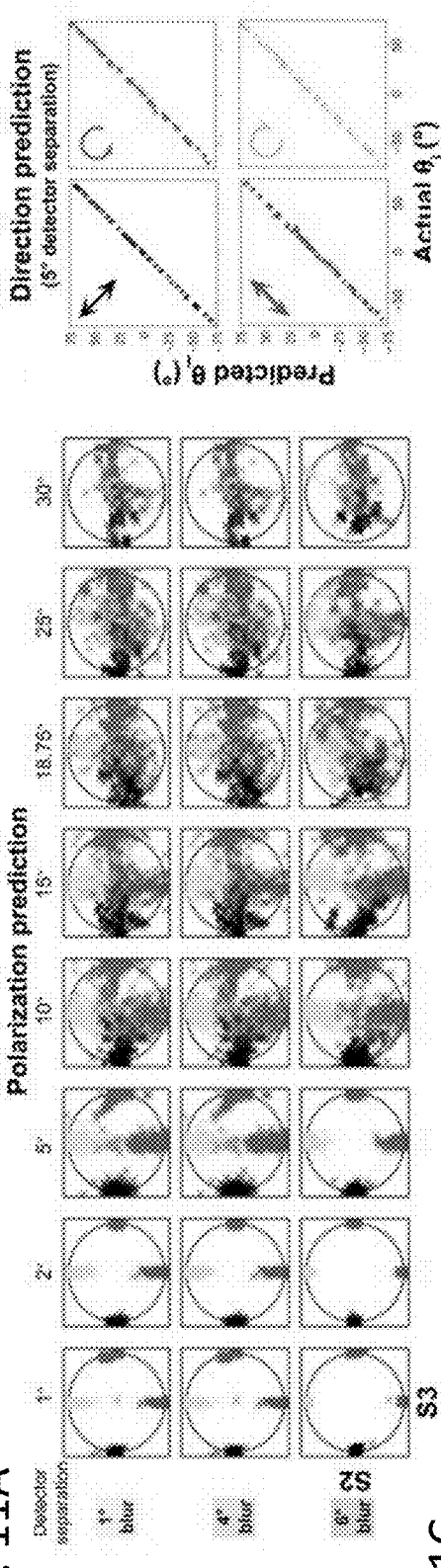
Figure 11D:
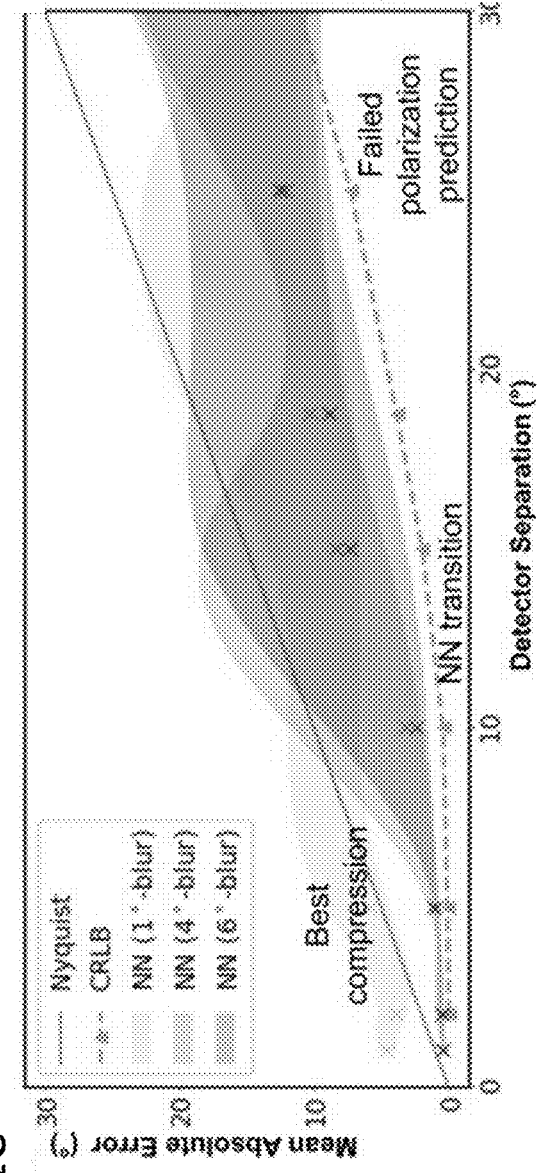

There are phase transitions that mark the regimes of SNN model convergence as a function of detector spacing. Shaded areas mark the variation of the $\theta_i$ prediction error from seven runs with different validation splits [FIG. 11C]. From this, phase transitions associated with the multi-parameter predictions was observed, which occur for different detector spacings: when the detector spacing is above 20°, the SNN polarization prediction fails; when the detector spacing is 10°-20°, the SNN model is unreliable with the multi-parameter estimation. There is a phase transition from where both polarization and $\theta_i$ predictions are poor to where both polarization and $\theta_i$ predictions improve (i.e., detector spacings around) 10°. Below a detector spacing of 5°, the SNN converges to accurately predict both polarization and beam direction.

At a detector spacing of 5°, the SNN predicts $\theta_i$ with 1° accuracy, which is one-fifth of the separation between detectors and below the Nyquist sampling limit. In these cases, the error of $S_2$ and $S_3$ is less than a few percent. Since full-Stokes characterization typically requires 4 polarization-filtered measurements and the disclosed method and system only has 2, the compression ratio from this encoded system with PANI-HS and ±45LP sampling is approximately 10.

The SNN phase transitions point to Nyquist-like sampling considerations and ideal multi-scale encoder designs. For example, the $\theta_i$ prediction corresponds to the highly corrugated intensity and polarization patterns shown in FIG. 10B where the peak-power curves oscillate approximately every 10-degrees (this angular change would explain why the SNN achieves the highest compression ratio with detector spacings of 5 degrees). On the other hand, the polarization prediction of RCP/LCP requires reliable sampling of the $S_2$-modulation [FIG. 10D], and the $S_2$ signals oscillate approximately every 20-degrees for RCP and LCP emitters (this modulations would explain why the SNN polarization prediction converges with detector spacings below 10 degrees). The Nyquist conditions with quasi-periodic signals indicate that multi-scale encoding structures are needed to spatially multiplex information at the detector array.

In accordance with an embodiment, the disclosed approach, which uses experimental polarization measurements, provides a physics-informed pipeline for the future design of irregular and multi-scale self-assembled optical encoders. Today, there is significant interest in end-to-end design for computational imaging systems: such design includes the digital optimization of a large number of parameters followed by computations that identify the ideal optical system for a task-specific project. In contrast, by drawing insights from their specific material features' analog optical responses, one may pursue new routes for low-cost metamaterials. The contribution demonstrates interpretable machine learning predictions with self-assembled films.

The optical processes at different scales are necessary in order to achieve both diffractive spread and nonlocal optical responses necessary for polarimetric compressed sensing. Both sub-wavelength and micron-scaled dimensions impact the diffracted light polarization patterns. For example, in the disclosed configuration, neither films of random nanofibers nor solid colloid structures alone produce polarization-corrugated Debye rings in a manner suitable for full-Stokes polarimetric sensing. Films with greater disorder exhibit smaller absorption resonances and lower phase retardance.

Since the phenomena that arise from nanoscale defects and multi-scale, hierarchical structures are difficult to simulate, one's understanding is relevant to ongoing efforts that bridge image processing, machine learning, and optical materials research. The role of multi-level structures is important since it enables the efficient spatial multiplexing of data. Meso-order in such scattering encoders is key: diffuse, disordered materials spread information as necessary for compressed sensing of beam direction, while greater periodicity in ordered structures enhances the phase retardance of the diffracted modes to provide full-Stokes signatures.

In accordance with an embodiment, a suite of opportunities to employ large-area self-assembled metaphotonic encoders for hybrid sensing and imaging are envisioned. Even though the polarization-modulation response of PANI-HS is relatively weak compared to conventional metasurfaces, it offers full-Stokes polarimetric sensing via patterns that are rather easily measured and interpreted with a NN.

In accordance with an embodiment, a panoply of conducting nanofiber materials, PANI offers potentials for reconfigurable, electrochemically tuned sensing applications. These metasurface applications have already been explored with great enthusiasm. In accordance with an embodiment, for polarimetric sensing, PANI-HS exhibits a lower degree of loss associated absorption compared to noble-metal metasurfaces. PANI's metaphotonic response may be attributed to both dielectric and metallic optical scattering properties. At sub-wavelength-thicknesses, the PANI-HS film is largely transparent. The pooled scattering of PANI-HS from its low-loss, conductive properties points to opportunities for both conventional and non-coaxial imaging geometries.

In accordance with an embodiment, no assumptions were made about whether insects see CP or DoP: additionally, PANI is not similar to the biopolymers found in nature. Even so, the most salient differences are rooted in the scale and dimensions of the structures on the disclosed encoder as they are on insect cornea. Insect corneal structures carry lattice constants approximately half the dimensions of those used in this disclosure; where the fabricated structures are designed to work in the visible regime, insect corneal nanostructures would scatter in the UV. The sensitivity of insect vision in the UV is known and has been demonstrated. Additionally, since the UV regime is not flooded by the background photon noise that arises from terrestrial, thermal, infrared radiation, and clouds, etc., the advantage to sensing in the UV involves cleaner signals than those in the visible. Further inquiries along this line (under the heading information theory for self-assembled optical encoders) offer new areas for future work.

EXPERIMENTAL

Chemicals

Styrene, potassium persulfate (KPS), sodium dodecyl sulfate (SDS), aniline, ammonium persulfate (APS), were purchased from Sigma-Aldrich. Toluene, HCl, $H_2SO_4$ and $H_2O_2$ of chemical reagent grade were purchased from Fisher Chemicals. All the chemicals were used as received without further purification.

Synthesis of PS Nanospheres

Monodispersed 720 nm PS dispersions were prepared by emulsion polymerization. 10.092 g SDS and 0.0836 g KPS were dissolved in 40 mL ethanol and 16 mL $H_2O$ in a 250 ml three-neck flask with $N_2$ gas. Then 3.76 mL of styrene was added under rapid stirring. The emulsion solution was heated to 70° C. and maintained for 8 h. The PS nanospheres were washed with ethanol 5 times before the assembly.

Interfacial Assembly of PS Nanospheres

A 300 mL crystallizing dish was filled with water to provide the air-water interface for the assembly. A dispersion of 5 wt % PS nanoparticles in a mixture of ethanol/$H_2O$ (v/v=1/1) was pumped at a speed of 0.01 mL/min to the air-water interface. The PS nanosphere assembly was collected on a glass substrate which has been pretreated with $H_2SO_4/H_2O_2$ (v/v=3/1) at 80° C. for 30 minutes. The PS nanosphere assembly was dried at room temperature and heated at 60° C. for 1 hour to help stabile.

Synthesis of PANI Hollow Sphere (PANI-HS) Film

In a typical synthesis, 18 mL of concentrated HCl was added to 180 mL of $H_2O$, followed by the addition of 111 μL of aniline and 0.306 g of APS. The solution was stirred for 3 minutes to obtain a homogeneous PANI growth solution. The glass substrate with the PS assembly was then inserted into the PANI growth solution with the PS side down. After 15 hours, the PS-PANI film was removed from the growth solution. The sample was dried at room temperature, followed by removal of the PS nanospheres by toluene.

Characterizations

The structure of the PANI fibers, the PANI-HS and the PS array was characterized by a Thermo Fisher Scientific NNS450 scanning electron microscope. The samples on glass substrates were sputter-coated with Pd/Pt and characterized at 20 kV. Digital images of the Debye rings were taken by using an iPhone camera. The polarization data was taken with a PAN5710VIS polarimeter. The digital images in FIG. 8 were taken with a Thorlabs CS505MUP-Kiralux polarization camera.

Nature-Inspired, Meso-Ordered, Multi-Scale Structures Enable Wide-FOV, Polarimetric, Compressed Sensing Fisher Information in Diffraction Among different formulations of information that establish metrics for understanding optically measured data, Shannon entropy, Fisher information, or a combination are standard. A formulation of the intensity probability density function, for example, can be used to interpret optical sensor measurements.

Position Estimates with a Diffracted Ring

As an initial calculation, the information was computed from a heuristic ring-shaped diffraction pattern without any polarization information or polarization-dependent intensity corrugation. The changes in geometry from this ring shape shifts the Fisher Information.

Figure 12B:
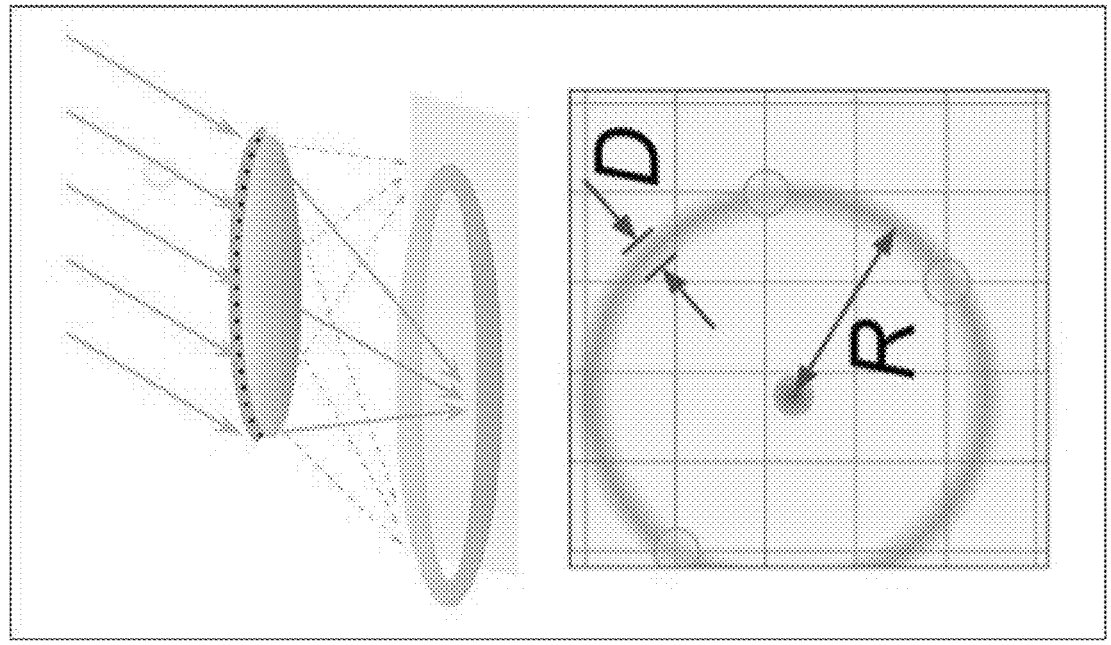
FIGS. 12A and 12B are illustrations of a collimated beam incident on a colloidal film or powder that produces a diffracted ring in accordance with an exemplary embodiment.
Figure 12A:
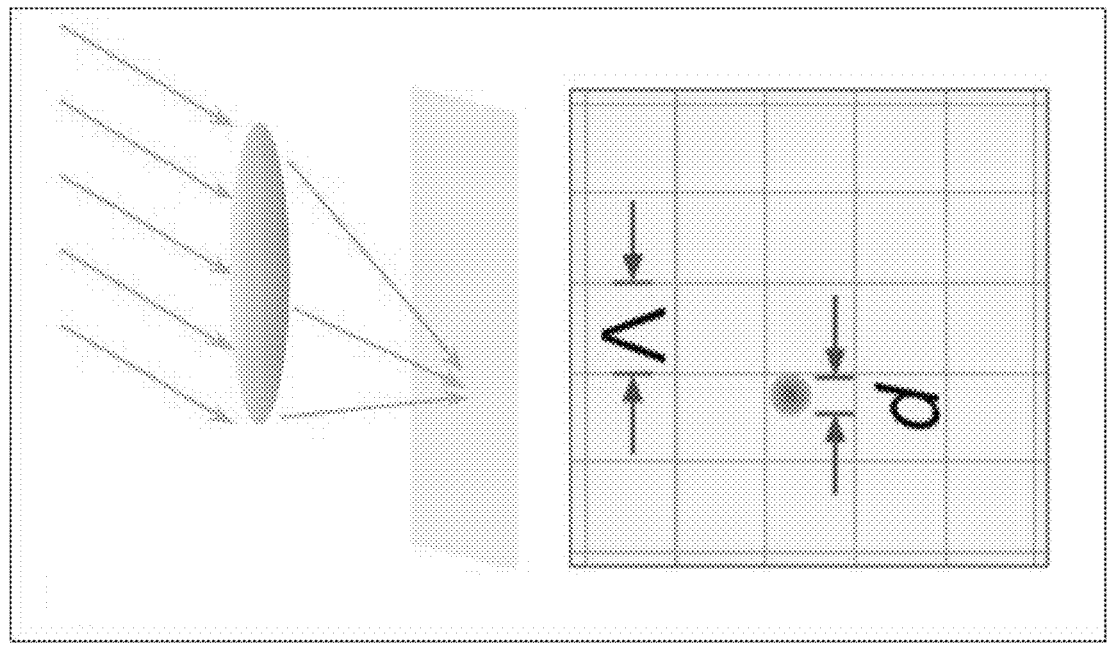

Consider a collimated beam incident on a colloidal film or powder produces a diffracted ring, also referred to as a Debye ring in the main text (FIGS. 12A and 12B). As an imaging system, this ring would be a point spread function from a point source located at infinity. In this section, the point source is referred to as the emitter and the sensor as a receiver.

The Fisher information of a probability density function of the hidden parameter vector Θ (typically the estimated parameter) is parameterized by x (associated with the measurement) P(x|Θ))) is:

$$I_{i,j} = \int \frac{\partial P(x \mid \Theta))}{\partial \theta_i} \frac{\partial P(x \mid \Theta))}{\partial \theta_j} P(x \mid \Theta)) dx \quad (1)$$

In this case, any the emitter-side variables are contained within Θ) and any receiver-side variables (e.g., spatial coordinates on a sensor) are contained within x.

The relative information contained in the ring was calculated and compared to the diffraction-limited spot to predict the location of the emitter. For a diffraction-limited spot with diameter d, the Nyquist sampling limit refers to the minimum sampling dimension needed to capture the spot size or a grid sample dimension of $\wedge < d$. A colloidal film with an average lattice spacing of a over the lens will scatter light into a ring of radius $R=\sqrt{3f\lambda}/2\alpha$, where f is the focal length of the lens and $\lambda$ is the wavelength of light. The thickness of this ring D relates to the order parameter of the colloid and the pupil diameter of the lens. The capacity to track an object's position (with higher resolution than the periodicity of the sampling) increases in the presence of the colloid and when D is large, when the pupil diameter is small, or when the colloid is more randomly organized.

To calculate the Fisher information of a colloidal film emitter, the probability density function of a measurement made at the receiver $P_r$ [Eq. 3] is required. One can compare this to a simple Gaussian emitter-receiver pair $P_g$ [Eq. 2]:

$$P_g(x, y \mid \delta_x, \delta_y) = A e^{-\frac{(x-\delta_x)^2 + (y-\delta_y)^2}{d^2}} \quad (2)$$

and $$P_r(x, y \mid \delta_x, \delta_y) = B e^{-\frac{\left(\sqrt{(x-\delta_x)^2+(y-\delta_y)^2}-R\right)^2}{D^2}}, \quad (3)$$

The normalization constants A and B are:

$$A = \frac{1}{\pi d^2}; \quad B = \frac{2}{DR\sqrt{\pi}\left(\Gamma\left(\frac{R}{D}\right)+1\right) + D^2 e^{-\frac{R^2}{D^2}}}. \quad (4)$$

To be explicit, $x=[xy]^T$ are the sensor coordinates, $\Theta=[\delta_x \; \delta_y]^T$ are the coordinates of the center of the emitted beam (that reveals the direction of the object). Cylindrical-coordinate variables $\tilde{r}=\sqrt{(x-\delta_x)^2+(y-\delta_y)^2}$ were substituted and integrated. The Fisher information matrix of $P_g$ is $$I_g = 2\pi A \begin{bmatrix} 1 & 0 \\ 0 & 1 \end{bmatrix} \quad (5)$$

However, the Fisher information matrix of the ring is given by the following integral (after a transformation to the cylindrical coordinates: $(\tilde{r}, \phi)$):

$$I_r = \beta \int\int \frac{4(\tilde{r}-R)^2 e^{-\frac{(\tilde{r}-R)^2}{D^2}} \cos^2\phi}{D^4} \begin{bmatrix} 1 & 0 \\ 0 & 1 \end{bmatrix} d\tilde{r} d\phi \quad (6)$$

Figure 13:
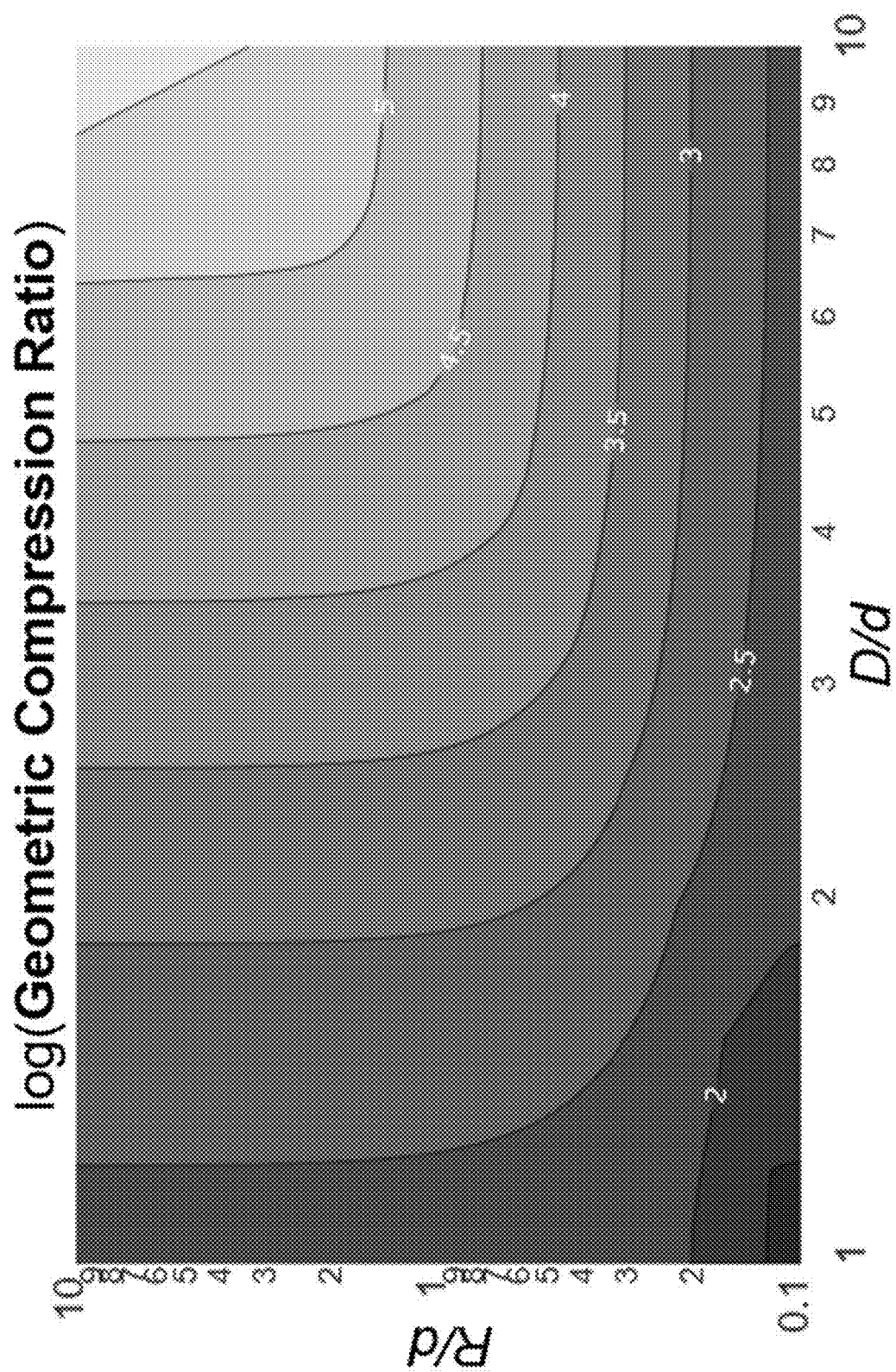
FIG. 13 is an illustration of ideal compression ratios of position estimation using Debye ring encoding given a Debye ring with width, D, and a radius, R versus a standard Gaussian beam with diameter d. Contours show a compression ratio»1 but increasing as the width of the Debye ring increases with respect to the size of the Gaussian reference and as the ring grows larger with respect to the width of the Gaussian reference. d/D is unbounded and R/D ε(0,1).

A compression ratio, C, is defined as the ratio of the information contained in our augmented probability density function of the diffracted ring to the information within the standard optical communication of the Gaussian:

$$C = I_r/I_g \quad (7)$$

$$= \frac{\pi}{\sigma^2} \frac{\rho\sqrt{\pi}\left(\mathrm{erf}\left(\frac{\rho}{\sigma}\right)+1\right)e^{\frac{\rho^2}{\sigma^2}} + 2\sigma}{\rho\sqrt{\pi}\left(\mathrm{erf}\left(\frac{\rho}{\sigma}\right)+1\right)e^{\frac{\rho^2}{\sigma^2}} + \sigma} \quad (8)$$

where $\sigma=D/d$ and $\rho=R/d$. The compression ratio is illustrated in FIG. 13. Equation 8 indicates that D is significantly large when D>d (when sample is less ordered) and R>d (when the lattice spacing is small).

Fisher Information Using Experimental Data

In this section, the approach with Fisher information in the previous section was extended to numerically incorporate sparse, linearly polarized sensor measurements shown in FIG. 12. The Debye ring polarization is modulated. This modulation depends on the direction of the emitter or the incident angle. The compression ratio is calculated with Eq. 15 when $p(x, \Theta))$ was appropriately chosen via polarization filtering.

It was determined that the information of the emitter position conditioned on the input polarization with respect to polarization filtering at the receiver/sensor. The geometry of the scattered/diffracted beam enables prediction of the incident angle or emitter position for object tracking.

In contrast to the previous section where a functional form for the Debye ring is present, the information was computed from experimental data. A continuous formulation of Fisher information was augmented to account for discrete sampling of signals, which offers a pseudo-probability density functions. As before, the Fisher information, I, of a continuous probability density function, p, is parameterized by the spatial variables x and y of the hidden variables $\delta_x$ and $\delta_y$:

$$I = \int\int \begin{bmatrix} \frac{\partial \log p(x, y, \delta_x, \delta_y)^2}{\partial \delta_x} & \frac{\partial \log p(x, y, \delta_x, \delta_y)}{\partial \delta_x} \\ \frac{\partial \log p(x, y, \delta_x, \delta_y)}{\partial \delta_x} & \frac{\partial \log p(x, x, \delta_x, \delta_y)}{\partial \delta_y} \\ \frac{\partial \log p(x, y, \delta_x \delta_y)}{\partial \delta_x} & \frac{\partial \log p(x, y, \delta_x, \delta_y)^2}{\partial \delta_x} \\ \frac{\partial \log p(x, y, \delta_y, \delta_y)}{\partial \delta_y} & \end{bmatrix} p(x, y; \delta_x, \delta_y) dx dy \quad (9)$$

Up to this point, this is a direct formulation of the simple 2-D tracking demonstrated with analytic probabilities in the previous section. Since both emitter and receiver lie in the xz-plane, the odd-symmetry of the off-axis elements reduces the off-axis elements to zero (as detailed in the previous section).

In accordance with an embodiment, the result was extended, and the input angle of the emitted beam was tracked while changing input polarization. The measurements are also through linear polarizers at ±45°. In other words, any information calculation derived from this formulation on any collection of measurements described up to this point will simply be the information about the input angle given the condition of input polarization through a specific linear polarization, or $I_{+45°}$ (input angle|input polarization); one can further reduce the space that was investigated by simulating n evenly spaced discrete output detectors, $I_{\pm45°}^n$ (input angle|input polarization). Both halves of each sensor plane image (±45°) were normalized. The resulting information is the sum of both polarized measurements. This yields expressions for conditional information that indicate the minimum possible uncertainty of estimating beam direction given a specific input polarization and a certain number of detectors. The integration and differentiation numerically were carried out in python [See GITHUBURL]. The total conditional information given by an array of m detectors is shown in FIG. 14A.

Figures 14A, 14B:
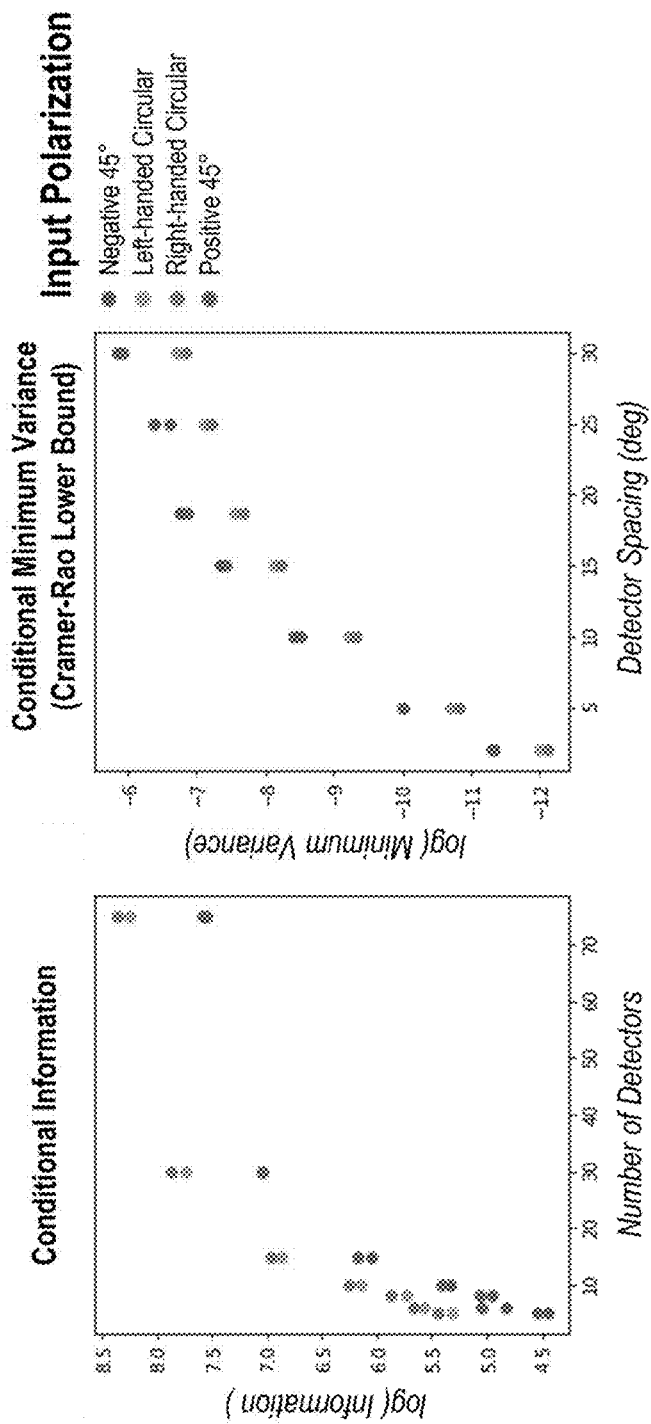
FIG. 14A is an illustration of conditional information of source angle with respect to each tested polarization given number of detectors.
FIG. 14B is a minimum variance of an estimator estimating source angle given a particular polarization.

The conditional Fisher Information associated with the experimental data was plotted as a function of the detector spacing in FIG. 14B. The minimum variance or Cramer-Rao Lower Bound (CRLB) is the inverse of the information. In the main text, the CRLB average value of these measures of conditional information and use that as criteria for CRLB estimate (FIG. 10D).

Fabrication and Material Characterization of PANI-HS

A similar method PANI inverse opal structures was used, where off-resonance dipole scattering from PANI nanofibers was identified. While many optical applications leverage the strong localization of fields through nanophotonic resonances, off-resonant scattering confers opportunities for manipulating the polarization of light without tremendous concern for the phase changes induced by a single scattering event. By employing off-resonant scatterers with smaller-absorption cross-sections in periodic nanostructures, the fabrication tolerances were eased at the nanoscale and promote a higher degree of resilience with fabrication. In order to improve cavity effects within the domain of self-assembled structures, hollow-sphere photonic-crystal films were fabricated. The hollow-sphere structure doubles the volume of PANI compared to an inverse opal film; correspondingly, an increase in the strength of the scattered, diffracted light was observed.

Light incident on an ideal 2D lattice diffracts largely into a hexagonal array of points that correspond to the six reciprocal lattice vectors of the particle array. However, if the lattice exhibits some degree of rotational disorder, the diffraction will form a continuous ring that is often referred to as a Debye ring, which refers to light diffraction into a specific angle $\theta_d$.

$$\theta_d = \sin^{-1}\left(\frac{2\lambda}{\sqrt{3}d}\right), \quad (10)$$

where $\lambda$ is the wavelength of the incident angle, d is the diameter of the sphere. This angle of diffraction also represents the circle in k-space with radius $k_\perp$ of the metagrating diffracted mode, $$k_\perp = \frac{2\pi}{\lambda}\sin(\theta_d) = \frac{4\pi}{\sqrt{3}d} \quad (11)$$

The film is polycrystalline with some dislocations and rotational disorder. Optical microscope images of six randomly selected regions (55 µm×55 µm each) were taken on the PANI-HS sample, and then obtained their Fourier-space patterns. As shown in FIG. 12E, the Fourier transform patterns are composed of hexagonal arrays, where the distance between each mode is shown. These images indicate that our samples are highly ordered but polycrystalline and that the rotated ordered domains are at least 55 µm×55 µm in area.

To further quantify the degree of ordering by using this synthesis approach, the distribution of PANIHS in three randomly chosen areas was analyzed, and their 2D pair correlation function, g(r) was calculated.

$$g(r) = \frac{h}{\langle \rho \rangle} \frac{dn(r, r+dr)}{da(r, +dr)} \quad (12)$$

where a is the shell area and dn is the number of holes that lie within a spherical shell. The statistical average of holes is normalized by the average particle number density $\langle \rho \rangle$ and the sampling area $d\alpha=2\pi r dr$. The pair correlation function of PANI-HS and a perfect lattice is plotted in FIG. 13A. FIG. 13B shows the first peak of the Fourier transform of each g(r). The full width at half maximum (FWHM), κ, for the first peak of g(r)−1 to that of a perfect lattice ($K_0$) was comparted. The ratio of $K/K_0$ is used to quantitatively determine the ordering of the photonic structure, and average from the three areas. A structure with $K/K_0 \leq 1.5$ is considered very highly ordered. The $K/K_0$ for the PANI-HS is 1.40, indicating a very highly ordered structure with a little difference from a perfect lattice.

Polarization Characterization of PANI-HS
Diffractometry Measurements

Mueller matrix diffractometry measurements are performed using Mueller matrix microscope equipped with a Bertrand lens. The sample is illuminated with a collimated beam, which is collected by a high NA microscope objective. The Bertrand lens focuses the back focal plane of the objective onto the camera, so that it is possible to image the angle-resolved diffraction of the colloidal samples. This instrument uses a computer controlled polarization state generator and a polarization state analyzer to probe the sample with different polarization states, allowing the automatized measurement of the 16 Mueller matrix elements.

Figures 15A, 15B:
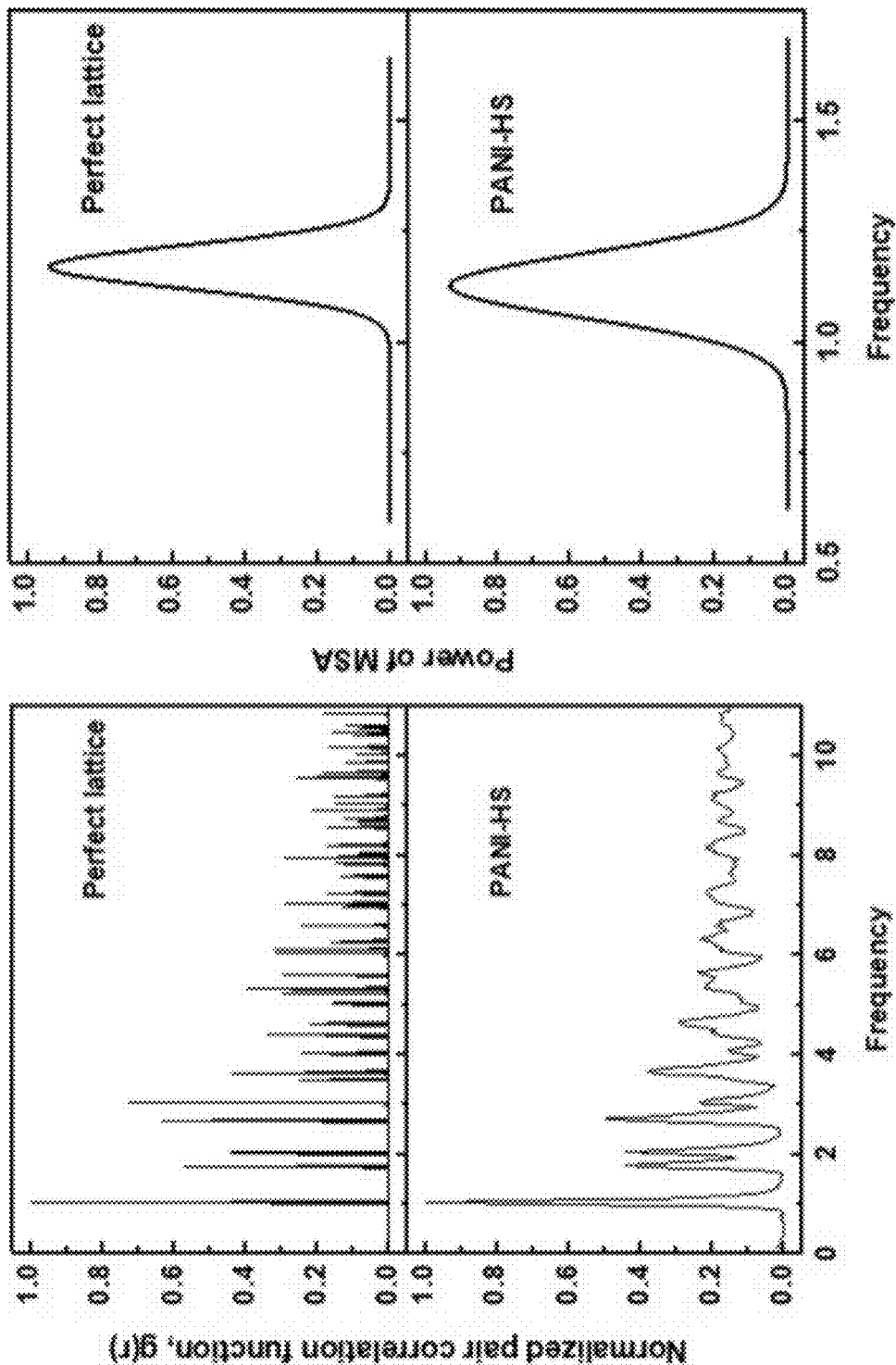
FIGS. 15A and 15B illustrate an analysis of the order parameter associated with our colloidal samples.
Figure 16C:
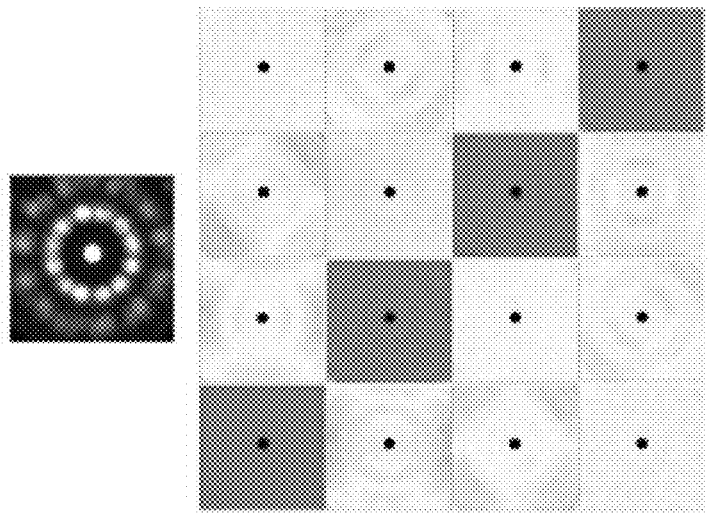
FIGS. 16A-16C illustrate Mueller matrix diffractometry results on a single-crystal (PANI-HS) (FIG. 16A), Polycrystal (PANI-HS) (FIG. 16B) and polycrystal (PS) (FIG. 16C). All Mueller matrix elements have been normalized to the first element. Top images show the measured intensity patterns.
Figure 16B:
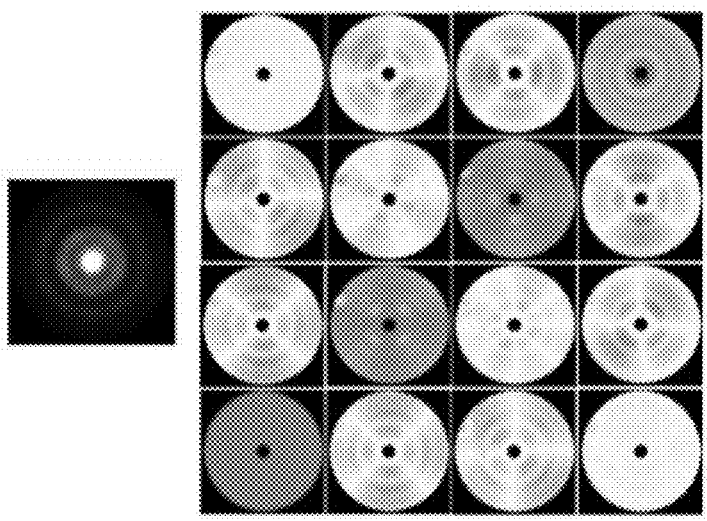
Figure 16A:
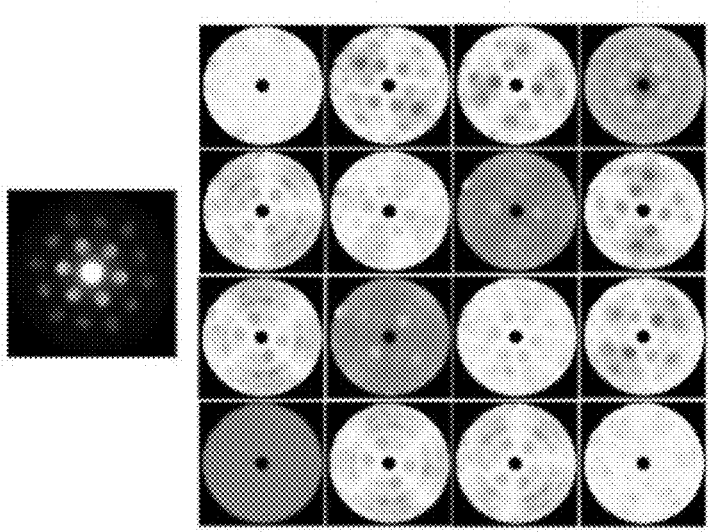

The Mueller matrix analysis of the single-crystal PANI-HS, poly-crystal PANI-HS, and polycrystal PS with 2-µm spacing is shown in FIGS. 16A-16C. In these measurements the light source was a 550 nm LED and the objective used is a Planachromat 50× with 0.95 NA. In the case of single crystals (FIG. 15A) the observed diffraction pattern is a direct representation of thy reciprocal lattice of crystal.

Polarimetric Characterization at Normal Light Incidence

At normal incidence, one can vary the input polarization and measure the polarization states at different diffraction angles. As shown in FIG. 17A, the solid green arrow represents the incident and direct transmitted light. The green dashed arrows indicate the angle of the Debye ring. A polarimeter moves from −60° to 60° to detect both power and polarization states of the forward scattered light. The input polarizations are +457-45° linearly-polarizations (LP), and right-/left-circular polarizations (RCP and LCP). As an intuitive visual presentation, toe polarization states of 0° to +60° are slotted in a Poincare sphere for toe 4 types of polarizations (FIG. 17B). A sharp transition that occurs from toe detection angle of 0 to toe diffracted ring angle was observed, basically equivalent to a 90-degree trajectory in the Poincare sphere. A detailed power and polarization states distribution is shown in FIG. 17C. The first bar clearly shows that the power of the scattered light increases off the transmission direction, indicating that the angle to the Debye ring is around 55°. The actual power of scattering was normalized by toe power of direct transmission) (0°) and re-scaled between 0 to 1. At a detection output angle of 0°, the polarization of toe transmitted light is the same as the incident light. However, at the detection angle of 52°, elliptically polarized light is detected for +45° and −45° LP light and linearly polarized light is detected for RCP and RCP light, again showing a significant polarization change around the Debye ring.

Polarization Transformation Around the Debye Ring

Figures 18A, 18B, 18C:
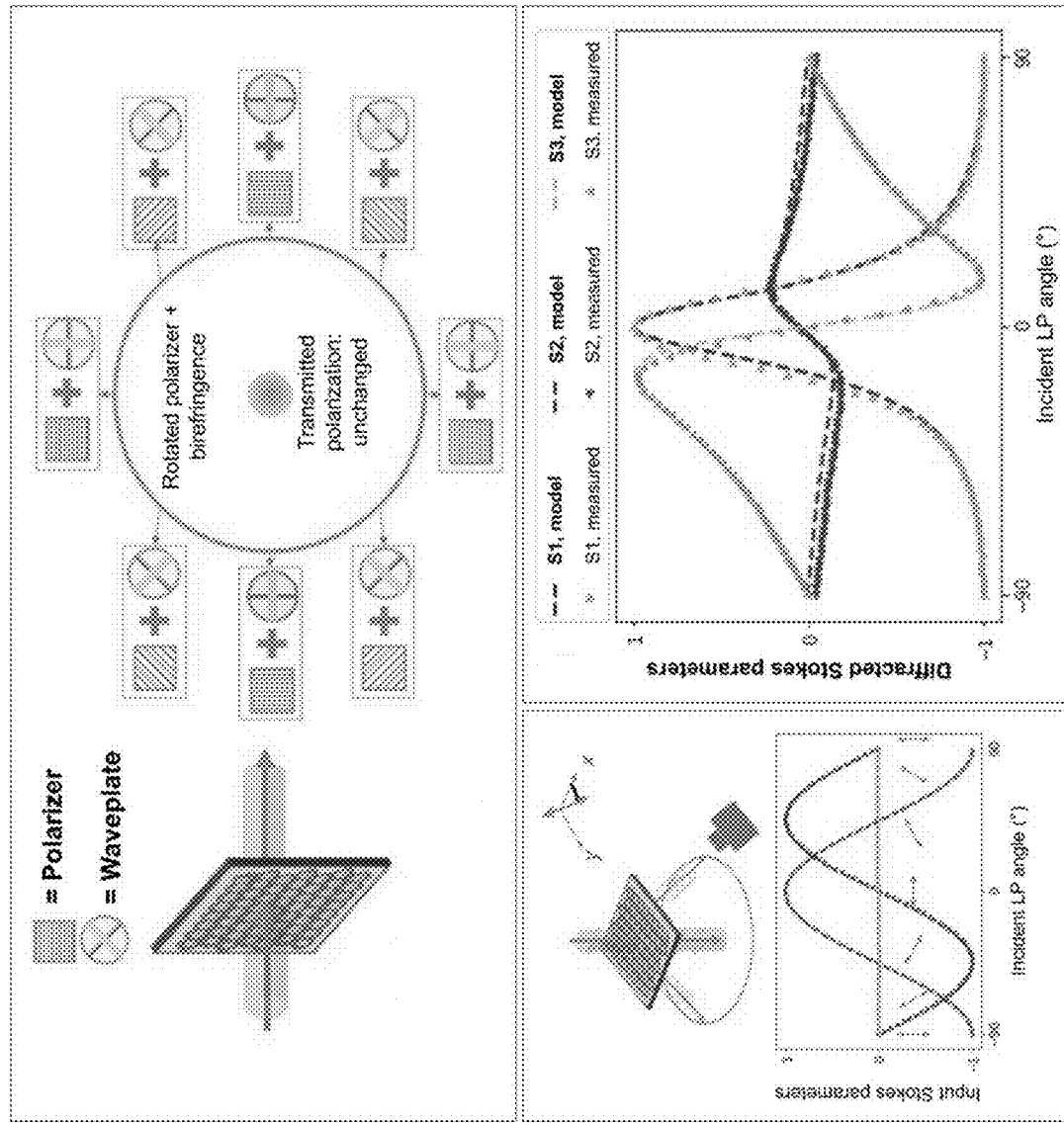
FIGS. 18A-18C are illustrations of an exemplary model and measured polarizations a normal incidence.

FIG. 18A is an explanation of a model in accordance with an exemplary embodiment. Approximately 0.1% of the incident light is diffracted in the Debye ring. The Debye ring polarization at each location appears as light has been transformed by a rotated polarizer and rotated waveplate. The rotation corresponds to the azimuthal angle 0o—As explained in the main text, a coherent Jones-matrix model is fit with two underlying contributions to the polarization transformation: a local scattering term that yields an azimuthally polarized Debye ring $J_{pol}$, and a phase retardance that arises from weak, radial grating modes $J_{wp}$:

$$E_{out} = J_{tot} E_{in} \quad (13)$$

$$= [aJ_{pol} + b\exp(i\gamma_{rel})J_{wp}]E_{in} \quad (14)$$

where the ratio of $\alpha$ to b identifies the relative linear scattering to the birefringent term and $\gamma_{rel}$ represents the relative phase between the two matrix transformations. Equation 14 indicates that different locations on the Debye ring provide sampled portions of the input beam that are filtered with a rotated polarizer and rotated wave plate. Both $J_{pol}$ and $J_{wp}$ depend on the sampled azimuthal location on the Debye ring $\phi_0$:

$$J_{pol} = R(-\phi_0)\begin{bmatrix} 0 & 0 \\ 0 & 1 \end{bmatrix} R(\phi_0) \quad (15)$$

$$J_{wp} = R(-\phi_0)\begin{bmatrix} 1 & 0 \\ 0 & \exp(i\gamma_{ret}) \end{bmatrix} R(\phi_0), \quad (16)$$

where $\gamma_{ret}$, is the phase retardance and $\phi_0$ is measured with respect to the x-axis, and $$R(\phi_0) = \begin{bmatrix} \cos(\phi_0) & -\sin(\phi_0) \\ \sin(\phi_0) & \cos(\phi_0) \end{bmatrix}$$

is the rotation matrix associated with azimuthal location $\phi_0$. This model asserts that, when light diffracts at an azimuthal angle $\phi_0$ (in the x-y plane), there is a grating mode that retards the phase for the light polarized along this axis.

In accordance with an embodiment, the exemplary model was converted from Jones to Stokes parameters. The input and diffracted Jones vectors $E_{in}=E_o[A_y, A_y\exp(-i\delta)]^T$ are shown with Stokes measures $S_1=A_x^2-A_y^2$, $S_2=2A_xA_y \cos(\delta)$, and $S_3=2A_xA_y \sin(\delta)$, where $A_x^2+A_y^2=1$. Additionally, $\delta=+1/2$ and $S_{3+1}$ for RCP/LCP, respectively.

Subsequently, the PANI-HS sample with linearly polarized light was interrogated at normal incidence. The experimental Stokes parameters are measured by the polarimeter at a fixed location as the input polarization is changed with a half-wave plate. FIG. 18B shows the experimental geometry and the corresponding Stokes parameters corresponding to the input beam. The graph shows the transmitted beam reference Stokes parameters without the sample in place.

In FIG. 18C, both experimentally measured diffracted Stokes values alongside that from the exemplary model are shown. The corresponding model is consistent with the measurements shown in FIGS. 17A-17C when RCP and TCP interrogate the sample and the polarimeter is located at 55°. The fitting parameters $\alpha=0.75$, b=0.25, $\gamma_{ret}=-70°$, and $\gamma_{rel}=85°$ provide good agreement between our model and measurements. Small deviations were observed in S2, which may be the result of incident-angle misalignment or similar variations in the sample surface flatness.

Stokes Characterization at Nonnormal Angles of Incidence

In accordance with an exemplary embodiment, a dataset was created where the sample was interrogated with +45°, −45° linearly polarized (±45LP) and right and left circularly polarized (RCP and LCP) light and measure the power and polarization for different incident angles (−80 to 80 degrees) and output angles (−100 to 100 degrees). The input angles vary 0.2 degrees, and the output angles are measured with 0.02-degree increments. The full dataset and code for reproducing the images in this section are provided in python: GITHUBURL.

Figure 19B:
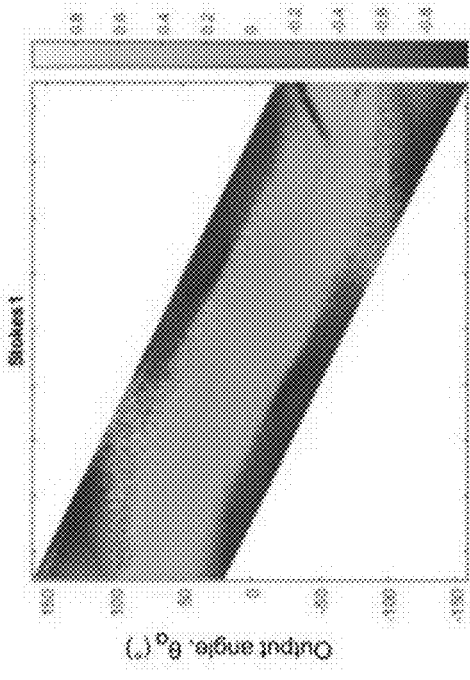
FIGS. 19A-19D are illustrations with characterization with +45-degree linearly polarized light on PANI-HS.
Figure 19D:
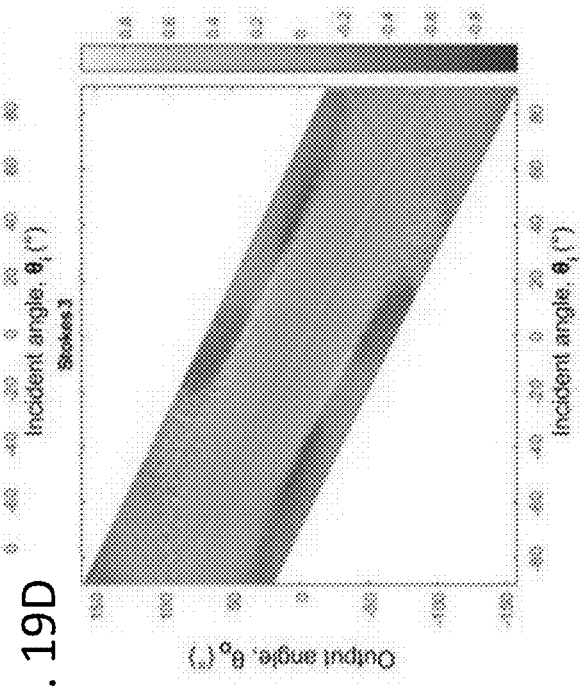
Figure 19A:
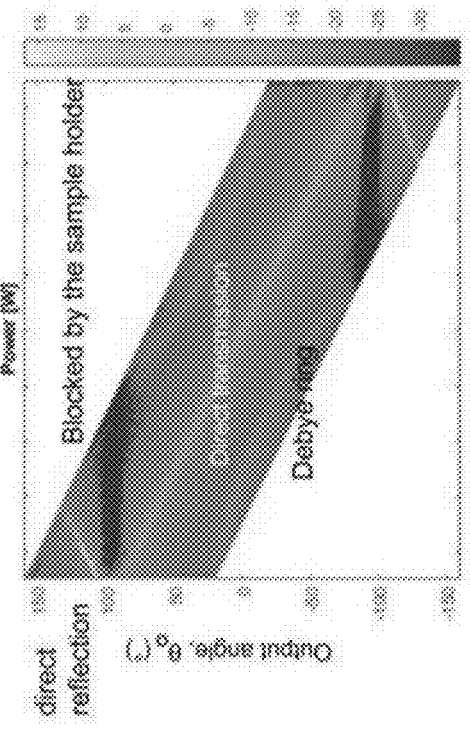
Figure 19C:
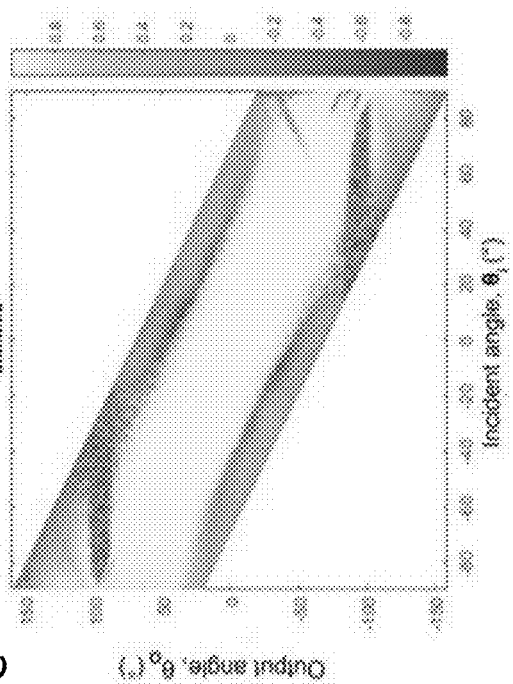
Figure 20B:
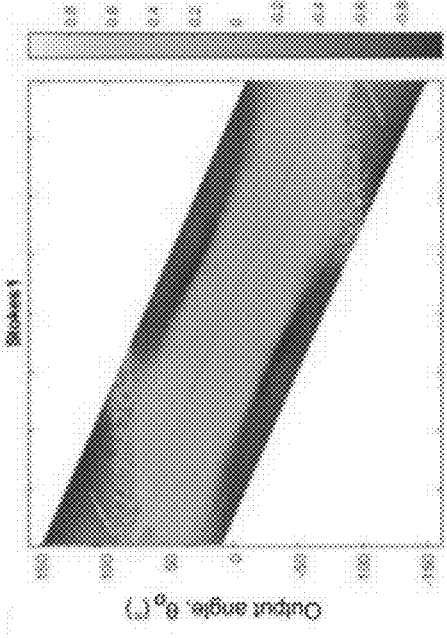
FIGS. 20A-20D are illustrations with characterization with −45-degree linearly polarized light on PANI-HS.
Figure 20D:
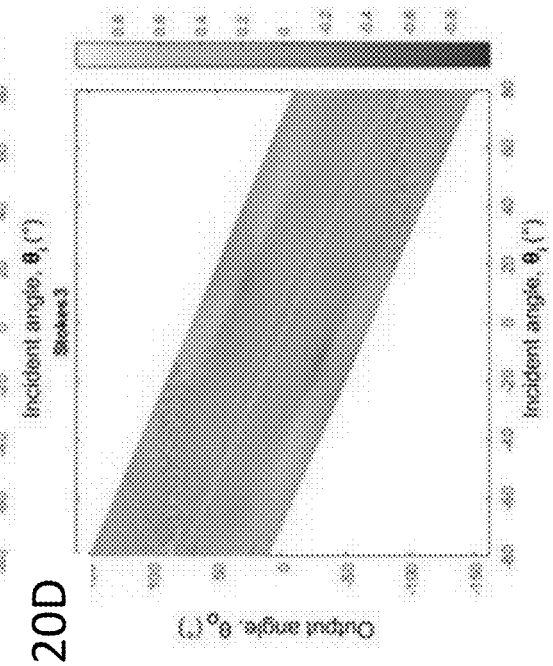
Figure 20A:
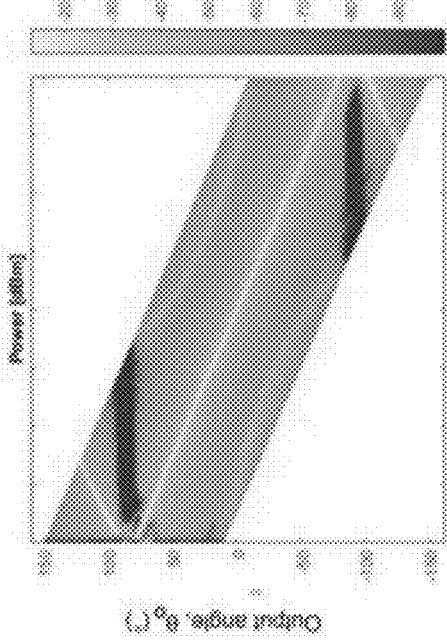
Figure 20C:
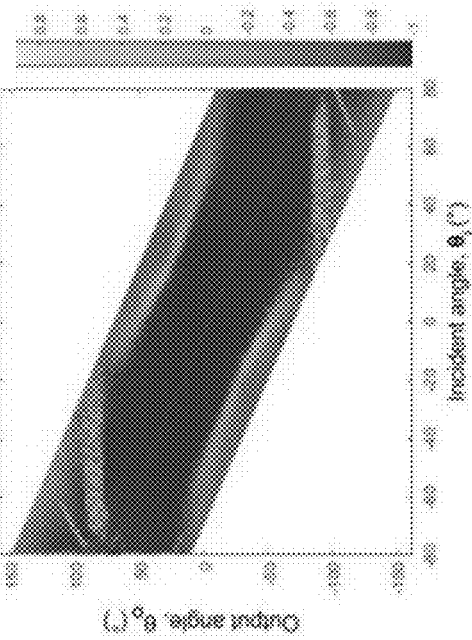

FIGS. 19A-22D show the full Stokes characterization mapping between incident and output angles for +45LP, −45LP, RCP, and LCP, respectively. FIG. 19A labels the obvious features: direct transmission, direct reflection, and the diffraction curve associated with the Debye ring. Although for each input polarization, four (4) 2-D graphs were created, which are referred to as multiparameter system as a 1-D system purely from the optical geometry: the incident beam and receiver lie in the x-z plane. If measurements are additionally in the y-z plane, then the system would be 2-D, and if the position of the emitter varied with z, then a 3D system could be generated.

Figure 21A:
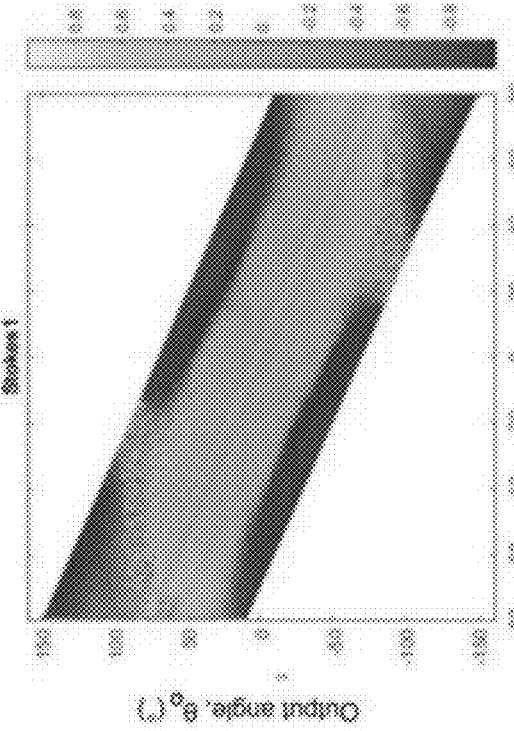
FIGS. 21A-21D are illustrations with characterization with RCP polarization incident on PANI-HS.
Figure 21B:
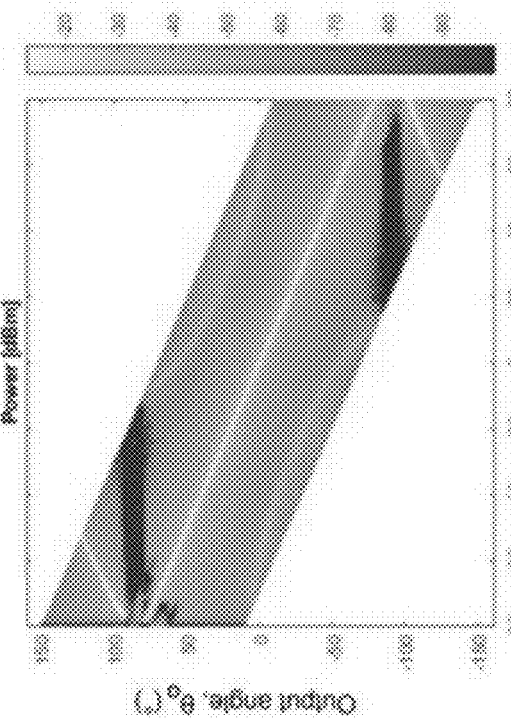
Figure 21C:
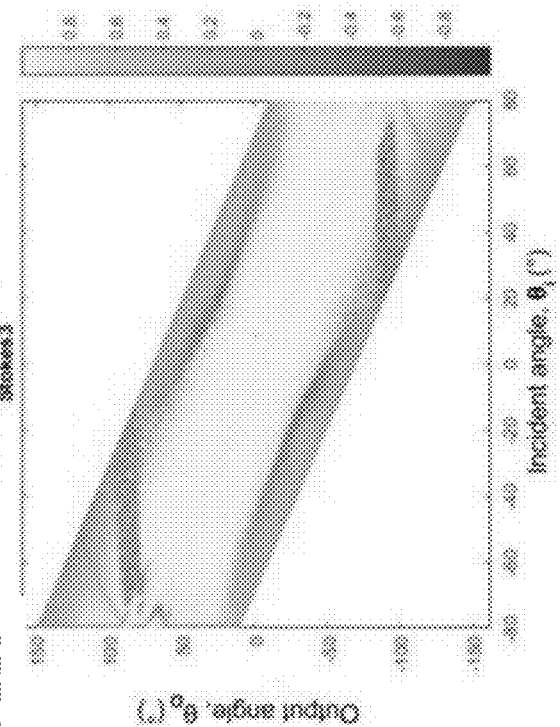
Figure 21D:
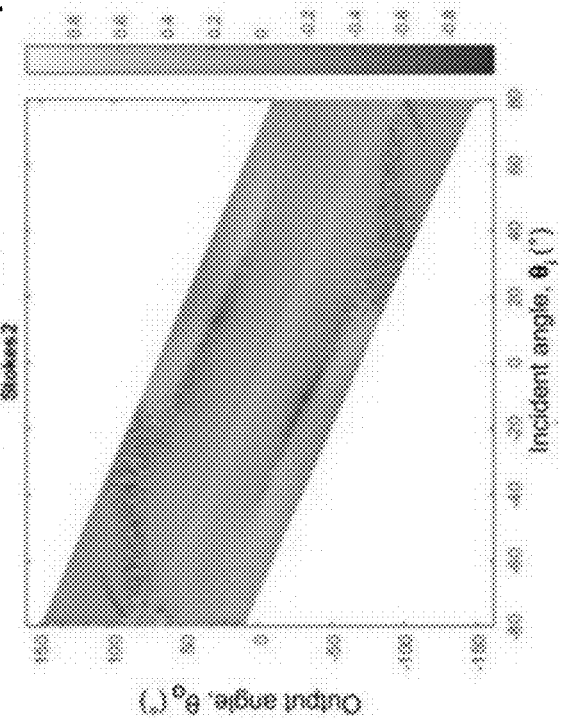
Figure 22B:
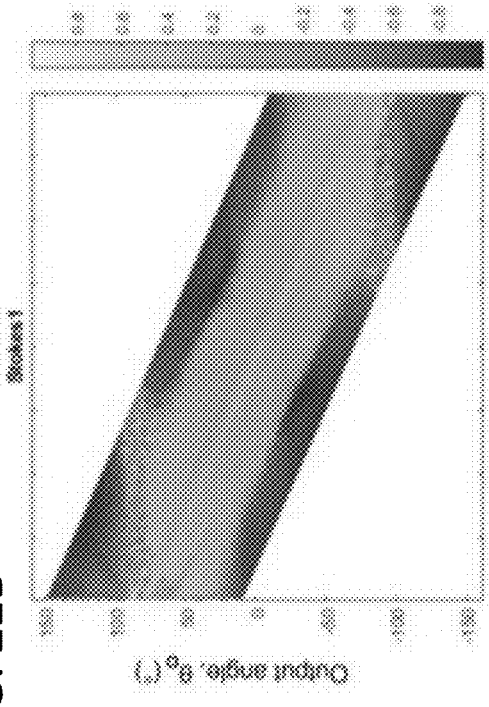
FIGS. 22A-22D are illustrations with characterization with LCP polarization incident on PANI-HS.
Figure 22D:
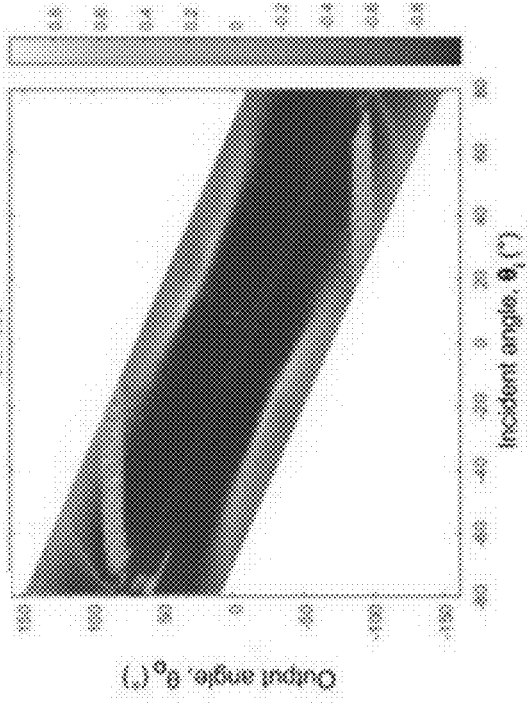
Figure 22A:
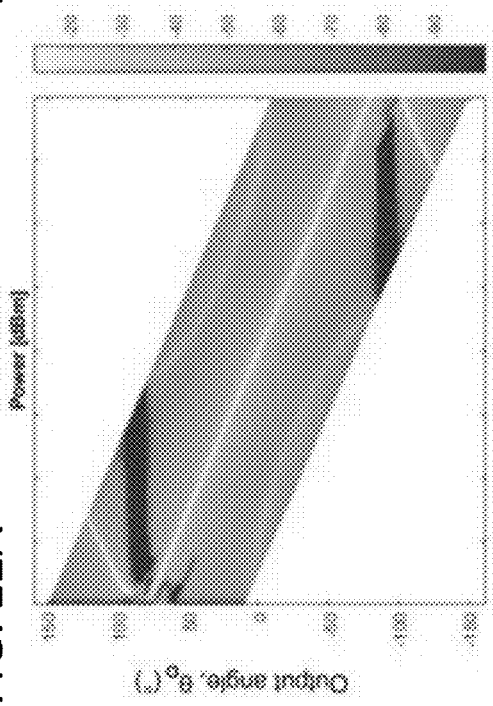
Figure 22C:
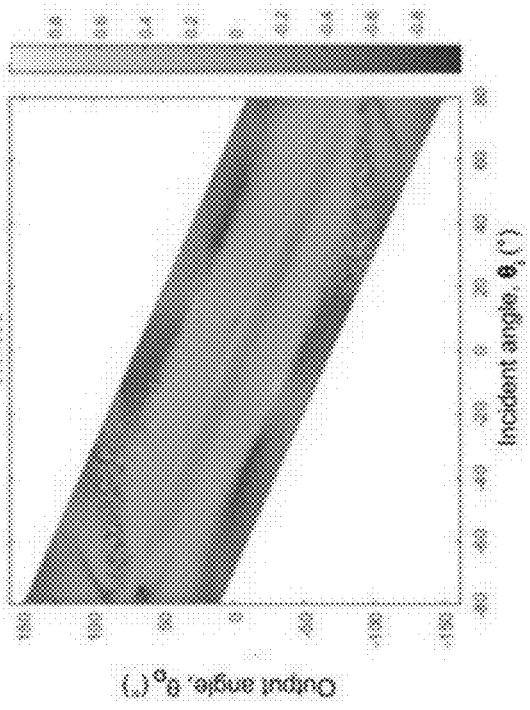

The interesting "wobble" of the polarization axis as a function of incident angle when RCP and LCP are incident was highlighted, which can be observed in FIGS. 21C and 22C. Additionally, it is interesting to notice the analogous "wobble" in the ellipticity for incident +45LP and −45LP light. Namely, the change in the $S_3$ shown in FIGS. 19D and 20D also exhibit alternating RCP and LCP components as a function of incident angle.

Figure 23B:
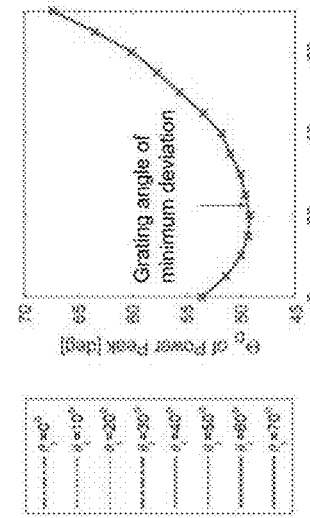
FIGS. 23A-23F are other data contours from the characterization data.
Figure 23D:
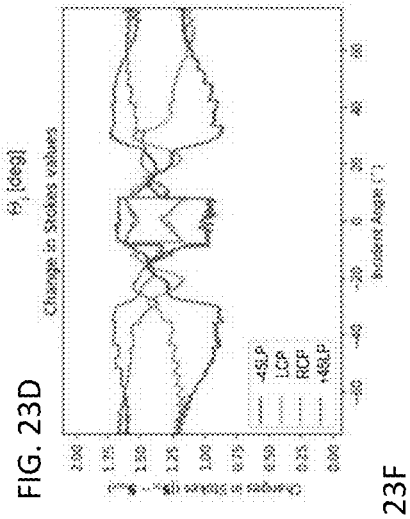
Figure 23F:
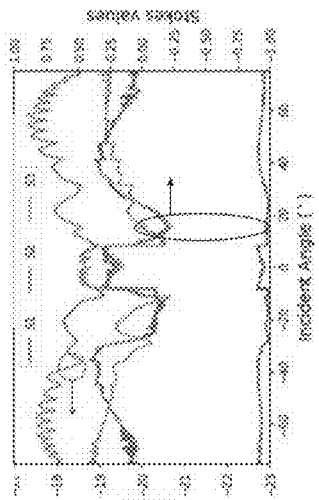
Figure 23A:
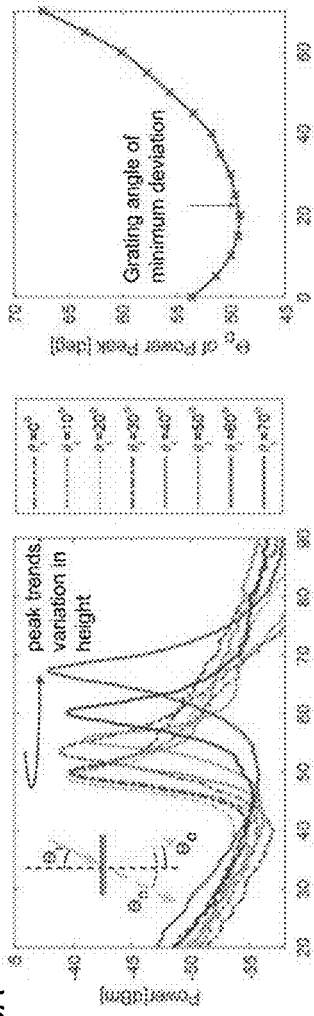

Several contours associated with the diffracted peak power in the Debye ring were plotted in in FIGS. 23A-23F to point out interesting trends, which provide intuition beyond main claims of the paper. From these plots, the diffracted angle was confirmed that follow that of the first diffracted order of an ideal grating structure. FIGS. 23A and 23B show the angle of minimum deviation for a grating analogous to the angle of minimum deviation for a prism.

Figure 23C:
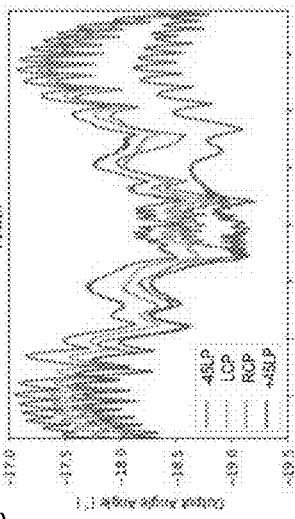
Figure 23E:
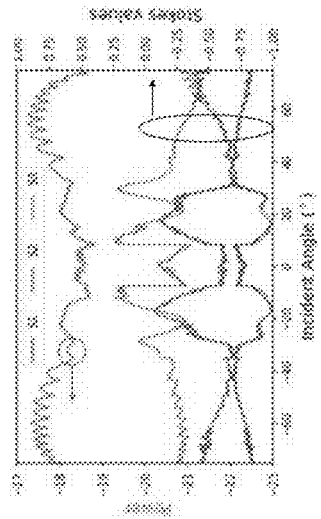

Although the diffraction angle follows that of an ideal grating, there are fringes in the intensity of the diffraction peaks associated with the finite-thickness of the PANI-HS thin film. FIG. 23C shows the highly corrugated intensity patterns for ±45LP, RCP, and LCP. In accordance with an embodiment, the sharp jumps in the changes in polarization are related to this thin-film effect. In FIG. 23D, the relative change in the Stokes parameters as measured by the Euclidean distance on the Poincare sphere $|\Delta S|=|S_{in}-S_{out}|$ are shown. This measure identifies symmetry between RCP/LCP and ±45LP but differs significantly depending on different input polarizations. FIGS. 23E and 23F show the separate Stokes parameters for incident RCP and LCP, respectively.

Linear-to-Circular Polarization Conversion

The full transformation from linear-to-circular polarization is observed with non-normal angles of incidence when light is composed of both TE and TM polarizations at an 8.5-degree angle of incidence. With the ordering ratio of $K/K_0 \leq 1.5$, circular-to-linear polarization conversion was observed as well as linear-to-circular and note that other polarizations are tuned with an angle of incidence in a manner analogous to metasurfaces that enable full-Stokes transformation and polarization tuning. (See FIGS. 24A-24C)

Transmission Resonances

Figure 25A:
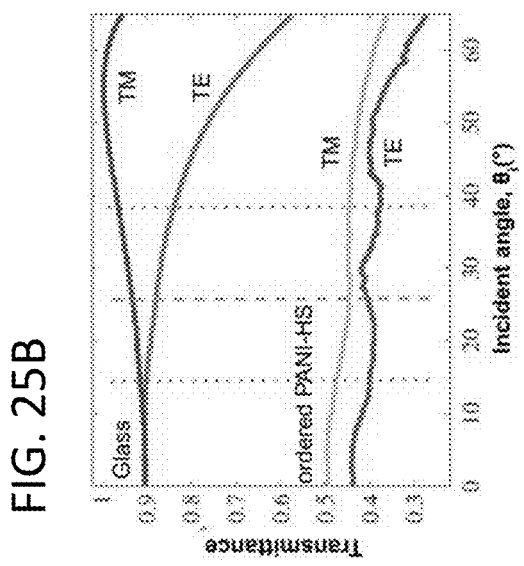
FIGS. 25A-25D illustrate experimental evidence of metasurface-like modulation polarization and depends on PANI-HS degree of order.
Figure 25B:
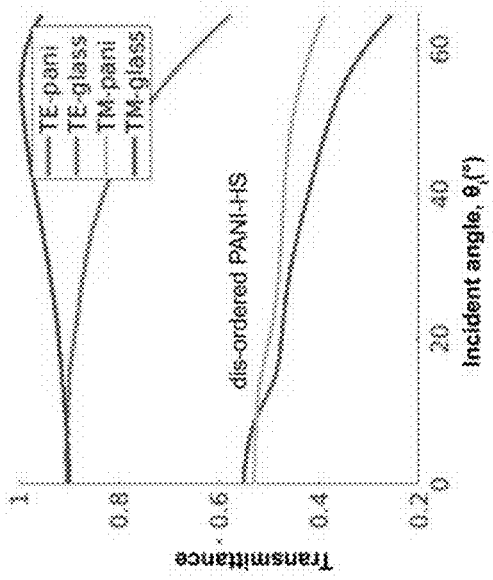
Figure 25C:
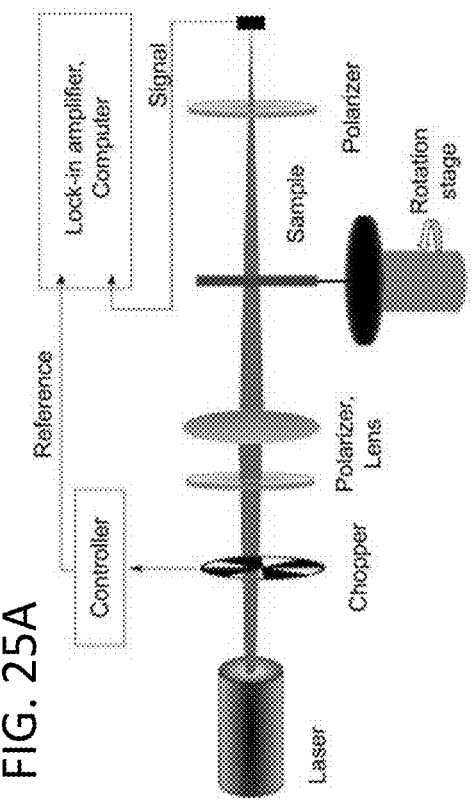
Figure 25D:
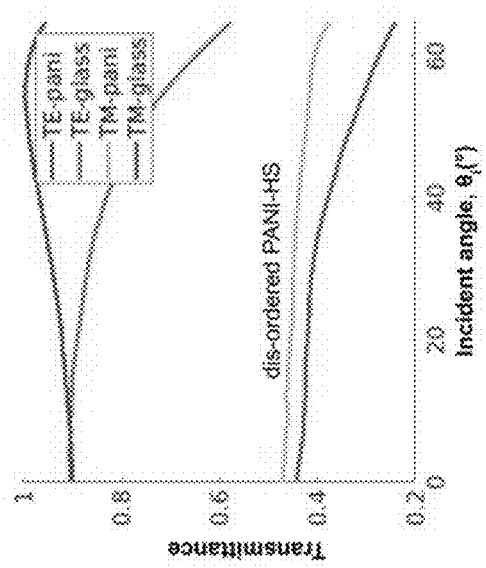

Experiments illustrating metasurface-like TE and TM resonances that depend on sample order are shown in FIGS. 25A-25B. The changes in the transmitted polarization are subtle but coincide with the polarization modulation in the diffracted patterns. The experimental setup for measurement of transmission uses a chopper and lock-in amplifier (FIG. 25A), ordered samples show the greatest degree of polarization modulation (FIG. 25B), where dotted blue and dashed gold lines indicate broad TE and TM absorption. For comparison with the ordered sample, a disordered sample, which exhibits less distinct polarization modulation was studied (FIGS. 25C and 25D). In accordance with an embodiment, the results indicate that the polarization modulation measured in the far-field is associated with the degree of order in the photonic crystal film.

Fractal, Diffraction-Encoded Space-Division Multiplexing for Free Space Optical Communication With free space optical (FSO) systems, information is generally transmitted to minimize diffraction. Here, an alternate paradigm is demonstrated in which multiple spatial bit streams are diffraction-encoded, an approach that enables a wider cone for reception and is especially robust to noise. The fact that diffracted fractal patterns or diffractals redundantly encode information over large areas as they propagate to the far field. This scheme enables a roving receiver to capture multiple spatial bits simultaneously when sampling a portion of the far-field beam. Numerical FSO studies with and without atmospheric turbulence are a basis for new design considerations governing roaming area, beam divergence, and proper diffraction encoding. Concepts related to the sparse complexity of fractal, diffracted patterns show promise for diffractal space division multiplexing and may also be applied to channel marking, sensing, imaging, and other FSO systems.

Section 1—Introduction

Although fractals are characterized by high visual complexity, their information content is low: they can be easily generated via simple, recursive algorithms. To emphasize their uniqueness, the diffracted waves from fractals as 'diffractals'. Fractal geometries and diffractal scattering have attracted widespread attention in many branches of science with applications in engineering such as digital image processing, especially image compression and antenna design. Such applications exploit a high level of information redundancy, which is organized in strongly corrugated spatial patterns.

The implications of sparsity and redundancy in diffractals for communications systems are believed to be underexplored and there is strong potential for their application in the area of wireless communications given the drive to increase data rates. In the past, communication networks have embraced other advanced modulation and multiplexing schemes. Commonly used multiplexing techniques in optical fiber communication today include space-division multiplexing (SDM) or spatial multiplexing, wavelength-division multiplexing (WDM) using disjoint frequency bins, orthogonal frequency division multiplexing (OFDM) or coherent WDM (CoWDM) using spectrally overlapping yet orthogonal subcarriers, and polarization-division multiplexing (PDM) using both orthogonal polarizations supported by a single-mode fiber for independent bit streams. Among these approaches, spatial multiplexing has recently drawn significant interest, as the technology is still under development, particularly with FSO systems.

One potential approach for FSO spatial multiplexing uses beams with orbital angular momentum (OAM). Since OAM states are mutually orthogonal, they are simultaneously transmitted or multiplexed along the same beam axis and demultiplexed at the receiver. For the same carrier frequency, the system's aggregate capacity is equal to the number of system state modes. OAM-multiplexed systems have achieved Tbit/s-scale transmission rates over free space. Additionally, others have experimentally demonstrated a free-space data link with an aggregate transmission capacity of 1.036 Pbit/s and a high spectral efficiency of 112.6 bit/s/Hz using 26 OAM modes simultaneously with other multiplexing technologies. However, since multiple OAM states are multiplexed along the same beam axis, coaxial propagation and reception are required, which means that coherent, OAM-multiplexed links are sensitive to misalignment compared to non-OAM, single-beam communication links. This is an important challenge for FSO and will become worse in the presence of atmospheric turbulence. Propagating through atmospheric turbulence, the intensity profile of Gaussian and OAM beams can be significantly corrupted, making it harder to align and track using their intensity gradient, and greater efforts are necessary to evaluate and attenuate the receiver error.

Another approach to FSO that may be used in tandem with OAM for SDM is multiple-input multiple-output (MIMO), where multiple independent bit streams are transmitted simultaneously, and multiple aperture elements are employed at the transmitter/receiver. Zhao et al. claim that conventional, line-of-sight (LOS) MIMO SDM systems outperform OAM. As a well-established technique in radio wireless systems, MIMO approach could provide capacity gains relative to single aperture systems and increase link robustness for FSO communications. However, in practice, MIMO is prone to interference between the transmitted and received beams at different aperture elements; this interference arises when these apertures are not sufficiently spatially separated.

Figure 26:
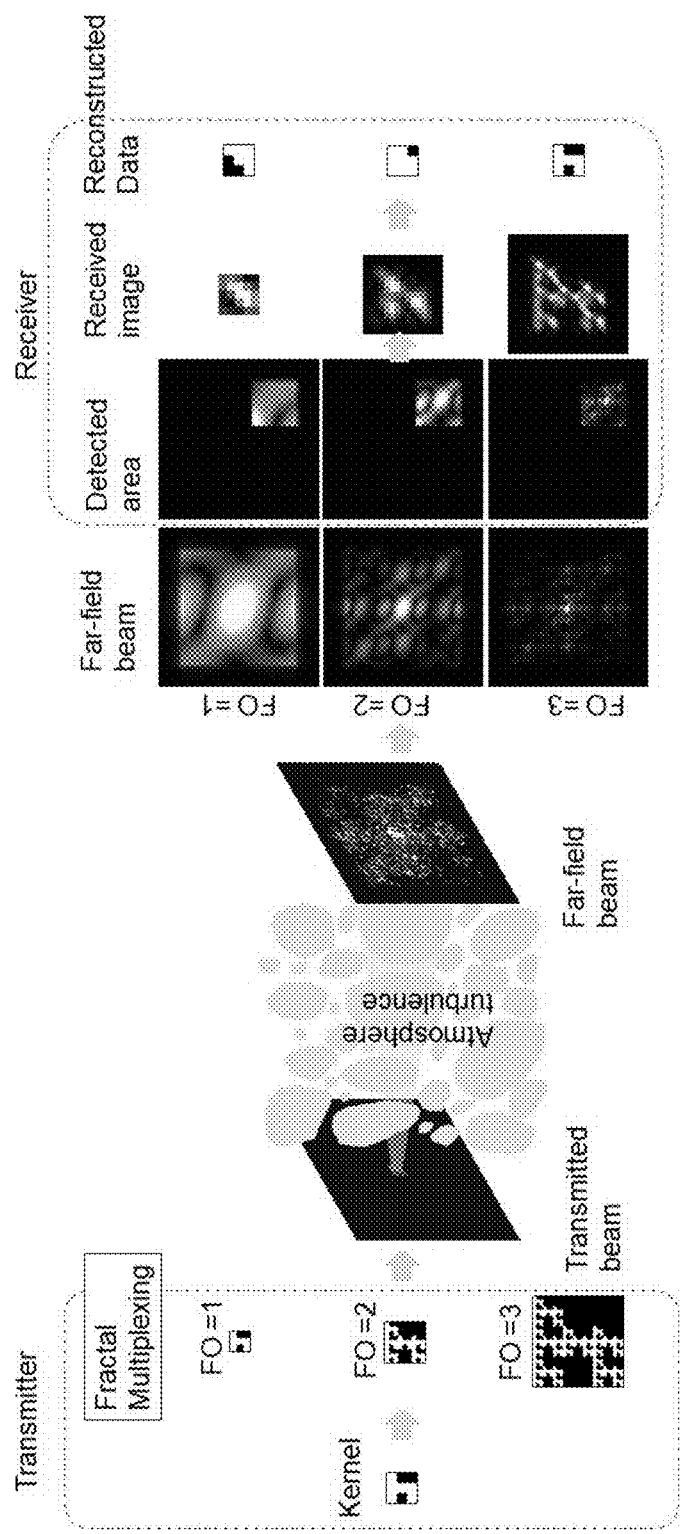
FIG. 26 is an illustration of a diffractal space-division-multiplexing (DSDM) in optical wireless communication through atmosphere turbulence. This schematic illustrates the data kernel pattern "J" and transmitted patterns with fractal order FO=1, 2, and 3. Only a partial off-axis portion of the far-field beam is detected and reconstructed. In this case, the received image is optically deconvolved with a lens. The FO=3 data is reconstructed accurately.

In this disclosure, a novel approach is demonstrated for: diffractal space-division multiplexing (DSDM), which is illustrated in FIG. 26. The unique properties of diffractal redundancy enable the simultaneous transmission of multiple independent bit streams; in the far field, arbitrary parts of a diffractal contain sufficient information to recreate the entire original (sparse) signal. Transmitted beams with higher fractal orders achieve higher reconstruction accuracy (see right column of FIG. 26); in prior work, this result has been demonstrated experimentally with a 4-F system. Since DSDM does not rely on wavelength or polarization, it could be used with WDM and PDM techniques to further improve system capacity. Additionally, DSDM may be used to improve data transmission capacity in adverse environments in a manner analogous to other FSO techniques in which different parts of a signal are referenced to reduce receiver error.

One reason DSDM may be underexplored is due to diffraction issues (i.e., diffractals generate a wide cone of high spatial frequencies as they propagate, which is counter to many paradigms for FSO). Additionally, the strong diffraction from irregularly corrugated beams is a challenge to simulate reliably. Nevertheless, DSDM presents several important advantages over other FSO multiplexing technologies: (1) robust to misalignment: with DSDM, receivers may sample arbitrary beam parts, entirely off-axis; (2) wide reception cone: DSDM enables a roaming area for the non-coaxial transmitter and receiver; (3) simple design: compared to MIMO, DSDM uses a single transmitter/receiver aperture pair; (4) robust to turbulence: diffractals provide redundant encoding to capture multiple bits per frame; (5) swift decoding: DSDM uses optical processing for demultiplexing and a simple soft thresholding for reconstruction; (6) simple receiver requirements: the same optics may be used to demultiplex all data channels; (7) high detection sensitivity: focusing lens enables capture of low intensity optical signals; and (8) scalability: aggregate capacity is only limited by number of pixels available at the transmitter.

In accordance with an exemplary embodiment, DSDM may be relevant to other applications where the alignment between transmitter and receiver is not fixed, when a receiver "roaming area" is needed, or when an object or data needs to be encrypted, marked, or tracked. Spatial kernel patterns may be used as channel codes or to enable additional channel coding for error correction. In order to advance ideas on redundant spatial diffraction encoding, here basic parameters for fractal propagation or diffraction encoding to the "far-field" were established: measure the reconstruction accuracy and robustness of DSDM.

In accordance with an embodiment, this disclosure is organized to elaborate on novel opportunities for DSDM in FSO communication systems. In section 2, a simple transmitter and receiver design is shown and illustrate the experimental implementation of DSDM using a spatial light modulator (SLM). The remaining sections of the disclosure show numerical results, which illustrate diffractal propagation characteristics and determine the roaming area described in later analyses. In section 3, design considerations tied to receiver size and the propagation distance between transmitter and receiver are illustrated, which influences the communication channel's performance. In section 4, even in the presence of turbulence, with the implementation of higher fractal order beams, is it shown that accuracy of DSDM system remains high. In fact, with only 81×81 pixel transmitters, a $10^{-3}$ bit error rate (BER) with 5 dB signal-noise-ratio can be achieved (SNR) (the receiver size collects only 30% of the off-axis roaming area at 2.5 km propagation distances without any error-correcting schemes). These preliminary results indicate outstanding possibilities for robust FSO with fractal-based, diffraction-encoded signals.

Section 2—Diffracted Space-Division Multiplexing

Figure 27:
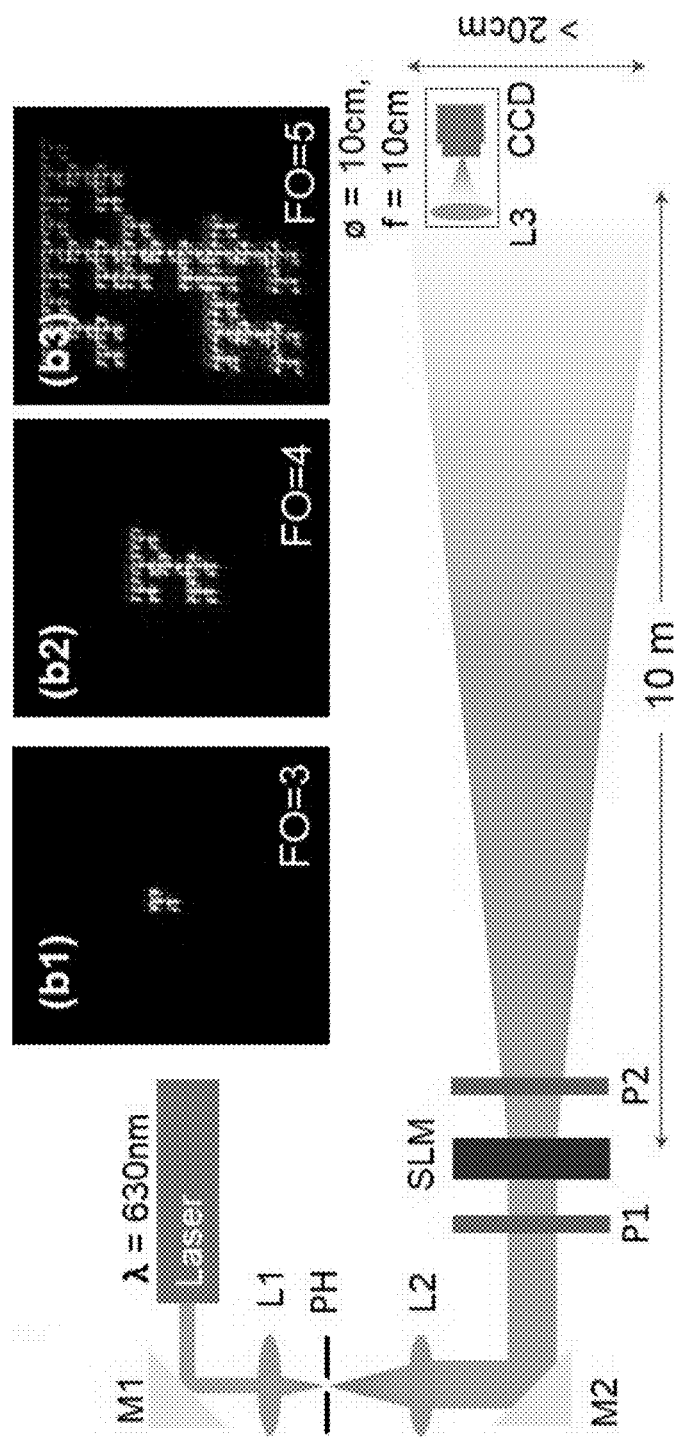
FIG. 27 is a schematic with a proof-of-concept experimental implementation of DSDM over an open air path. M1 and M2 are mirrors. L1 and L2 are telescoping lenses with pinhole PH to provide spatial filtering. P1 and P2 are orthogonal polarizers aligned with the spatial light modulator (SLM) with pixel width $\alpha_{pixel}$=36 µm. A convex lens focuses and decodes data onto the sensor. (Note: the intensity of the light at the receiver is too low to be measured by the optical camera without the lens.) Detector images show excellent reconstruction of the transmitted beams for fractal orders FO=3, 4, and 5, in spite of their off-axis locations. The remaining parts of this manuscript illustrate numerical results.

The DSDM system can include multiplexing (where the transmitted data is a fractal from kernel data), diffraction encoding (when the beam propagates to the receiver), and demultiplexing (which is composed of coherent optical and electronic processing). The DSDM deploy the intensity modulation/direct detection (IM/DD) scheme, which is common for FSO communication systems. In FIG. 27A, an experimental setup is shown with a transmissive spatial light modulator (SLM, Holoeye LC2012). The SLM amplitude-modulates with on/off keying (OOK), where the '1's are in-phase optical pulses that occupy the bit duration and '0's are bits in the absence of optical pulses. For fractal orders (FO) of 3, 4, and 5, the beams transmitted by the SLM are 1, 3, and 9 mm in diameter.

At a distance of 10 m from the SLM, a fraction of the laser beam is captured off-axis by a camera placed in the focal plane of the lens. The beam diverges over 10-times in width and the light intensity at the receiver is too low to be detected without the focusing lens. Only a small portion of the far-field beam is captured. The detector sensor, placed in the focal plane of the lens, captures the demultiplexed data with FO=3, 4, and 5. (FIG. 27, images b1-b3), which easily reproduces the transmitted "J" kernel. This diffractal transmitter/receiver scheme is explained further below.

Multiplexer: Fractal, Spatially Modulated Transmission

The kernel OOK data is a binary s×s array. The transmitted data is produced with a fractal mask, or a screen pattern generated with the Kronecker product [see left column of FIG. 26]. The Kronecker product of the kernel with itself involves placement of the kernel at the location of each bit '1' and the placement of an all-zeros matrix at each bit '0'. When the beam's fractal order is equal to n, the Kronecker product repeats n times. The smallest sub-square of the fractal is defined as the pixel. Therefore, each transmitted pattern contains $s^n \times s^n = s^{2n}$ pixels.

Diffractal Beam Divergence

Diffractal beam divergence is an important design consideration: it defines the effective roaming area for receivers. From diffraction theory, a spatially corrugated beam such as a fractal diverges faster than a Gaussian-profiled beam. Diffractals with s=3 were numerically propagated. The total transmitted power is unit normalized and the transmitted beam area and pixel power varies with fractal orders and kernel shapes. The pixel size ($W_{px}$=2 mm) and wavelength ($\lambda$=1550 nm) remain fixed and constant regardless of beam shape. Care is necessary to ensure that the power is either conserved in the simulations or repeatable with doubled boundary widths.

Figures 28A, 28B, 28C:
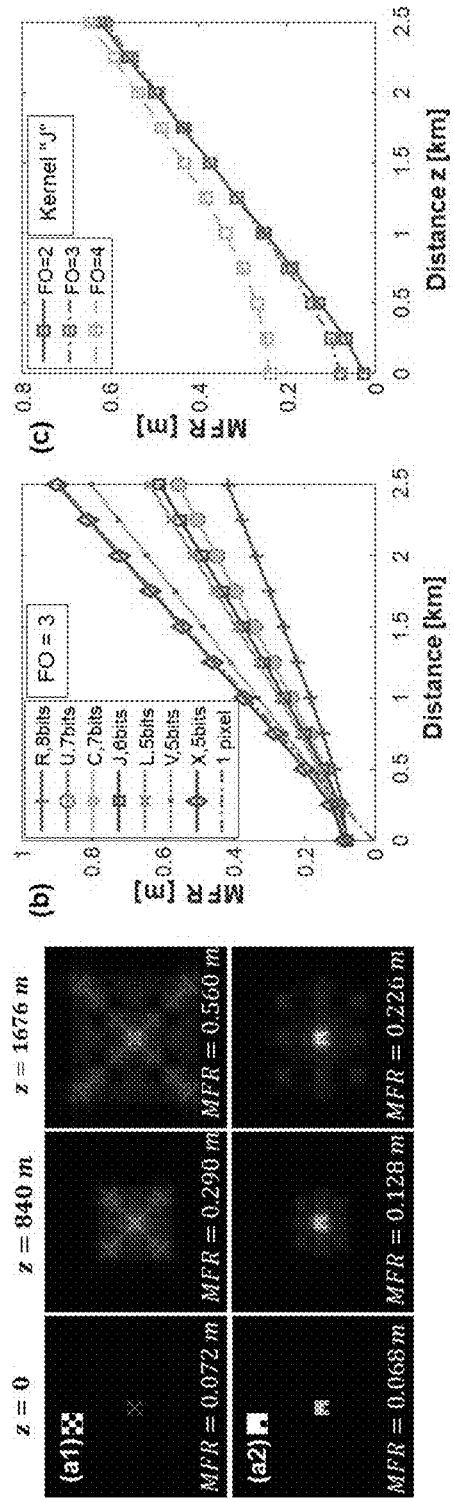
FIGS. 28A-28C illustrate propagated beam profile of electric-field intensity at z=0, 840 and 1676 m ((a1) of FIG. 28A) "X" and ((a2) of FIG. 28A) "R" kernels. MFR as a function of propagation distance z for (FIG. 28B) different data kernels with fixed fractal order FO=3 and (FIG. 28C) different fractal orders FO=2, 3, and 4 of the kernel "J".

For the calculation of diffracted beam radius, the concept of beam mode field radius (MFR) is employed and given by the equation:

$$MFR = \sqrt{\frac{\int\int_{-\infty}^{\infty} [|u(x, y)|^2 (x^2 + y^2) dxdy]}{\int_{-\infty}^{\infty} |u(x, y)|^2 dxdy}} \quad (1)$$

where x and y are the transverse spatial coordinates and u(x, y) is the electric field of the FSO beam. The fraction of the total beam power within the maximum roaming area is less than or equal to $1-1/e^2$. Different kernel shapes have different degrees of diffraction. Moreover, the range of diffraction for different 3×3 kernels varies by a factor of 2: In FIG. 28A, the kernel "R" diffracts at half the rate as the kernel "X". The upper limit for the beam divergence speed is that for a single pixel. A diffractal with the kernel "X" spreads almost as much as a single pixel at the same propagation distance. It was observed that a diffractal's beam divergence scales approximately with the number of internal edges in the kernel shape or with the largest independent block length of the kernel. Different kernel shapes experience different degrees of diffraction and the extent to which this varies is also tied to the image complexity that characterizes all diffractals.

In fact, even the slowest diffractals diverge at a rate much greater than a Gaussian of the same initial width due to their highly corrugated structure. For example, the kernel "R" diverges at a rate 26 times faster than a Gaussian beam with the same waist radius. In FIG. 28B, the initial beam radius of the kernel "R" is around 10 cm. This beam radius increases by a factor of $\sqrt{2}$ after a propagation distance of z=0.8 km. Meanwhile, the Rayleigh length of a Gaussian beam with a 10 cm waist radius is 21 km, given by $Z_R = \pi/\lambda(w_0)^2$, where $w_0$ is the beam waist. This extreme divergence of diffractals relative to the divergence of Gaussian beams is a result of the high degree of structure, intrinsic to fractal-modulated beams.

Diffractals uniquely exhibit non-Gaussian beam diffraction statistics, meaning that their propagation in the near field is populated with spatiotemporal spikes. However, many aspects of their propagation at long distances are similar to Gaussian beam propagation. For example, the diffractal beam radius MFR increases linearly at longer propagation distances. The MFR at longer distances ultimately scales in proportion with the size of a single pixel or with the largest independent block length of the kernel rather than the initial beam waist. In other words, with the same kernel shape and pixel size, beams with different fractal orders have different initial beam waists but similar far-field MFR. This convergence, which depends on the kernel shape but not on fractal order is illustrated in FIG. 28C.

Diffractal Propagation to the "Far Field"

With DSDM, diffraction provides part of the signal spatial encoding; the accuracy in the reconstructed data depends on how far the beam travels between the transmitter and receiver. The concept of a "Fraunhofer distance" to quantify the diffraction distance to the far-field was used, $$z_{DFF} > 2s^{2n} L_{dfpx}, \quad (2)$$

where n is the fractal order and $L_{dfpx} = \pi/\lambda (W_{px}/2)^2$ is the confocal parameter for a single pixel of width Wpx. It can be noted that the strong spiking spatiotemporal behavior described is part of the diffraction-encoding for DSDM and occurs when $z<Z_{DFF}$. The simulations suggest that, in order to fully take advantage of the diffractal encoding, the receiver should be at a distance $z>Z_{DFF}$ from the transmitter. At the same time, in the following section, good reconstruction is still achieved at $z<Z_{DFF}$ when the detector is sufficiently large.

The propagation distance influences the DSDM diffraction encoding as well as the roaming area. By increasing the FO, one may not significantly increase the roaming area (FIG. 28C); however, one does increase $Z_{DFF}$ and require longer distances for diffraction encoding. To ensure proper diffraction encoding at shorter distances z, smaller pixel size $W_{px}$ may be used; nevertheless, this correspondingly increases the MFR.

Detection and Demultiplexing

Figures 29A, 29B, 29C:
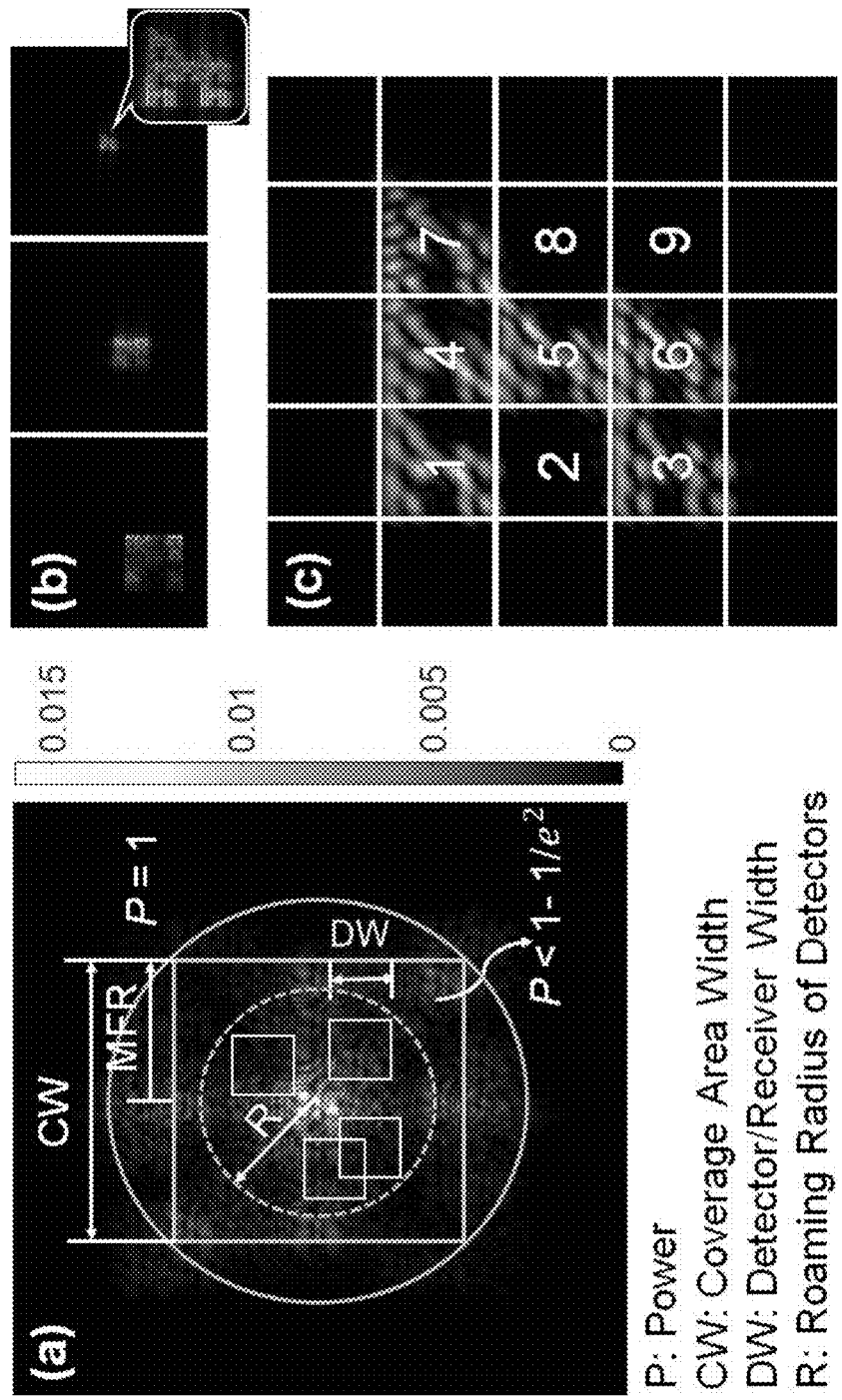
FIG. 29A is an illustration of the far-field beam pattern for the kernel "J" and definitions of coverage area (CW), receiver width (DW), and roaming radius (R). Several randomly positioned receivers are shown (white squares).
FIG. 29B is an illustration from left to right, optical deconvolution from an off-axis receiver DW=0.75 m to the sensor. The captured area represents 5.8% of total beam power and 16% of the coverage area.
FIG. 29C is an illustration of 9 sub-blocks of the received image. During reconstruction, each sub-block is thresholded to '1' or '0' depending on the sub-block intensity.

Longer propagation distances result in larger roaming areas. At the receiver, a portion of this roaming area is captured. FIG. 29A shows the definitions of receiver detector width (DW) and roaming radius (R) with respect to the beam mode field radius (MFR). The green dotted circle represents the possible roaming area, and the green solid circle is defined as the maximum roaming area with radius equal to $\sqrt{2MFR}$.

DSDM demultiplexing is performed both optically (with a convex lens and Fourier-plane camera) and soft thresholding (with a simple threshold algorithm). A vignetted lens focuses light onto a sensor. Diffractal propagation is unique because in the focal plane of an arbitrarily placed lens, a pattern similar to the initial data kernel is produced, even when the lens is off-axis and captures a fraction of the far-field beam. The receiver (lens and camera) may move freely within the maximum roaming area. The kernel reconstruction is performed by a simple, soft thresholding of the intensity profile of received image. The received image is separated into 9 sub-blocks, each sub-block represents one bit. Mean and variance of each sub-block and background are thresholded to either '1' or '0', see FIG. 29C. More details regarding the reconstruction algorithm are provided in Sec 1.2 of the supplemental document.

Section 3—Design Considerations

The roaming radius, FO, and receiver size all play a critical role in DSDM. In the sections below, these parameters were considered where the receiver aperture is significantly smaller than the diffracted beam or maximum roaming area $R=\sqrt{2MFR}$ were considered. To draw statistics, over 4000 random locations were sampled across the beam to calculate the kernel bit-error-rate (K-BER), which varies spatially. The K-BER is the accuracy calculated for a fixed kernel instead of a random pattern; this fixed kernel pattern is a measure of the accuracy if DSDM is applied for channel marking or tracking.

Roaming Radius

Not surprisingly, the error probability increases as the receiver moves away from the far-field beam center axis, however, decreases with larger receiver areas. The roaming radius of the receiver directly influences the K-BER performance.

Figures 30A, 30B, 30C:
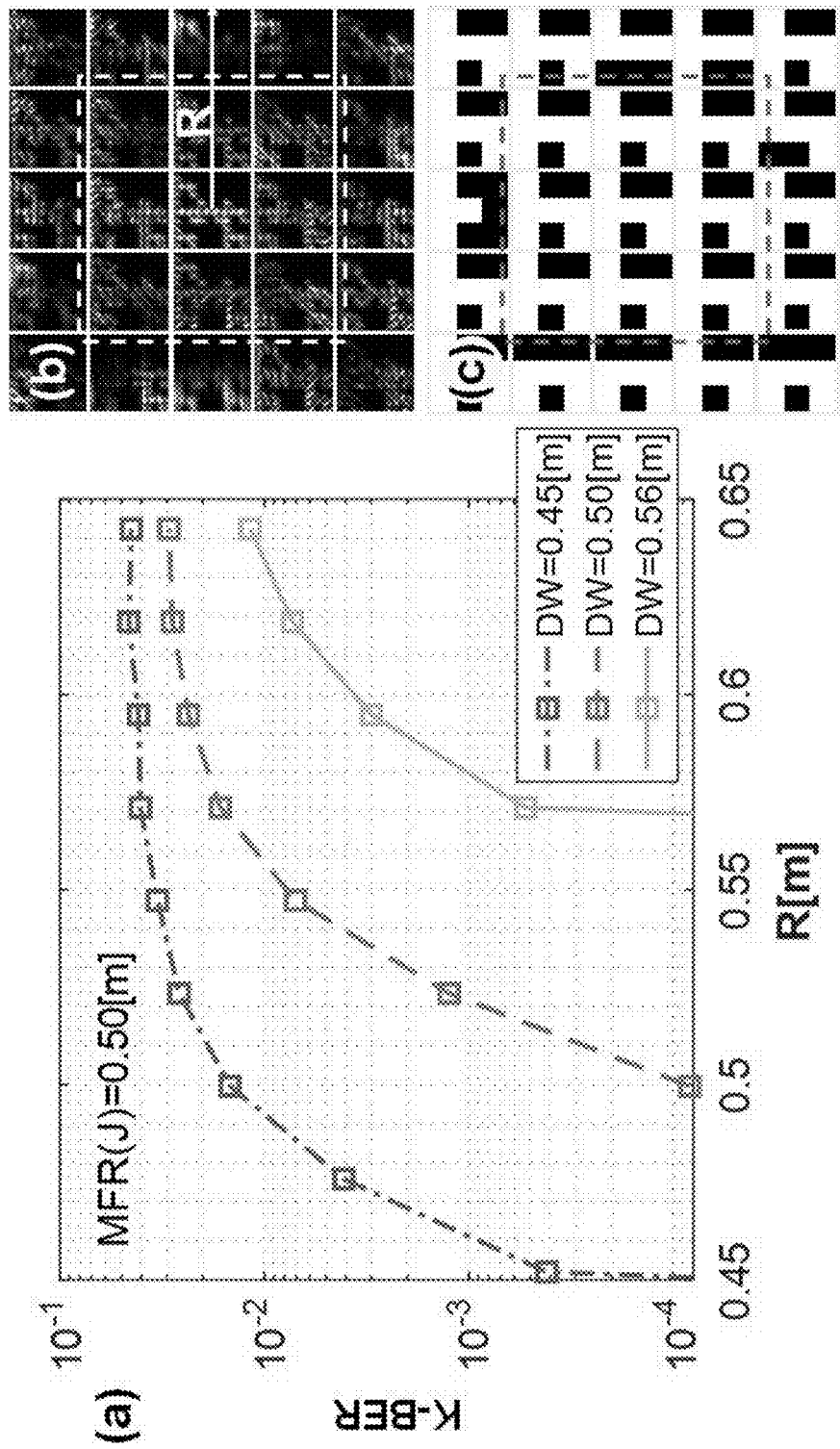
FIGS. 30A-30C are illustrations of transmitted kernel "J" with fractal order (FO) of 4 at propagation distance z=2.5 km.

FIGS. 30A-30C illustrate the reconstruction and K-BER performance as a function of the roaming radius R at a propagation distance of z=2.5 km without turbulence, where the kernel is "J" and FO=4. FIG. 30B shows the pattern observed in the Fourier-plane of the receiver lens for different sampling locations of the coverage area. FIG. 30C shows the reconstructed data of corresponding images in FIG. 30B. In general, as the receiver moves farther away from the center of the diffracted beam, the K-BER gradually increases; the highest reconstruction accuracies are sampled on-axis. Additionally, as the receiver samples a larger area, it is able to roam a larger radius with a low K-BER.

The limited K-BER performance is largely influenced by compression noise or the reconstruction error that arises from using only a portion of the entire diffracted beam. As long as the receiver aperture is smaller than the diffracted beam, compression noise exists, regardless of whether there is additional noise or not. Compression noise decreases as the receiver size increases. For small roaming radius R, the K-BER drops sharply, and this drop occurs for smaller R with larger receiver size. Compression noise decreases quickly when the receiver size is larger. The receiver aperture covers most of the high-intensity central area of the far-field beam. Not surprisingly, DSDM with smaller roaming areas and larger receivers have the best performance.

Influence of Fractal Order

DSDM performance is significantly improved when one increases the FO of the transmitted data kernel. As FO increases, the accuracy over the roaming area increases and smaller DWs are possible. The far field beam exhibits smaller self-similar speckle features and information is encoded at higher spatial frequencies. Therefore, when the FO is large, the detector image produced from an arbitrary subsection of the roaming area closely resembles the transmitted data.

Figures 32A, 32B, 32C:
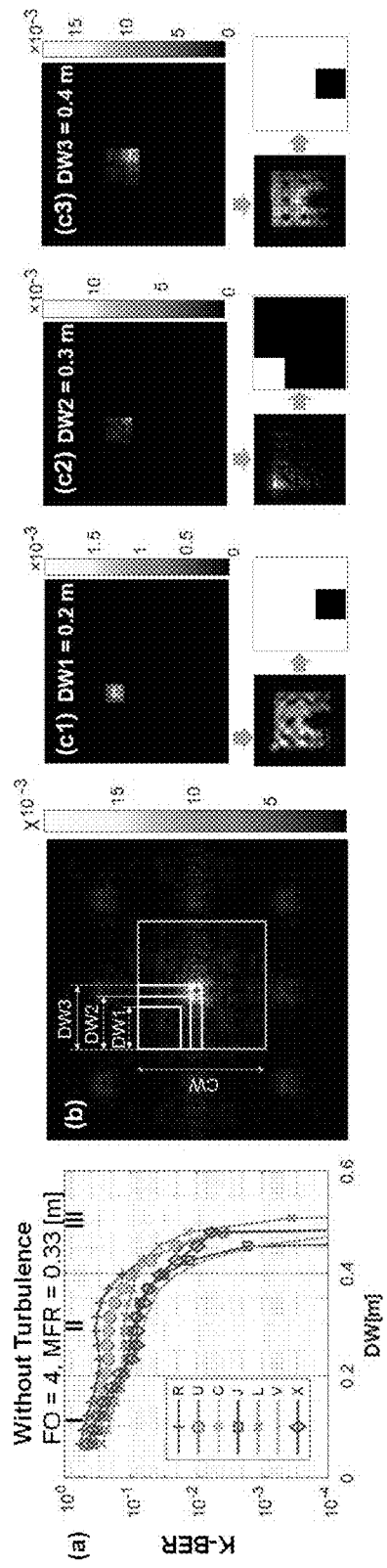
FIG. 32A-32C is an illustration of K-BER vs. receiver width (DW). The trend decreases with larger DW and depends on kernel data. There are three marked region (I, II, and III). The slightly rise in K-BER (marked zone II) is a result of minimal diffraction encoding or shorter propagation distance z=2.5 km.

FIG. 32A shows the K-BER versus DW at a propagation distance of z=10 km and compares the K-BER performance of FO=2, 3, and 4 beams. The trend clearly shows that higher fractal orders achieve higher accuracy. The K-BER for FO=4 is lower than the K-BER for FO=2 and 3. In order to reach the same K-BER level of $10^{-3}$, the FO=3 channel needs a receiver size that is about 1.6 times larger than that of the FO=4 channel. To put the receiver sizes into perspective, at FIG. 6(a), when FO=4, the K-BER of $10^{-3}$ is achieved with a receiver size less than 25% of the maximum roaming area (the receiver area=$(DW)2=(2.5\ m)^2=6.25\ m^2$; maximum roaming area=$25\ m^2$). The Fourier-plane detector images carry more self-similar, iterated features with FO=4 compared to FO=2 [FIG. 6(b-e)]. The greater degree of redundancy in these features leads to smaller K-BER with higher FO.

FIGS. 33A1-33B illustrate that DSDM with larger FO is an effective way to improve system performance. However, larger FO beams require more transmitted pixels, which require longer propagation distances for encoding [Eq. 2]. As noted above, smaller pixels may be used to decrease the necessary propagation distance, but this also increases the rate of beam divergence.

Influence of Receiver Size and Kernel Shape

One main advantage of DSDM is that the receiver aperture can be much smaller than the whole diffracted beam; however, this advantage varies with the diffraction encoding and kernel data. In the previous graph's trend (for the kernel "J") where the K-BER vs DW relationship is smooth [FIG. 6(a)], the propagation distance z=10 km puts the receiver approximately in the far field or $z \approx Z_{DFF}$. At a shorter distance z=2.5 km, the K-BER vs DW for different FO=4 kernels shows more subtle features [FIG. 7(a)]. While this figure shows that a larger receiver size results in a lower error probability, at this shorter z, features from partial diffraction encoding where the beam has not reached the "far field" were observed. The inflection points in the curves in FIG. 7(a) are one feature of partial diffraction encoding. A comparison with the smooth curve of FIG. 6(a) indicates two obvious turning points that separate the trend lines into three regions.

The K-BER performance in Region I is again limited by compression noise. By comparing (c1) and (c3) in FIG. 32C, the influence of compression noise was seen: a detector image with larger receiver, where DW=0.4 m, contains more detailed information than with a smaller receiver, DW=0.2 m. The upper left corner of the receivers of different size are located at the same place [see white squares in FIG. 32B]. In Region III, the KBER drops sharply as before with increasing receiver size. Results indicate that when DW ¿0.45 m (where receiver size is 30% of the maximum roaming area) KBER is below the forward error correction limit $10^{-3}$. This indicates that the K-BER is reduced simply by increasing DW.

However, the trend lines in Region II in FIG. 32A are flattened or slightly raised, which appears in violation of the trend described above. However, in this Region, the K-BER performance is dominated by partial diffraction encoding, or not having propagated far enough to reach the "far-field". It is not easy to observe Region II at a longer propagation distance of z=10 km, which is closer to $Z_{DFF}$ or the "far field" [FIG. 31A]. FIG. 32B shows different receiver sizes DW=0.2, 0.3, and 0.4 m in the roaming area. Accurate reconstruction is achieved when DW=0.2 and 0.4 m [(c1) and (c3) of FIG. 32C]. One important area of future work will be the reconstruction of beams with partial diffraction encoding such as those in region II. An illustration is shown in (c2) in FIG. 32C when a receiver DW=0.3 m is located in the top left of the far field. In this case, the bottom right corner of receiver samples only a part of the high-intensity central area. This area remains localized and is as large as the original, transmitted beam. Since the intensity of the central portion is much higher than the other sampled parts, the upper-left corner of the deconvolved image is much brighter. With our on/off threshold reconstruction algorithm, only the brightest area is considered as '1', whereas the other dark areas are '0'. This sampling, in combination with the current threshold algorithm, results in a higher error probability with DW=0.3 m than DW=0.2 m.

At many instances in the disclosure, the numerical reconstruction algorithm fails to identify the kernel pattern even though the detector images would easily be classified by human visual inspection. Other reconstruction algorithms that can be used besides the one that was used can include algorithms based on a threshold. For example, kernel reconstruction algorithms based on intensity differentials, and image boundaries do, in some cases, reduce the error probability compared to a simple intensity threshold approach. The simplest reconstruction algorithm, however, distills clearer understanding of the diffraction encoding, which is one scope of this article.

Section 4. Robustness to Turbulence

In the presence of atmospheric turbulence, DSDM has the advantage of redundant encoding. The transmitter-receiver propagation was simulated in the presence of weak and strong atmospheric turbulence with random phase screens. Two common parameters of atmospheric turbulence—the index of refraction structure $C_n^2$ and propagation distance z—are varied to simulate different turbulence strengths. Moreover, the Rytov variance is a fundamental scaling parameter that depicts the strength of the wave fluctuations, which is defined by $\sigma_r^2=1.23 C_n^2 k^{7/6} L^{11/6}$, where $k=2\pi/\lambda$ is the optical wavenumber and $\lambda$ is the wavelength.[45] Another scaling parameter, the signal-to-noise ratio (SNR), is defined as:

$$SNR = 10\log_{10}(\frac{Signal}{Noise}) = 10\log_{10}(\frac{\sum_1^N \sum_1^N |u_{AT}|^2}{\sum_1^N \sum_1^N |u_{AT} - u_{vac}|^2}) \quad (3)$$

where $u_{AT}$ and $u_{vac}$ are the complex, electric-field profiles of the diffracted beams with and without atmospheric turbulence.

Figures 33A, 33B:
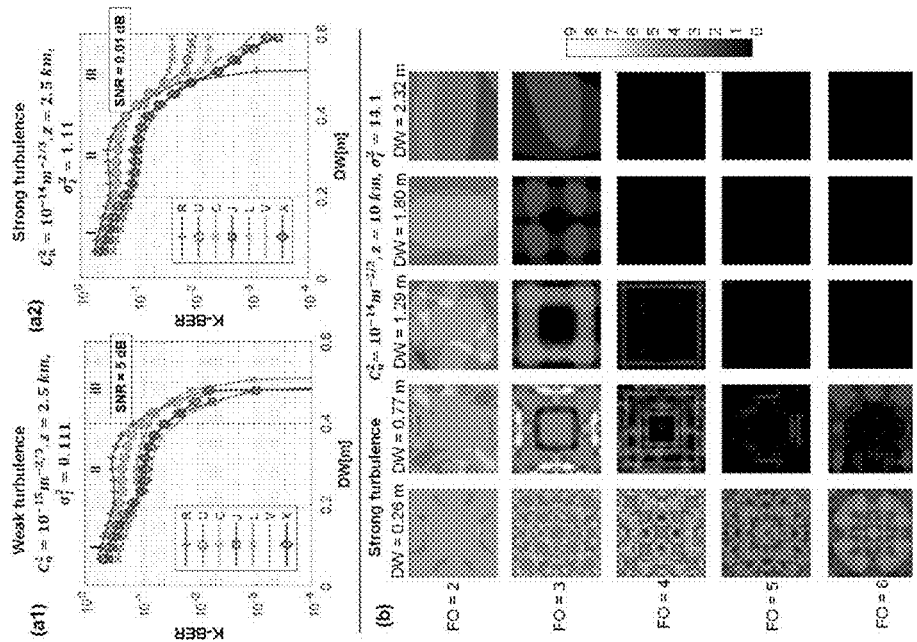
FIG. 33A illustrates K-BER performance under (a1) weak turbulence conditions, $C_n^2=10^{-15}$ m$^{-2/3}$, and scintillation index is $\sigma_I^2=0.11$ corresponding to an SNR of 5 dB and (a2) strong turbulence conditions, where $C_n^2=10^{-14}$ m$^{-2/3}$ and scintillation index is $\sigma_I^2=1.11$ corresponding to a SNR of 0 dB. The fractal order is FO=4 and the propagation distance is z=2.5 km.
FIG. 33B illustrates the received bit error at different locations within the maximum roaming area radius of 2.8 m with increasing receiver size (DW) in columns and fractal order in rows. Here, z=10 km.

K-BER performance under different atmospheric turbulence strength is simulated and estimated in FIG. 33A. The propagation distance is z=2.5 km, and receiver width DW ranges from 5 to 60 cm. The K-BER vs DW trends are similar to FIG. 32C, except that the turbulence phase screens are added during propagation. The K-BER is again calculated by averaging 4000 single-aperture receivers at random locations within the maximum roaming area. FIG. 32A shows the KBER under weak turbulence, where $C_n^2=10^{-15}\ m^{-2/3}$, and scintillation index is $\sigma_r^2=0.11$, corresponding to a SNR of 5 dB. FIG. 33A shows K-BER under strong turbulence, where $C_n^2=10^{-14}\ m^{-2/3}$, and scintillation index is $\sigma_r^2=1.11$, corresponding to a SNR close to 0.01 dB. The K-BER performance under weak turbulence is almost the same as that with no turbulence, illustrating that the DSDM system is robust to noise under 5 dB SNR. With strong turbulence, obvious differences arise in Region III, where receiver width DW~0.4 m. A larger receiver collects more noise compared to a smaller receiver, which results in greater distortion in the deconvolved images and higher K-BER.

The distortion from atmospheric turbulence in the demultiplexed beams is not only overcome by increasing the DW of the receiver but also by increasing the fractal order of the transmitted beam. To illustrate this effect, bit error values were spatially plotted at equally distributed locations within the roaming area at a propagated distance of z=10 km for different FO's (FIG. 33B). A longer propagation distance is necessary to show the effect when the fractal order is increased to FO≥5; a larger FO requires longer distances for diffraction encoding. Unlike previous figures that show the average K-BER from 4000 randomly positioned receivers, the bit error from 40×40 single receivers were shifted in position and at evenly distributed locations over the roaming area. In FIG. 33B, different colors represent 0 to 9 received error bit values (there are 9 bits in each kernel).

By column, receiver widths from 0.26 to 2.32 m are tested. For the same FO, larger receiver widths correspond with fewer error bits, consistent with the declining curves in FIG. 8($a1,a2$). By row, FO is shown from 2 to 6. For the same receiver size, when the FO increases, the bit error decreases. Larger FO's generally improve DSDM robustness to atmospheric turbulence; however, a larger FO increases the distance needed for diffraction encoding $Z_{DFF}$ [Eq. 2]. This issue of diffraction encoding is highlighted with FO=4,5,6 at DW=0.77 m in FIG. 33B. Higher FO's have a smaller K-BER up to FO=5, but when the FO increases to 6, the corresponding bit error value increases instead of decreases. This increase appears to break the trend where smaller error accompanies higher FO. In fact, the distance z=10 km is significantly less than the minimum diffraction-encoded distance and is not far enough for FO=6 to reach the "far-field". Again, our results indicate that DSDM is still promising when the propagation distance is less than the Fraunhofer diffraction length $Z<Z_{DFF}$ [Eq. 2].

DISCUSSION AND CONCLUSION

DSDM leverages the fact that fractal patterns of kernel data are redundantly encoded over large areas as they propagate to the far field. As a result, a small portion of the far-field carries information to reproduce the original kernel data. Provided that the receiver detector has sufficient sensitivity, the best reconstruction accuracy is achieved from beams that have propagated to the far field. However, the far field, the point beyond which the radiation pattern scales but does not change shape with propagation, is not yet explicitly defined for diffractals. Additionally, in this disclosure, diffractal beam divergence and propagation to the far field have been shown to depend strongly on kernel shape. The disclosure and results are relevant to computational sensing, imaging, and communication systems.

Although diffractals exhibit considerably more stable propagation in the far field, one is able to implement DSDM with larger DW in the near field ($z<Z_{DFF}$). As the beam propagates to the far field, the intensity patterns exhibit spatiotemporal spiking as part of the process of diffraction encoding. An analysis of the dependence on the receiver size and influence of fractal order in DSDM was provided. In many cases with incomplete diffraction encoding, the detector images are inaccurately classified using our linear threshold algorithm but easily classified by visual inspection. Judging from the incorporation of a neural network or optimization scheme could improve the BER by several orders over already-promising results.

In conclusion, an enormous potential for DSDM in FSO communication and channel marking is shown, where only a few percent of the off-axis diffracted beam power is needed to reconstruct spatially encoded kernel data. DSDM may be used in practical free-space propagation systems to achieve high-transmission capacity in combination with other degrees of freedom, such as polarization and wavelength multiplexing. With DSDM, information is redundantly encoded spatially so that, with a sufficiently large receiver, DSDM communication is robust to atmospheric turbulence. With 81×81 transmitted pixels, a BER of $10^{-3}$ under weak turbulent conditions (5 dB SNR) was achieved when the receiver sizes are 30% of the roaming area over propagation distances of 2.5 km. These simulation results would be improved further with the use of higher-FO beams. Higher-FO beams are technologically feasible now but beyond our current capability with simulations. To implement DSDM experimentally over similar distances with higher FO, smaller pixels ensure proper diffraction encoding. The effect of spatially modulating beams with smaller pixels is a larger reception cone area, which, far from being disadvantageous, may be valuable for FSO systems where the transmitter and receiver are roaming or not coaxial.

Method and System for Diffraction-Encoded Signaling and Marking for Optical Communication and Pointing-Acquisition Technology Fractals are defined by their self-similarity, that is they are a relatively simple, never-ending pattern that repeats itself at different scales. Waves diffracted from fractal structures are referred to as diffractals. Diffractals have been considered for Free Space Optical (FSO), wireless communication systems. Communication networks have typically used advanced modulation and multiplexing schemes with current fiber optics communication systems using spatial multiplexing. A potential approach in FSO spatial multiplexing is by using beams with Orbital Angular Momentum (OAM). However, the challenge with this approach can include sensitivity to misalignment and significant corruption when propagating through atmospheric turbulence.

Laser Imaging and Distance Ranging (LiDAR) is a technique that is currently used in several applications including autonomous vehicles. The challenges with LiDAR can include: potential impact on cameras and human eyes with prolonged exposure, the laser wavelength used is typically 905 nm which is quite powerful, they are expensive and require multiple systems (3 LIDAR systems are typically used in automobile applications today); they do not have sufficient range and perception; they have challenges with atmospheric conditions such as rain, fog, turbulence, etc.; they suffer from sparsity of data, i.e., they cannot adequately capture information about small objects (<1 meter) situated 50 meters away; and they do not sufficiently capture reflected light from surfaces that are angled greater than 45 degrees from the LiDAR.

In accordance with an embodiment, a method is disclosed for sensing and detecting an object using, for example, a diffractal space-division multiplexing (DSDM) approach for overcoming the challenges with LIDAR, specifically for sensing and detecting object. For example, by coating an object with a marker that is patterned with a fractal, one is able to identify the marker, for example, with 1% of the reflected light with a sensor having 20 cm diameter from an object that is 30 meters away at angles greater than 45 degrees.

In accordance with an embodiment, the method and system are disclosed for diffraction-encoded signaling and marking for optical communication and pointing-acquisition technology, and more particularly, a LiDAR marker that identifies an object with a diffracted signature received at the LiDAR sensor. Advantages of the method and system as disclosed can include improved object identification and detection, relatively cost effective, for example, the method and system does not require multiple systems, for example, such as LIDAR. In addition, the method and system as disclosed is safe to human eyes, can have a significant range and perception, fractals can be relatively simple to generate. The method can also be robust to different markers and atmospheric conditions, is computationally faster and relatively inexpensive, and can be implemented in existing LIDAR systems. In addition, for example, the method and system as disclosed can be implemented on autonomous vehicles (i.e., self-driving vehicle) including automobiles, drones, and the like, and can be used for obstacle detection, for example, for robots.

Figure 34:
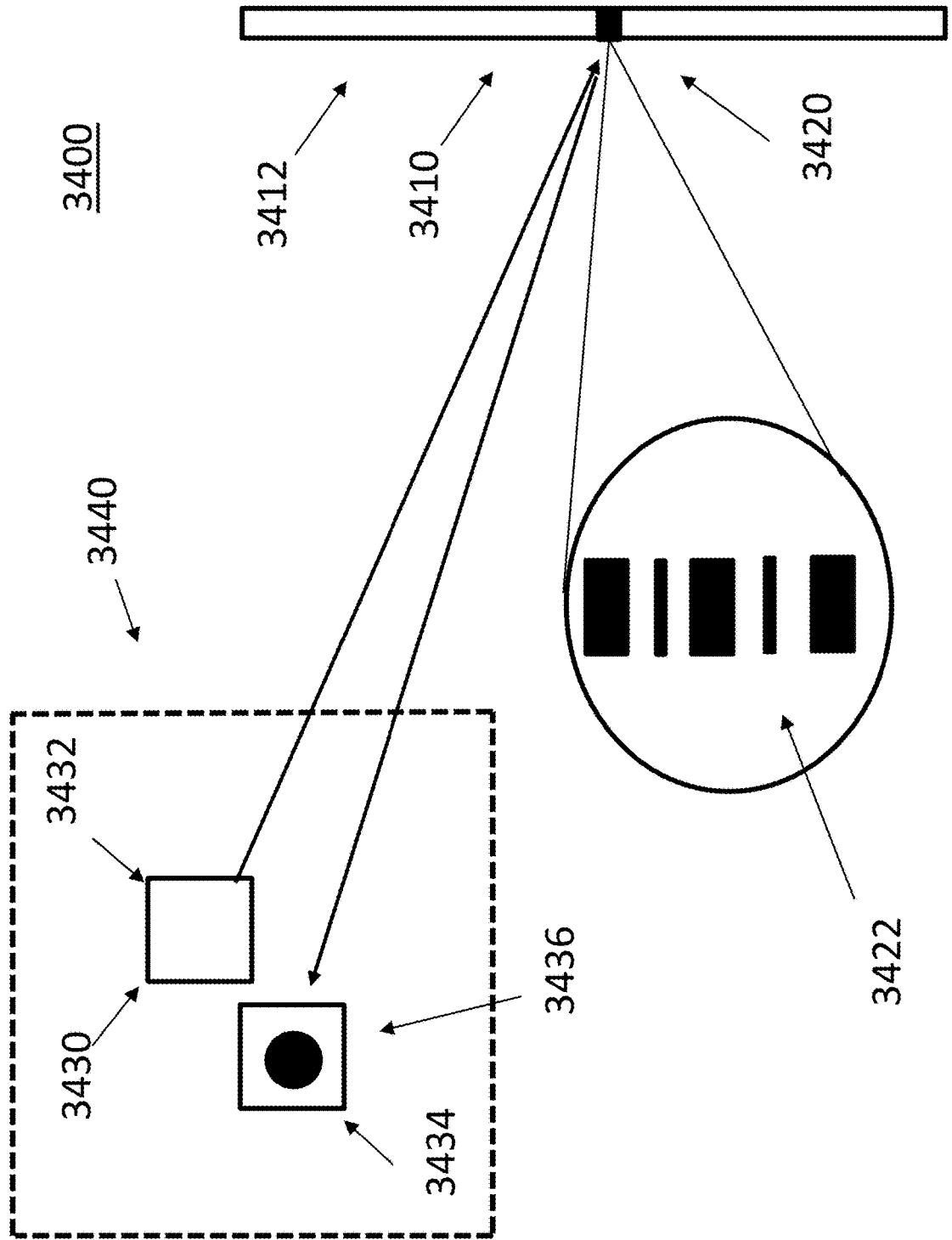
FIG. 34 is an illustration of a system for detecting a diffraction encoded marker in accordance with an embodiment.

FIG. 34 is an illustration of a system 3400 for detecting a diffraction encoded marker 3420 in accordance with an embodiment. As shown in FIG. 34, the system 3400 includes a camera 3430 that includes an emitter 3430 configured to emit a beam of light and a receiver 3434 configured to detect the emitted beam of light (i.e., a diffractal) from one or more diffraction encoded markers 3420 arranged on an object 3410, for example, a telephone pole 3412. The one or more diffraction encoded markers 3420 can be, for example, patterned with a fractal 3422.

In accordance with an embodiment, the fractal 3422 can be a meso-ordered, multi-scale distribution of features with fractal statistics can include any geometric pattern that is self-repeating, for example, at different sizes and scales within the diffraction encoded marker 3420. For example, the diffracted fractal pattern can be, for example, an "X" pattern, a "+" pattern, a "bar-code" pattern, or an insect inspired pattern. For example, the fractal 3422 can be, for example, can be a multiple automated marker.

Figure 36:
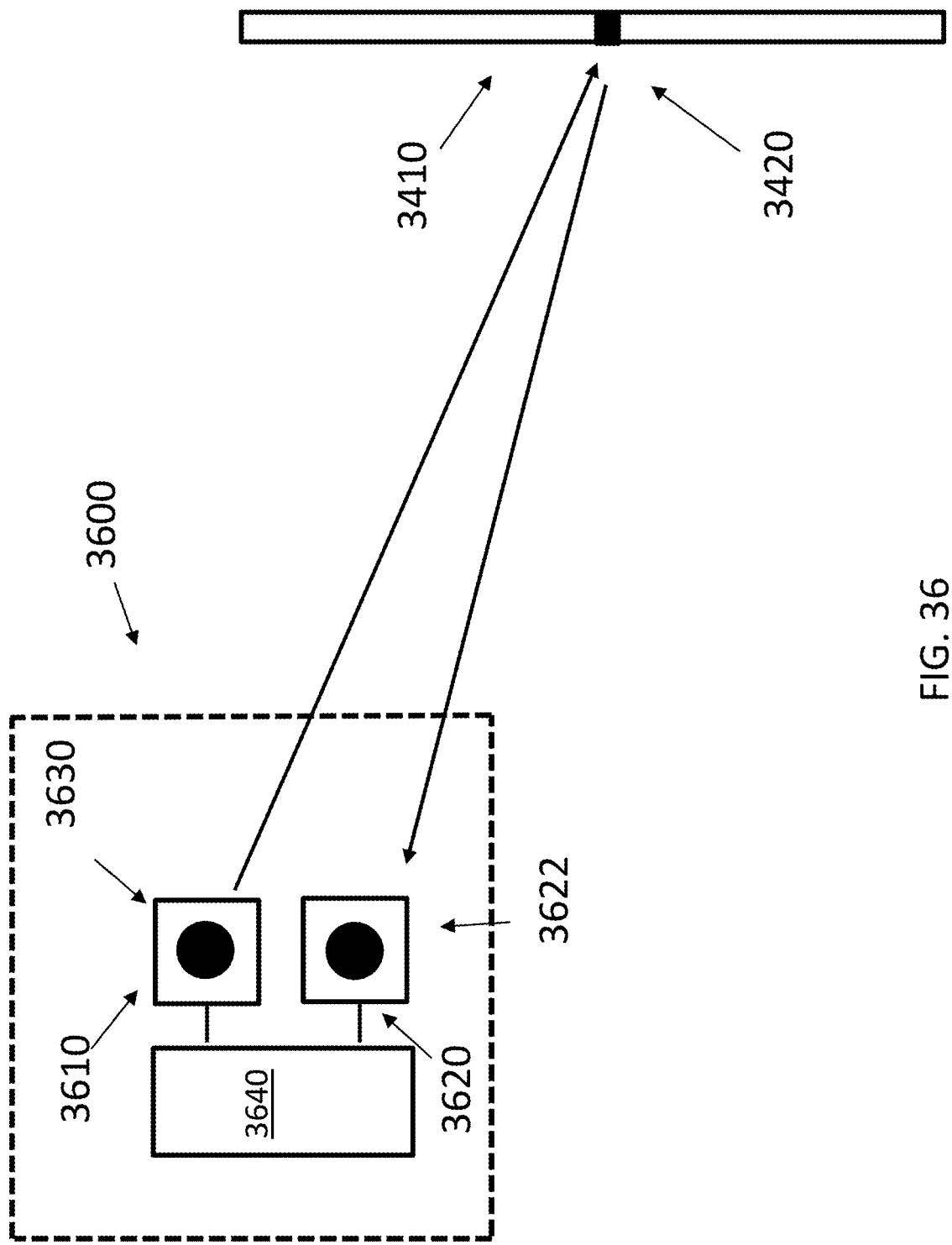
FIG. 36 is an illustration of a LiDAR system in accordance with an embodiment.

In accordance with an embodiment, the emitter 3432 and the receiver 3434 can be part of, for example, a laser imaging system. The laser imaging system can be, for example, a LiDAR (Laser Imaging and Distance Ranging) system 3600 (FIG. 36). The LiDAR system 3600 can be any system that can determine ranges by targeting an object or a surface with a laser and measuring the time for the reflected light to return to the receiver. For example, the LiDAR system 3600 may operate in a fixed direction (e.g., vertical) or it may scan multiple directions, for example, as a LiDAR scanning system. The LiDAR system can include, for example, a 600 nm to 1000 nm laser, and more preferably a laser having a wavelength of less than 905 nm. In addition, the LiDAR system can include a phased array that can illuminate one or more directions using a microscopic array of individual antennas. Controlling the timing (phase) of each antenna can direct a cohesive signal in a specific direction. In addition, the LiDAR system includes a receiver 3434 that can include a sensor 3436. The sensor 3436, for example, can be a lens over a photodector array such as a solid state photodetector array, for example, a photodiode, photomultipliers, or single-photon amplified detector.

In accordance with an embodiment, the LiDAR system can use active sensors that supply their own illumination source. For example, the energy source can hit an object 3410, for example, a telephone pole 3420 and the reflected energy, for example, from the diffraction encoded marker 3420 is detected and measured by sensors within the receiver 3434. A distance to the object 3410 can be determined by recording the time between transmitted and backscattered pulses and by using the speed of light to calculate the distance traveled and also taking into account the measured diffracted image. In accordance with an embodiment, the LIDAR system can include a fisheye camera.

In accordance with an embodiment, the diffraction encoded marker can be, for example, a LiDAR marker that identifies an object with a diffracted signature, and which is received by a LiDAR sensor. The diffracted signature being unique to the detected object. For example, the LiDAR marker can be configured to identify the object 3410 as a traffic or light pole 3412, a barrier, a natural object such as a tree, a building, an individual, an animal, and the like.

In accordance with an embodiment, the LiDAR system preferably has a resolution of at least 2560×1920, a frequency of 10 Hz to 20 Hz, and a wavelength of 905 nm or less, for example, 900 nm. In addition, the system 3400 can be configured to detect the one or more diffraction encoded markers 3420 at an angle of 0 to 45 degrees to the laser imaging system.

In accordance with an embodiment, the one or more diffraction encoded markers 3420 can be placed or located on an object 3410 such as a vertical/horizontal light or traffic pole 3412, a concrete barrier, and/or places a road surface, for example, an asphalt or concrete road. For example, the emitter 3432 and the receiver 3434, for example of a LiDAR system can be arranged on an autonomous vehicle 3440. The autonomous vehicle 3440 can be, for example, an automobile or a drone. Alternatively, the emitter 3432 and the receiver 3434 can be arranged on a robot for obstacle detection and/or used to track an object in real time. For example, the object 3410 can be an individual (i.e., a living body) and/or an animal. For example, the individual can be a motorcyclist or bicyclist having one or more diffraction encoded markers 3420 on the motorcycle or bicycle. In another embodiment, the one or more diffraction encoded markers 3420 can be on clothing, safety equipment, for example, a helmet of the motorcyclist or bicyclist. The one or more diffraction encoded markers 3420 can also be used on collars, harnesses, and/or leashes for dogs and other animals.

Figure 35:
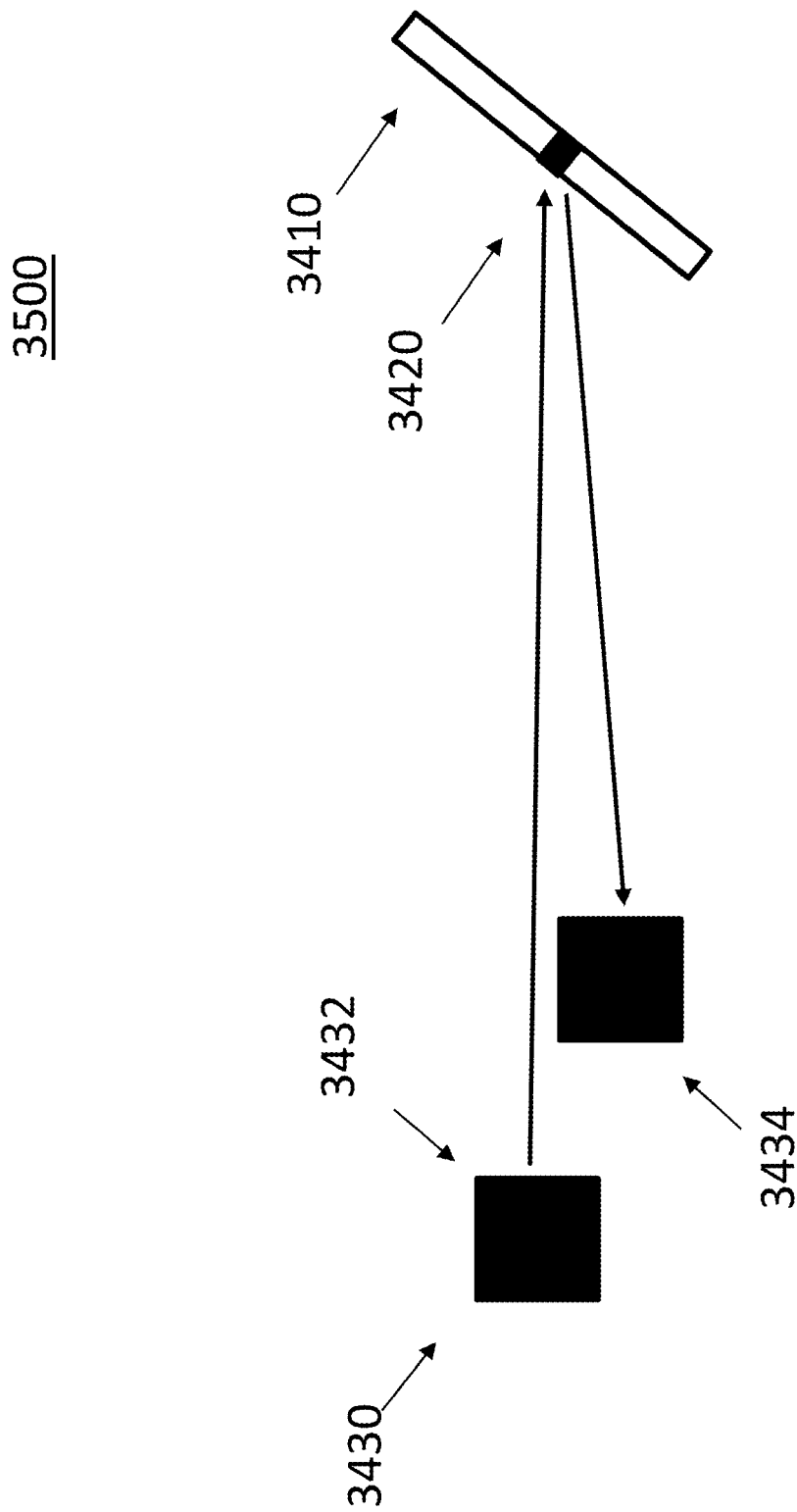
FIG. 35 is an illustration of the system for detecting the diffraction encoded marker as shown in FIG. 34 in which the diffraction encoded marker is located on an object having an angle of between 0 degrees to 45 degrees to a direction of emittance of a beam of light.

FIG. 35 is an illustration of the system 3500 for detecting the diffraction encoded marker 3420 as shown in FIG. 34 in which the diffraction encoded marker 3420 is located on an object 3400 having an angle of between 0 degrees to 45 degrees to a direction of emittance of a beam of light from the emitter 3430. As set forth, one of the difficulties with a typical LiDAR system is that the LiDAR system typically samples 1 to 2 degrees angularly and does not provide more than a single point sample from an object smaller than a meter situated at a distance of approximately 50 meters. As shown in FIG. 2, the system and method as disclosed using a diffraction encoded marker 3420 can detect a beam of light emitted from the emitter 3432 and reflected from the diffraction encoded marker 3420 that is placed or arranged on an object that is titled at an angle between 0 degrees to 45 degrees in a direction of the beam of light from the emitter 3430. For example, the emitter 3432 and the detector 3434 can be part of LiDAR system 3430 having a fisheye lens, for example, with a resolution of 2560×1920 (pixels per unit), a frequency of 10 Hz to 20 Hz, and a wavelength of approximately 900 nm. For example, the LiDAR system 3430 can be designed to obtain data points horizontally and approximately 2 degrees vertically for conversion to raster data points. In addition, the system 3400 as disclosed can configured for automobile use such that drivers, pedestrians and the like are not distracted and environmental elements including dirt and dust are also considered.

FIG. 36 is an illustration of LiDAR system 3600 in accordance with an embodiment. As shown in FIG. 36, the LiDAR system 3600 includes a laser 3610 configured to emit a source of light that is used to measure a distance between a sensor 322 of a receiver (or detector) 3620 and an object 3410. The LiDAR system 3600 also includes a scanner 3630 configured to direct the laser beam in one or more directions. The scanner 3630 can rotate or oscillate to scan the environment and collect data, which allows the sensor 3622 to create a three-dimensional (3D) point cloud of the environment by measuring the distance, for example, to different objects in the scene. The receiver or detector 3620 focuses the light that is reflected back from the object 3410, for example, the marker 3420 and converts the focused light into electrical image that can be processed and analyzed. The LiDAR system 3600 also includes one or more processing units 3640 configured to analyze the data collected by the sensor 3622 and convert the electrical signals from the detector 3620 into information that can be used to identify, for example, the object 3410. The processing unit 3640 can be a microcontroller, a computer, a processor, or a specialized ASIC (Application-Specific Integrated Circuit).

Figure 37:
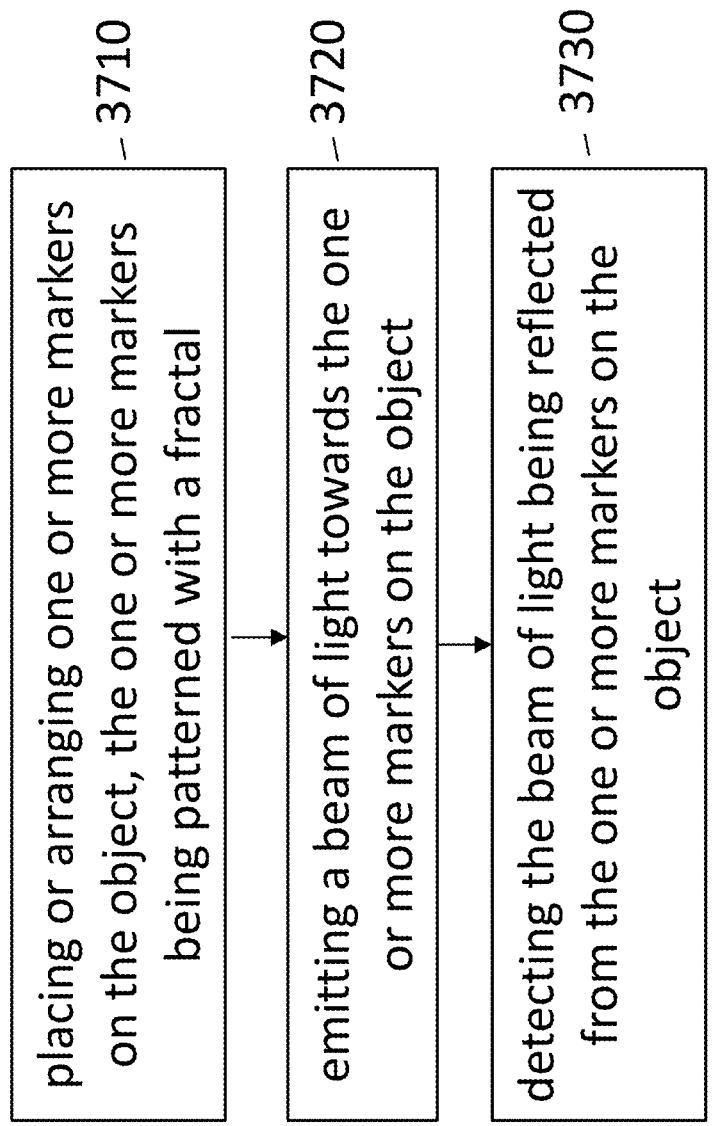
FIG. 37 is a flow chart illustrating a method detecting an object in accordance with an embodiment.

FIG. 37 is a flow chart illustrating a method 3700 for detecting an object in accordance with an embodiment. As shown in FIG. 37, the method 3700 for detecting an object includes placing or arranging one or more markers on the object, the one or more markers being patterned with a fractal 3710, emitting a beam of light towards the one or more markers on the object 3720, and detecting the beam of light being reflected from the one or more markers on the object 3730.

Figure 38:
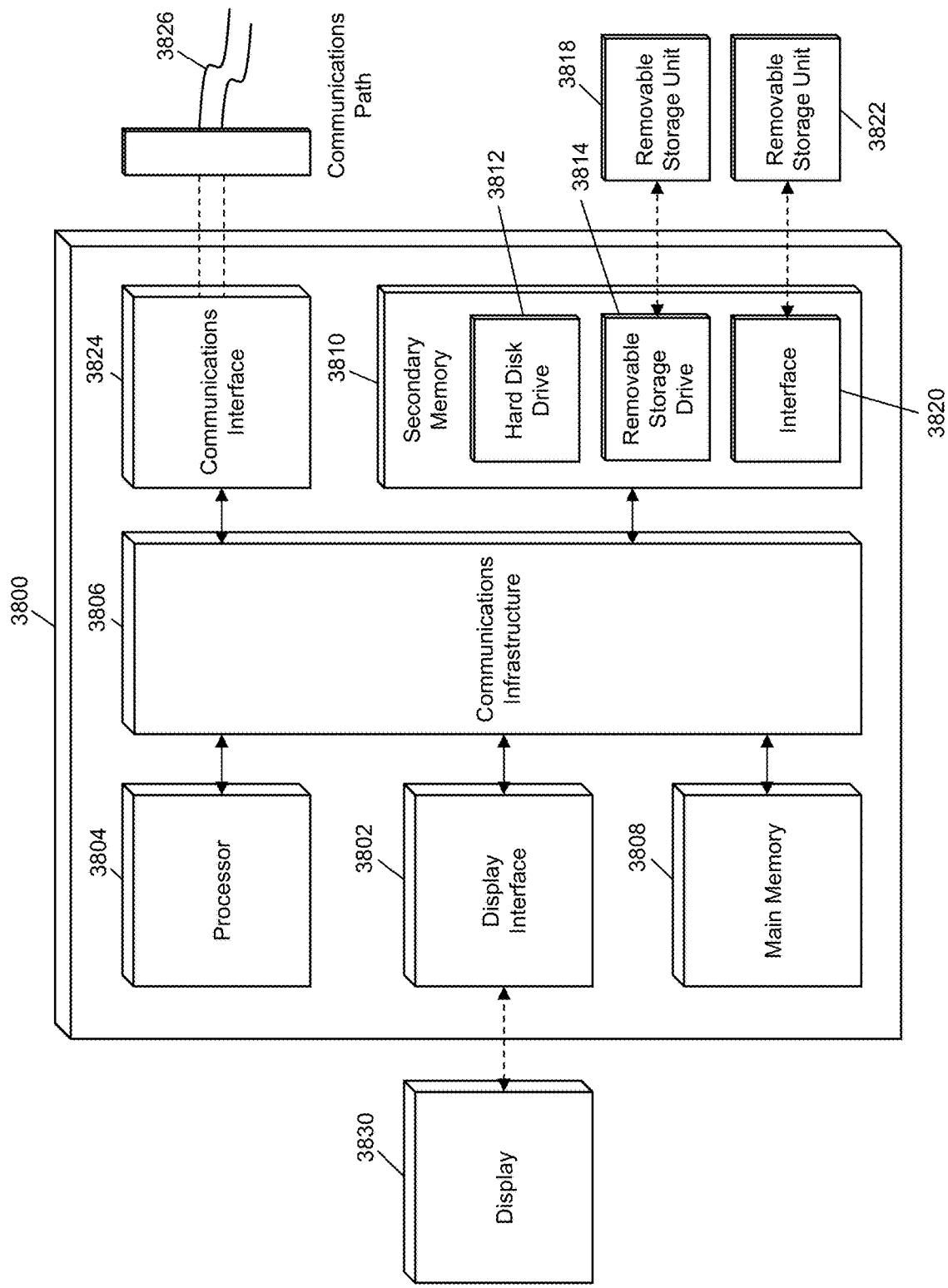
FIG. 38 illustrates a representative computer system in which embodiments of the present disclosure, or portions thereof, may be implemented as computer-readable code executed on hardware.

FIG. 38 illustrates a representative computer system 3800 in which embodiments of the present disclosure, or portions thereof, may be implemented as computer-readable code executed on hardware. For example, the one or more computer systems associated with the method and system for polarimetric imaging methods and systems, and method and system for detecting an object using fractals as disclosed herein may be implemented in whole or in part by a computer system 3800 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 3818, a removable storage unit 3822, and a hard disk installed in hard disk drive 3812.

Various embodiments of the present disclosure are described in terms of this representative computer system 3800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 3804 may be processor device specifically configured to perform the functions discussed herein. The processor device 3804 may be connected to a communications infrastructure 3806, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 3800 may also include a main memory 3808 (e.g., random access memory, read-only memory, etc.), and may also include a secondary memory 3810. The secondary memory 3810 may include the hard disk drive 3812 and a removable storage drive 3814, such as a floppy disk drive, a magnetic tape drive, an optical disk drive, a flash memory, etc.

The removable storage drive 3814 may read from and/or write to the removable storage unit 3818 in a well-known manner. The removable storage unit 3818 may include a removable storage media that may be read by and written to by the removable storage drive 3814. For example, if the removable storage drive 3814 is a floppy disk drive or universal serial bus port, the removable storage unit 3818 may be a floppy disk or portable flash drive, respectively. In one embodiment, the removable storage unit 3818 may be non-transitory computer readable recording media.

In some embodiments, the secondary memory 3810 may include alternative means for allowing computer programs or other instructions to be loaded into the computer system 3800, for example, the removable storage unit 3822 and an interface 3820. Examples of such means may include a program cartridge and cartridge interface (e.g., as found in video game systems), a removable memory chip (e.g., EEPROM, PROM, etc.) and associated socket, and other removable storage units 3822 and interfaces 3820 as will be apparent to persons having skill in the relevant art.

Data stored in the computer system 3800 (e.g., in the main memory 3808 and/or the secondary memory 3810) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 3800 may also include a communications interface 3824. The communications interface 3824 may be configured to allow software and data to be transferred between the computer system 3800 and external devices. Exemplary communications interfaces 3824 may include a modem, a network interface (e.g., an Ethernet card), a communications port, a PCMCIA slot and card, etc. Software and data transferred via the communications interface 3824 may be in the form of signals, which may be electronic, electromagnetic, optical, or other signals as will be apparent to persons having skill in the relevant art. The signals may travel via a communications path 3826, which may be configured to carry the signals and may be implemented using wire, cable, fiber optics, a phone line, a cellular phone link, a radio frequency link, etc.

The computer system 3800 may further include a display interface 3802. The display interface 3802 may be configured to allow data to be transferred between the computer system 3800 and external display 3830. Exemplary display interfaces 3802 may include high-definition multimedia interface (HDMI), digital visual interface (DVI), video graphics array (VGA), etc. The display 3830 may be any suitable type of display for displaying data transmitted via the display interface 3802 of the computer system 3800, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 3808 and secondary memory 3810, which may be memory semiconductors (e.g., DRAMs, etc.). These computer program products may be means for providing software to the computer system 3800. Computer programs (e.g., computer control logic) may be stored in the main memory 3808 and/or the secondary memory 3810. Computer programs may also be received via the communications interface 3824. Such computer programs, when executed, may enable computer system 3800 to implement the present methods as discussed herein. In particular, the computer programs, when executed, may enable processor device 3804 to implement the methods illustrated by FIGS. 1-37, as discussed herein. Accordingly, such computer programs may represent controllers of the computer system 3800. Where the present disclosure is implemented using software executed on hardware, the software may be stored in a computer program product and loaded into the computer system 3800 using the removable storage drive 3814, interface 3820, and hard disk drive 3812, or communications interface 3824.

The processor device 3804 may comprise one or more modules or engines configured to perform the functions of the computer system 3800. Each of the modules or engines may be implemented using hardware and, in some instances, may also utilize software executed on hardware, such as corresponding to program code and/or programs stored in the main memory 3808 or secondary memory 3810. In such instances, program code may be compiled by the processor device 3804 (e.g., by a compiling module or engine) prior to execution by the hardware of the computer system 3800. For example, the program code may be source code written in a programming language that is translated into a lower level language, such as assembly language or machine code, for execution by the processor device 3804 and/or any additional hardware components of the computer system 3800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 3800 to perform the functions disclosed herein. It will be apparent to persons having skill in the relevant art that such processes result in the computer system 3800 being a specially configured computer system 3800 uniquely programmed to perform the functions discussed above.

The detailed description above describes embodiments of polarimetric imaging methods and systems, and systems and methods for detecting a diffraction encoded marker.

The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A polarimetric camera comprising:
   a lens with a metagrating film adhered to the lens, the metagrating film including a two-dimensional (2D) photonic-crystal array with polyaniline hollow spheres (PANI-HS) nanostructures;
   a charged-coupled device (CCD) sensor configured to receive a speckle pattern from the lens with the metagrating film; and
   a computer system configured to process the speckle pattern received from the CCD sensor, and wherein points of polarized light from a scene are configured to be transmitted through the lens forming the speckle pattern on the CCD sensor.

2. The polarimetric camera according to claim 1, wherein the CCD sensor is a polarization-agnostic CCD sensor.

3. The polarimetric camera according to claim 2, wherein the computer system includes a computational algorithm configured to process the speckle pattern received from the polarization-agnostic CCD sensor.

4. The polarimetric camera according to claim 3, wherein the computational algorithm is a shallow neural networks algorithm.

5. The polarimetric camera according to claim 1, wherein the lens and the CCD sensor are not aligned with a scene that is being detected.

6. The polarimetric camera according to claim 5, wherein the lens and the CCD sensor are configured to form a non-coaxial or non-line-of-imaging system.

7. The polarimetric camera according to claim 1, wherein for a full-stokes imaging system, further comprising:
   a single-shot image of the speckle pattern is captured from a partial segment of a Debye ring from the lens; and
   a speckle image from the single-shot image of the speckle pattern is input into a trained shallow neural networks (SSN) model for scene reconstruction.

8. A method for polarimetric imaging comprising:
   receiving a speckle pattern on a polarization-agnostic charged-coupled device (CCD) sensor from a lens having a metagrating film, the metagrating film including a two-dimensional (2D) photonic-crystal array with polyaniline hollow spheres (PANI-HS) nanostructures; and
   processing the speckle pattern received from the polarization-agnostic charged-coupled device (CCD) sensor with a computational algorithm to reconstruct a scene.

9. The method for polarimetric imaging according to claim 8, wherein the computational algorithm is a shallow neural networks algorithm.

10. The method for polarimetric imaging according to claim 8, further comprising:
    transmitting points of polarized light from the scene through the lens and forming the speckle pattern received on the polarization-agnostic CCD sensor.

11. The method for polarimetric imaging according to claim 8, wherein for a full-stokes imaging system, further comprising:
- capturing a single-shot image of the speckle pattern from a partial segment of a Debye ring from the lens; and
- inputting a speckle image from the single-shot image of the speckle pattern into a trained shallow neural networks (SSN) model to reconstruct the scene.

12. A system for detecting an object comprising:
- one or more markers configured to be placed or arranged on the object, the one or more markers being patterned with multi-scale features with meso-ordered, fractal statistics;
- an emitter configured to emit a beam of light towards the one or more markers on the object; and
- a receiver configured to detect a beam image of the emitted beam of light being reflected from the one or more markers on the object, and wherein the detected beam image from the beam of light is a code that identifies the object.

13. The system according to claim 12, wherein
- the emitter and the receiver are part of a LiDAR (Laser Imaging and Distance Ranging) system, and LiDAR system includes a fisheye camera; and
- the marker is a LiDAR marker that identifies an object with a diffracted signature, which is received by a LIDAR sensor, the diffracted signature configured to identify the object.

14. The system according to claim 13, wherein
- the object is one or more of a light pole, a traffic signal, a traffic sign, a barrier, and a building; and
- the fractal has one or more of a multi-scale "X" pattern, a multi-scale "+" pattern, a multiscale "bar-code" pattern, or an insect inspired pattern.

15. The system according to claim 13, wherein
- the LiDAR system has a resolution of at least 2560×1920, a frequency of 10 Hz to 20 Hz, and a wavelength of 900 nm wavelength;
- the marker is at an angle of 0 to 45 degrees to the LiDAR system;
- the LiDAR system has a sensing area having a diameter of 20 cm or less;
- the object is one or more of a vertical and/or horizontal light or traffic pole, traffic symbols or traffic sign, a barrier, and a road surface, the road surface being an asphalt surface or concrete road surface with one or more markings;
- the emitter and the receiver are arranged on an autonomous vehicle, the autonomous vehicle being an automobile or a drone; and
- wherein the emitter and the receiver are used to track the object in real time.

16. A method for detecting the object with the system according to claim 12, the method comprising:
- placing or arranging the one or more markers on the object, the one or more markers being patterned with the fractal with meso-ordered, multi-scale structures;
- emitting the beam of light towards the one or more markers on the object; and
- coherent imaging the beam image of the emitted beam of light being reflected from the one or more markers on the object.

17. The method according to claim 16, further comprising:
- identifying the object based on the coherent imaging of the beam image of the emitted beam of light being reflected from the one or more markers, and wherein the fractal pattern is a meso-ordered, multi-scale distribution of features that identifies the object based on the polarized diffracted signature, and wherein the fractal has a "X" pattern, a "+" pattern, a "bar-code" pattern, or an insect inspired pattern.

18. The method for polarimetric imaging according to claim 8, wherein the polarization-agnostic CCD sensor is a CCD sensor with linear polarization filters, the method further comprises:
- transmitting points of polarized light from the scene through the lens and forming the speckle pattern received on the CCD sensor with linear polarization filters.

* * * * *